(12) United States Patent
Nakazato

(10) Patent No.: US 11,708,927 B2
(45) Date of Patent: Jul. 25, 2023

(54) PIPE DRILLING DEVICE

(71) Applicant: COSMO KOKI CO., LTD., Tokyo (JP)

(72) Inventor: Kensuke Nakazato, Tokyo (JP)

(73) Assignee: COSMO KOKI CO., LTD.

( * ) Notice: Subject to any disclaimer, the term of this patent is extended or adjusted under 35 U.S.C. 154(b) by 0 days.

(21) Appl. No.: 17/312,891

(22) PCT Filed: Oct. 5, 2020

(86) PCT No.: PCT/JP2020/037707
§ 371 (c)(1),
(2) Date: Jun. 10, 2021

(87) PCT Pub. No.: WO2021/070773
PCT Pub. Date: Apr. 15, 2021

(65) Prior Publication Data
US 2022/0268387 A1    Aug. 25, 2022

(30) Foreign Application Priority Data
Oct. 11, 2019    (JP) .................................. 2019-187832

(51) Int. Cl.
*F16L 41/06*    (2006.01)
*B23B 47/34*    (2006.01)
*F16L 55/00*    (2006.01)

(52) U.S. Cl.
CPC .............. *F16L 41/06* (2013.01); *B23B 47/34* (2013.01); *F16L 55/00* (2013.01)

(58) Field of Classification Search
CPC ............ F16L 41/06; F16L 55/00; B23B 47/34
See application file for complete search history.

(56) References Cited

U.S. PATENT DOCUMENTS

| 4,431,017 A |   | 2/1984  | Willemsen ...................... 137/15 |
| 5,269,340 A | * | 12/1993 | Drzewiecki ........... F16L 41/065 83/745 |
| 5,400,492 A | * | 3/1995  | Hodgson ............... F16L 55/179 408/31 |

(Continued)

FOREIGN PATENT DOCUMENTS

| DE | 100 21 592 | 11/2001 | ............. B23B 41/08 |
| JP | 51-47992 | 4/1976 | |

(Continued)

OTHER PUBLICATIONS

International Preliminary Report on Patentability issued in PCT/P2020/037707, dated Apr. 12, 2022, 7 pages.

(Continued)

*Primary Examiner* — Kevin R Barss
(74) *Attorney, Agent, or Firm* — Hayes Soloway P.C.

(57) ABSTRACT

A pipe drilling device includes a casing having a divided structure and externally fitted to a fluid pipe in a sealed manner, a process valve including a process valve body that comes into contact with and separates from a recessed valve seat portion provided inside a neck portion of the casing, a drilling machine including a cutter that is inserted into the casing and configured for drilling the fluid pipe in an uninterrupted flow state, and a cylindrical portion that is movable to open and close an opening of the recessed valve seat portion inside the neck portion.

18 Claims, 33 Drawing Sheets

(56) References Cited

U.S. PATENT DOCUMENTS

| | | | | |
|---|---|---|---|---|
| 5,893,686 A * | 4/1999 | Weiler | ............... | F16L 41/06 |
| | | | | 137/315.42 |
| 6,615,859 B2 * | 9/2003 | Sato | ............... | F16L 41/06 |
| | | | | 408/1 R |
| 6,640,827 B1 * | 11/2003 | McClure | ............... | F16L 41/06 |
| | | | | 408/67 |
| 7,552,742 B2 * | 6/2009 | Dole | ............... | F16L 41/06 |
| | | | | 285/197 |
| 8,695,626 B2 * | 4/2014 | Murphy | ............... | F16K 3/30 |
| | | | | 137/317 |
| 8,899,254 B1 * | 12/2014 | Weiler | ............... | F16L 41/06 |
| | | | | 81/53.2 |
| 9,719,621 B2 * | 8/2017 | Yoneda | ............... | F16L 41/06 |
| 10,473,560 B2 * | 11/2019 | Nelson | ............... | G01N 1/08 |

FOREIGN PATENT DOCUMENTS

| | | | | |
|---|---|---|---|---|
| JP | 60-53411 | 4/1985 | ............ | B23B 41/08 |
| JP | 3-272388 | 12/1991 | ............ | F16L 41/04 |
| JP | 9-38813 | 2/1997 | ............ | B23B 41/08 |
| JP | 2000-28058 | 1/2000 | ............ | F16L 21/08 |
| JP | 2013-59822 | 4/2013 | ............ | B23B 41/08 |

OTHER PUBLICATIONS

International Search Report (with English translation) and Written Opinion issued in PCT/JP2020/037707, dated Dec. 15, 2020, 11 pages.

* cited by examiner

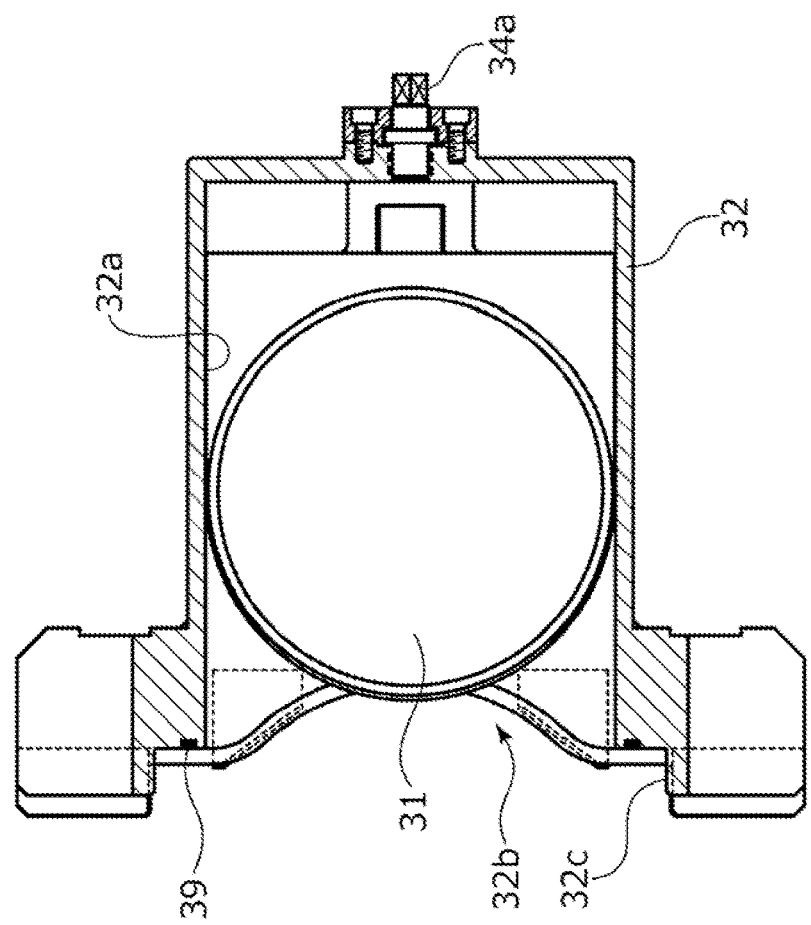
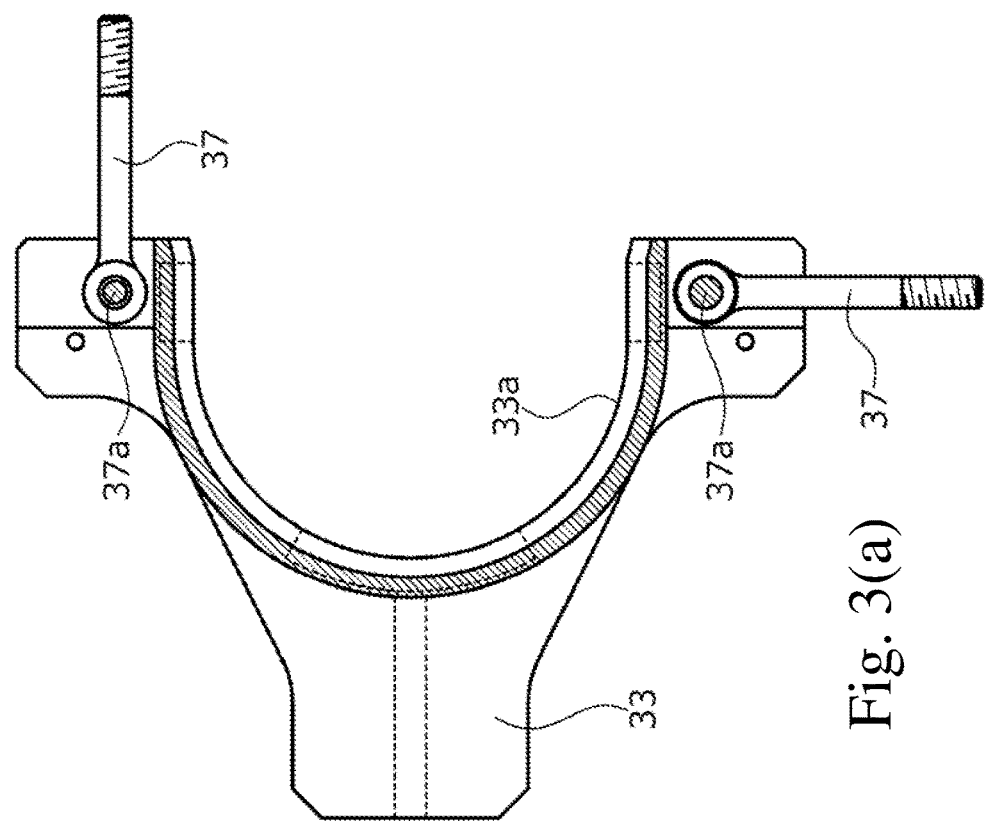
Fig. 3(a)
Fig. 3(b)

PIPE DRILLING DEVICE

TECHNICAL FIELD

The present invention relates to a pipe drilling device including a casing that has a divided structure and is externally fitted to a fluid pipe in a sealed manner, a process valve including a process valve body that opens and closes the inside of the casing, and a drilling machine that drills, machines, or cuts the fluid pipe inside the casing in an uninterrupted flow state.

BACKGROUND ART

In the related art, there is a pipe drilling device in which a casing (divided T-shaped pipe) having a divided structure is externally fitted to a fluid pipe which has been already installed in a sealed manner, a drilling machine is connected to an open end portion of a neck portion forming the casing, a process valve provided in the casing temporarily closes the inside of the neck portion of the casing in a sealed manner after the drilling machine drills the fluid pipe inside the casing, and instead of the drilling machine after drilling, a pipe connecting member is connected to the open end portion of the casing (for example, refer to Patent Citation 1).

CITATION LIST

Patent Literature

Patent Citation 1: JP 2000-28058 A (Page 3, FIG. 3)

SUMMARY OF INVENTION

Technical Problem

However, in Patent Citation 1, chips generated when the drilling machine drills a pipe wall of the fluid pipe enter the neck portion of the casing to stay in a valve seat portion of an inner surface of the neck portion, the valve seat portion coming into contact with the process valve body that opens and closes the neck portion, and the chips interfere with a contact portion between the process valve body and the valve seat portion, thereby causing a defect problem such as inability to maintain sealing performance by the process valve. Particularly, in order to obtain high adhesion with the process valve body, the valve seat portion having a recess shape into which a peripheral edge portion of the process valve body can be inserted is formed in the inner surface of the neck portion, and chips are likely to stay in such a valve seat portion having a recess shape to impair sealing performance, which is a high concern.

The present invention has been made in view of such a problem, and an object of the present invention is to provide a pipe drilling device in which a recessed valve seat portion formed in an inner surface of a neck portion can come into contact with a process valve body in a clean state without being subjected to a defect caused by the entering of chips generated by drilling, so that high sealing performance can be maintained.

Solution to Problem

In order to solve the above problem, a pipe drilling device according to the present invention includes: a casing having a divided structure and externally fitted to a fluid pipe in a sealed manner; a process valve including a process valve body that comes into contact with and separates from a recessed valve seat portion provided inside a neck portion of the casing; a drilling machine including a cutter that is inserted into the casing and configured for drilling the fluid pipe in an uninterrupted flow state; and a cylindrical portion that is movable to open and close an opening of the recessed valve seat portion inside the neck portion. According to the aforesaid feature of the present invention, since the opening of the recessed valve seat portion inside the neck portion of the casing is closed by the cylindrical portion, chips generated by the drilling of the fluid pipe inside the casing can be prevented from entering the recessed valve seat portion. Therefore, the process valve body can come into contact with the recessed valve seat portion which is clean and in which the cylindrical portion is opened, and the casing can be sealed.

The cylindrical portion may be disposed to be slidable along an inner surface of the neck portion. to this feature, since the cylindrical portion slides along the inner surface of the neck portion, the accuracy of movement of the cylindrical portion can be improved, and the recessed valve seat portion can be reliably opened and closed.

The pipe drilling device may further include a seal component provided in an outer peripheral portion of the cylindrical portion on a side opposite to a fluid pipe side with respect to the recessed valve seat portion and configured to seal a gap between the outer peripheral portion of the cylindrical portion and an inner surface of the neck portion. According to this feature, since the gap between the outer peripheral portion of the cylindrical portion and the inner surface of the neck portion is sealed with the seal component, drilling can be performed in an uninterrupted flow state.

A protrusion portion protruding in a radially inward direction may be formed in an inner peripheral portion in the vicinity of an opening end of the cylindrical portion. According to this feature, due to the protrusion portion, chips staying in the inner peripheral portion of the cylindrical portion can stay therein without falling therefrom.

The drilling machine may include an accommodation cylinder that accommodates the cutter and that is attached to and detached from the neck portion of the casing, and the cylindrical portion may be formed by a leading end portion of the accommodation cylinder. According to this feature, the cylindrical portion at a leading end of the accommodation cylinder can open and close the opening of the recessed valve seat portion at the same time the accommodation cylinder is attached to and detached from the neck portion.

A discharge port which discharges chips together with a fluid inside the casing may be formed in the neck portion on a side of the fluid pipe with respect to the cylindrical portion. According to this feature, the chips generated during drilling can be discharged to the outside via the discharge port formed on a base end portion side upstream of the recessed valve seat portion, without the chips approaching the recessed valve seat portion.

A communication port communicating with a discharge port which discharges chips together with a fluid inside the casing may be formed in the cylindrical portion. According to this feature, the chips which have entered the cylindrical portion can be smoothly discharged to the outside via the communication port and the discharge port.

The cylindrical portion may be provided with an engaging portion that enables the cylindrical portion to be connected to and released from the cutter. According to this feature, the cutter and the cylindrical portion can be easily connected to or released from each other only by moving the cutter.

The cylindrical portion may be provided with a sweeping portion that enters and comes out from the recessed valve seat portion as the cylindrical portion moves. According to this feature, even when foreign matter such as chips enters the recessed valve seat portion, the foreign matter can be discharged to outside of the recessed valve seat portion.

The cylindrical portion may be a hole saw forming the cutter. According to this feature, the hole saw which is a part of the cutter can be used to simplify the configuration of the cylindrical portion.

The cylindrical portion may be a suction pipe that communicates with an inside and an outside of the neck portion of the casing so as to be openable and closable. According to this feature, foreign matter such as chips inside the casing can be discharged to the outside through the suction pipe leading to the inside and the outside of the casing.

An inside surface forming the recessed valve seat portion may be formed as a tapered surface that is open toward the opening of the recessed valve seat portion. According to this feature, since the fluidity of the fluid in the recessed valve seat portion can be increased, chips in the recessed valve seat portion can flow out to the outside of the recessed valve seat portion along the tapered surface without staying therein.

An inside surface forming the recessed valve seat portion may be formed to be inclined with respect to a vertical direction. According to this feature, since the fluidity of the fluid in the recessed valve seat portion can be increased, chips in the recessed valve seat portion can flow out to the outside of the recessed valve seat portion along the inside surface which is inclined, without staying therein.

The process valve may include a process valve casing that extends substantially vertically downward to be able to accommodate the process valve body. According to this feature, chips can be lowered and introduced into the process valve casing without staying in the recessed valve seat portion.

BRIEF DESCRIPTION OF DRAWINGS

FIG. 3A is a side sectional view showing an accommodation member of a process valve, and FIG. 3B is a side sectional view showing an attachment member of the process valve.

DESCRIPTION OF EMBODIMENTS

Figure 1:
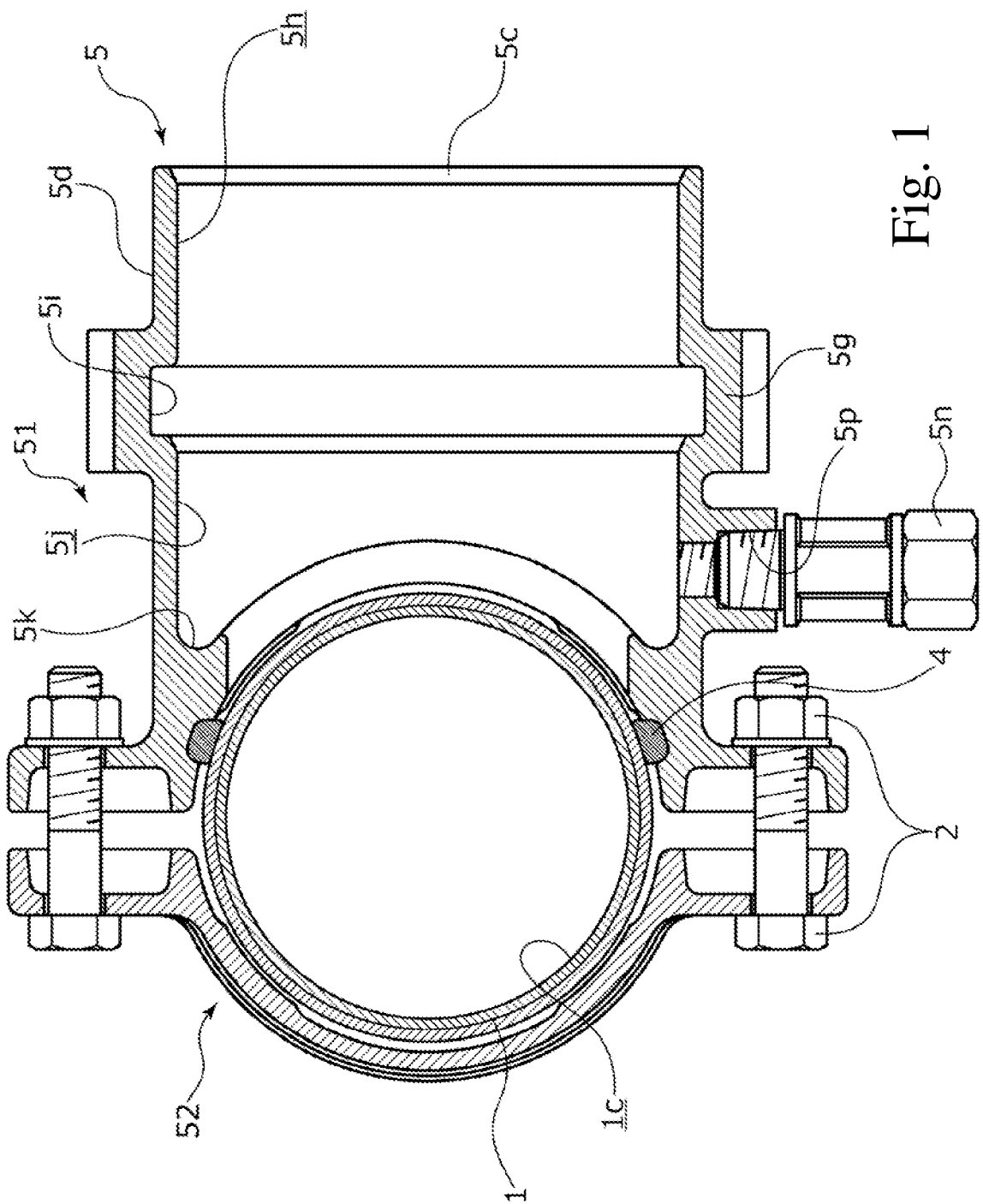
FIG. 1 is a front sectional view showing a casing forming a pipe drilling device according to a first embodiment of the present invention.

Modes for implementing a pipe drilling device according to the present invention will be described below based on first to third embodiments and first to seventh modified examples.

First Embodiment

A pipe drilling device and an installation method thereof according to a first embodiment of the present invention will be described with reference to FIGS. 1 to 10. As shown in FIGS. 4 to 7, the pipe drilling device according to the present invention mainly includes a casing 5 that is externally fitted to a fluid pipe 1 which has been already installed; a process valve 3 that opens and closes the inside of the casing 5; and a drilling machine 7 that drills the fluid pipe 1 inside the casing 5. In the present embodiment, as the pipe drilling device and the installation method thereof, a series of flows from when a predetermined location on the fluid pipe 1 which has been already installed as a pipeline forming member is drilled inside the casing 5 until a fluid control valve 10 is installed inside the casing 5 in an uninterrupted flow state will be described. Incidentally, a fluid in the fluid pipe 1 is clean water in the present embodiment, but may be, for example, industrial water, agricultural water, waste water, or a liquid other than water, or may be a gas or a gas-liquid mixture of a gas and a liquid.

Figure 2:
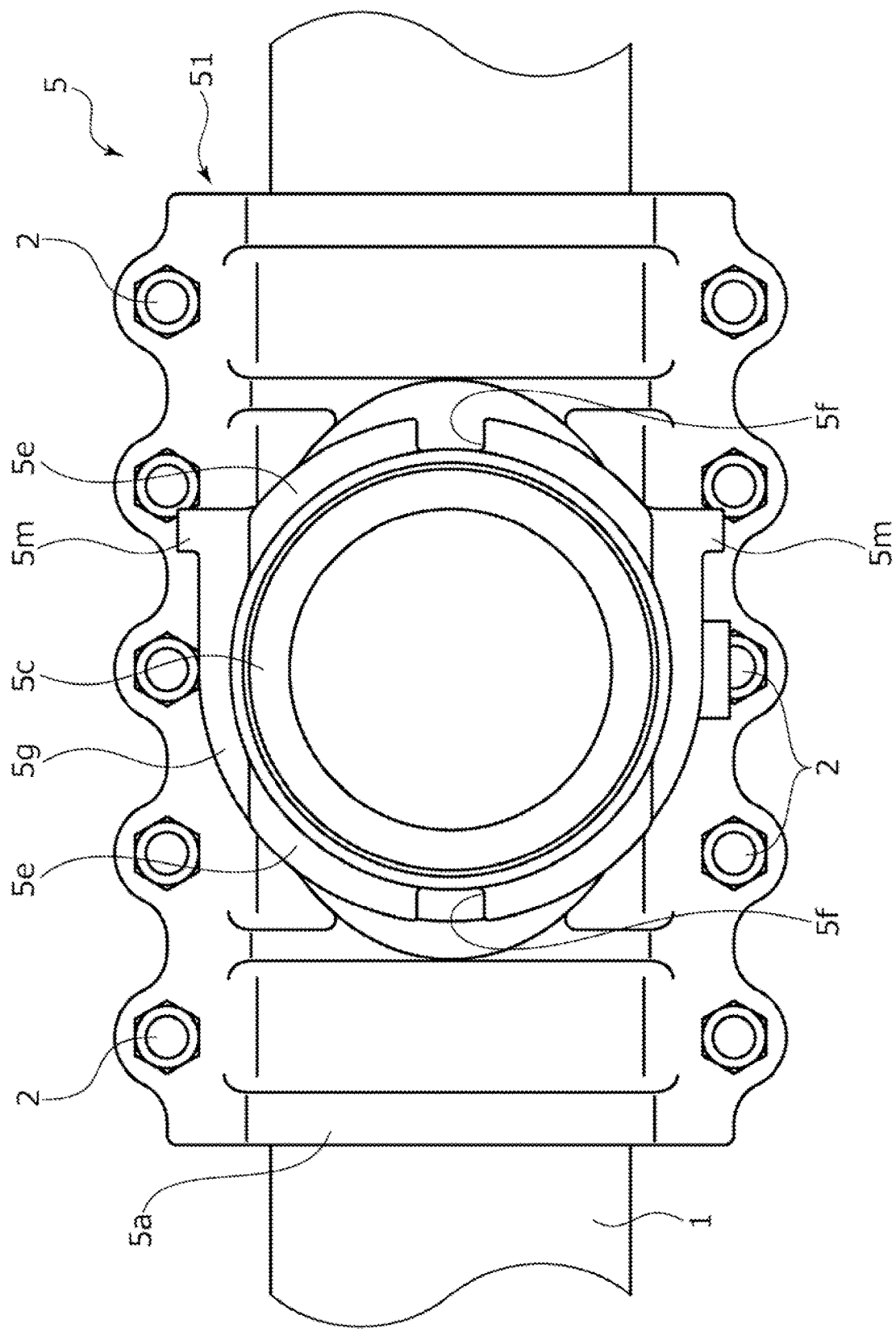
FIG. 2 is a side view of the same casing as in FIG. 1.

The fluid pipe 1 of the present embodiment is a ductile cast iron pipe, and as shown in FIGS. 1 and 2, is formed as a straight pipe having a substantially circular shape in a sectional view. In the present embodiment, the fluid pipe 1 is buried under a shallow layer of ground which is not shown, and a pipeline direction thereof is disposed in a substantially horizontal direction. Incidentally, the fluid pipe according to the present invention may be made of metals such as other cast irons and steel, or made of concrete, vinyl chloride, polyethylene, polyolefin, or the like. Further incidentally, an inner peripheral surface of the fluid pipe may be covered with an epoxy resin layer, mortar, a plating, or the like, or the inner peripheral surface of the fluid pipe may be covered with an appropriate material by powder painting. In addition, the fluid pipe 1 may be exposed, and the pipeline direction thereof may be a substantially perpendicular direction or may be inclined.

Here, the fluid pipe of the present invention is not limited to a straight pipe as in the present embodiment, and may be formed as, for example, a deformed pipe. Here, the deformed pipe is a general term for pipes at least partially including various deformed portions such as a curved pipe portion, a branch portion, a cross-shaped portion, a different diameter portion, a coupling ring portion, a short pipe portion, and a drainage portion.

First, as shown in FIGS. 1 and 2, after an outer surface of the fluid pipe 1 is cleaned, the outer surface being the location of attachment of the pipe drilling device according to the present invention, the casing 5 forming the pipe drilling device is externally fitted in a sealed manner via a seal member 4 that seals a drilled portion to be described later of the fluid pipe 1. The casing 5 of the present embodiment has a divided structure which is divided into a plurality of divided bodies in the horizontal direction, and in the present embodiment, mainly includes a first divided body 51 forming one side portion and a second divided body 52 forming the other side portion. Incidentally, the casing 5 is not limited to the divided structure in the present embodiment, and for example, may be divided in an upward and downward direction, and the number of divisions also may be a predetermined number equal to 3 or more. In addition, in the present embodiment, the divided casings are joined to each other in a sealed state with fastening members 2 formed of bolts and nuts, but are not limited thereto, and may be joined to each other, for example, by welding.

As shown in FIGS. 1 to 3, the first divided body 51 of the casing 5 includes a pipeline casing portion 5a extending along the fluid pipe 1 in the pipeline direction, and a neck portion 5d having a cylindrical shape which branches at substantially the center of the pipeline casing portion 5a to extend in the horizontal direction, namely, not in the upward and downward direction but in a lateral direction at an actual site, and which includes an open end portion 5c that is open in a branch direction and an opening portion 5b that is open laterally. The first divided body 51 is formed in a substantially T shape in a plan view.

Further, as shown in FIG. 2, the neck portion 5d includes a pair of collar portions 5e and 5e that have a flange shape and protrude in a radially outward direction toward the pipeline direction of the fluid pipe 1, and cutout portions 5f and 5f as engaging portions that are recessed in a radially inward direction at the center positions in a circumferential direction of the collar portions 5e.

A peripheral side portion having a cylindrical shape of the neck portion 5d is provided with a thick wall portion 5g of which the outer surface protrudes in a radial direction, and the thick wall portion 5g includes the opening portion 5b that is open toward one side in the pipeline direction of the fluid pipe 1. As shown in FIG. 1, the opening portion 5b is open in a substantially rectangular shape that is long longitudinally in a side view, and as will be described later, is formed such that a process valve body 31 of a process valve 3 can be inserted thereinto.

In addition, as shown in FIG. 1, an inner peripheral portion of the neck portion 5d includes an inner peripheral surface 5h that is formed as a curved surface having a substantially circular shape in a side view and is straight in the horizontal direction; a recessed portion 5i as a recessed valve seat portion that is recessed in the radially outward direction along the circumferential direction at the same position as that of the opening portion 5b in an axial direction of the neck portion 5d; an inner peripheral surface 5j that is formed closer to a base end side of the neck portion 5d than the recessed portion 5i, and is formed to be substantially flush with the inner peripheral surface 5h on a leading end side of the neck portion 5d; and a step portion 5k that protrudes in the radially inward direction on the base end side of the inner peripheral surface 5j.

Figure 4:
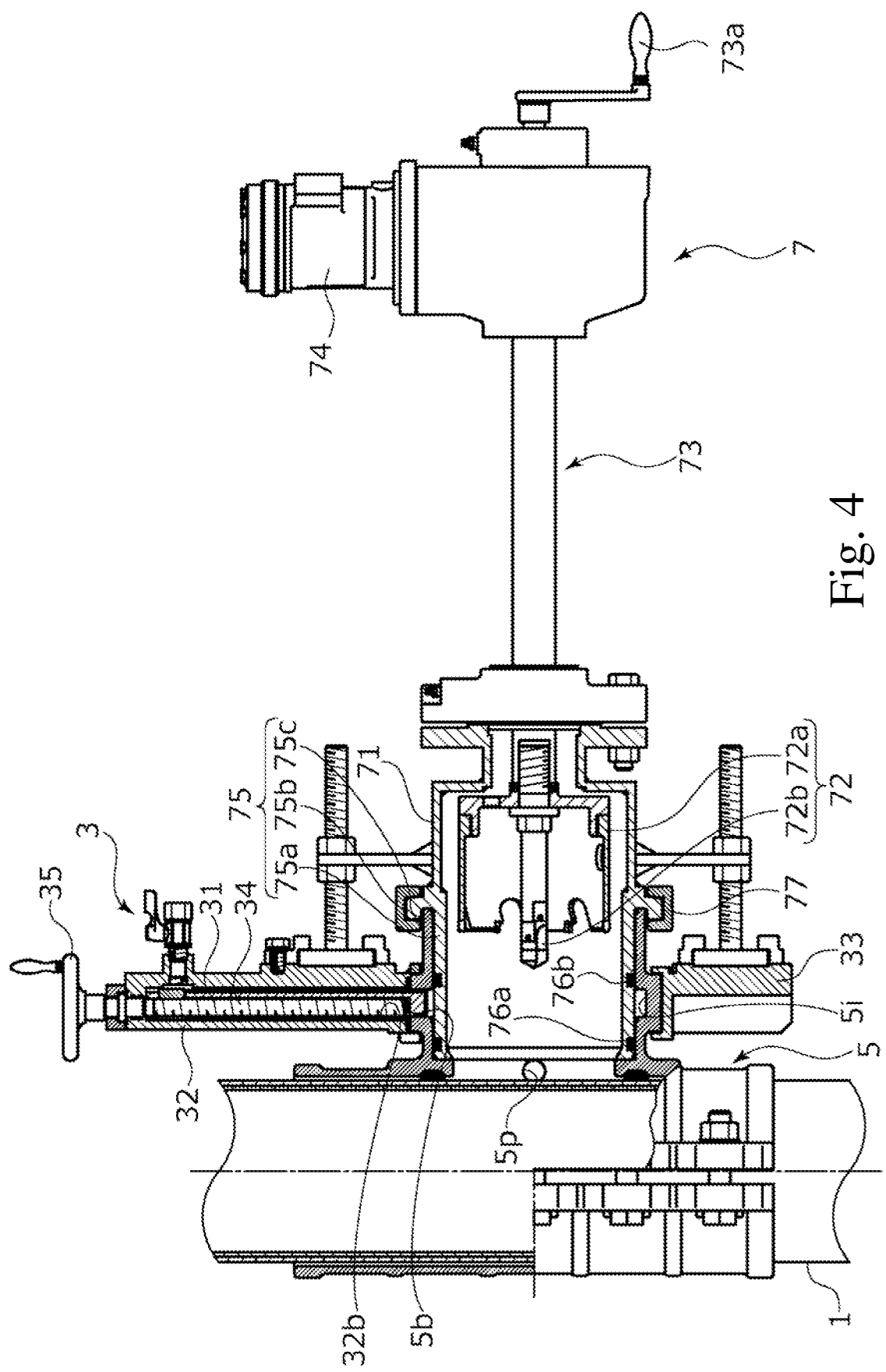
FIG. 4 is a partial sectional plan view showing a drilling machine assembled to the casing.

Next, as shown in FIGS. 3 and 4, the process valve 3 is connected to the opening portion 5b of the neck portion 5d in a sealed manner. The process valve 3 mainly includes the process valve body 31 that is slidable to open and close the inside of the casing 5; an accommodation member 32 as a process valve casing including an accommodation inner portion 32a that accommodates the process valve body 31 so as to be slidable in the horizontal direction, and an open portion 32b that is a one open end on a side of the accommodation member 32; and an attachment member 33 that has a curved inner peripheral surface to be externally fittable to the neck portion 5d, together with the accommodation member 32.

Figure 6:
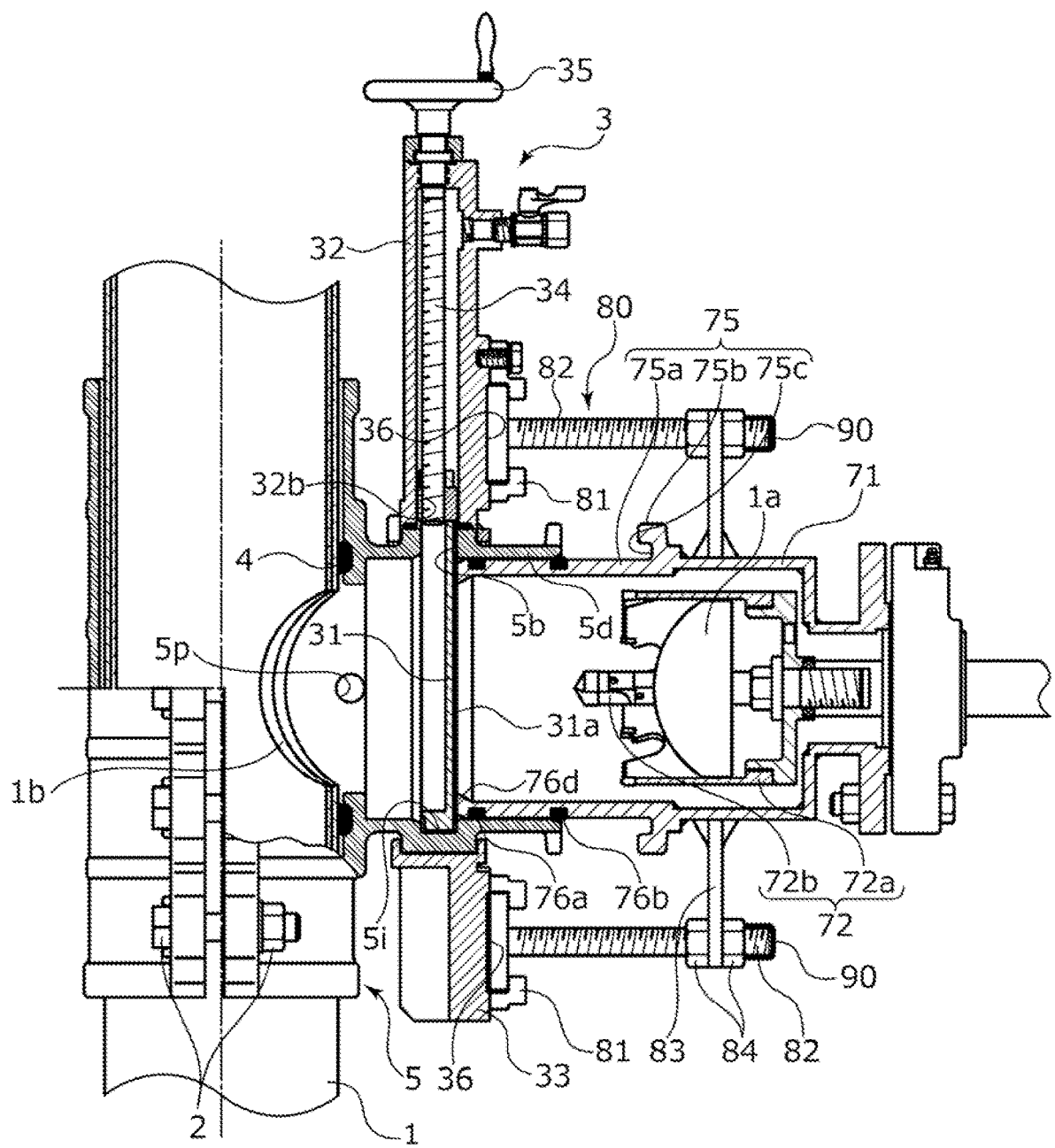
FIG. 6 is a partial sectional plan view showing a situation after drilling by the drilling machine.

As shown in FIGS. 3, 4, and 6, the accommodation member 32 includes a shaft member 34 that extends in the horizontal direction in a state where the shaft member 34 is pivotally supported so as to rotate and so as not to move back and forth. The process valve body 31 is screwed with the shaft member 34, and when an operation member 35 attached to a leading end portion 34a of the shaft member 34 is operated to rotate, the leading end portion 34a protruding outward from the accommodation member 32, the process valve body 31 is slidable with respect to the accommodation member 32. In addition, a side surface of the accommodation member 32 and a side surface of the attachment member 33 are provided with support portions 36 and 36 that support a pressing unit 80 and a hydraulic rod 60 to be described later.

In addition, as shown in FIG. 6, a side surface of the process valve body 31, which faces the branch direction, is covered with a seal member 31a having a plate shape, and a peripheral edge portion of the seal member 31a comes into surface contact with a side wall 5r of the recessed portion 5i, so that the inside of the casing 5 can be closed in a sealed manner. As described above, since the inner surface of the neck portion 5d is provided with the recessed portion 5i as a recessed valve seat portion, the pressure in the fluid pipe 1 can be used to cause a peripheral edge portion of the process valve body 31 to come into surface contact with the side wall 5r of the recessed portion 5i. Therefore, the sealing performance can be improved. Further, as described above, since the peripheral edge portion of the process valve body 31 comes into surface contact with the recessed portion 5i formed in the inner surface of the neck portion 5d, the process valve body 31 can be formed in a thin plate shape.

Therefore, the extension of the casing 5 in the branch direction, namely, the stroke of the drilling machine 7 can be shortened, and the accuracy of drilling can be improved without the drilling machine 7 being eccentric. In addition, since the process valve body 31 is made in a thin plate shape, a reduction in cost can be achieved by the downsizing of the process valve body 31 and the casing 5, and since the accuracy of drilling is high, the insertion of a plug 11 of the fluid control valve 10 to be described later is properly performed, and water stoppage and controllability of the fluid can be improved.

For details of a procedure of attaching the process valve 3, first, the accommodation member 32 is disposed on an outer surface of the neck portion 5d at a position where the open portion 32b thereof communicates with the opening portion 5b of the neck portion 5d. At this time, as shown in FIGS. 2 and 3B, the thick wall portion 5g of the neck portion 5d includes a pair of protrusion portions 5m as positioning portions protruding in a width direction of the opening portion 5b. Inner peripheries of a pair of engaging portions 32c which have a substantially L shape in a side view and a substantially U shape in a view seen in the pipe axis direction and are formed above and below the open portion 32b of the accommodation member 32 engage with the protrusion portion 5m, so that the accommodation member 32 is positioned at the position where the open portion 32b thereof and the opening portion 5b of the neck portion 5d communicate with each other. As described above, since the process valve 3 can be accurately attached to the opening portion 5b due to the protrusion portions 5m, the function of the process valve 3 which opens and closes the inside of the casing 5 can be maintained.

Next, the attachment member 33 is disposed on the outer surface of the neck portion 5d at a position on a side opposite to the accommodation member 32 with the neck portion 5d interposed therebetween. At this time, as shown in FIGS. 2 and 3A, an inner periphery of an engaging portion 33a which has a substantially U shape in a side view and is formed in the attachment member 33 engages with the thick wall portion 5g of the neck portion 5d, so that the attachment member 33 is positioned at an attachment position on the side opposite to the accommodation member 32 with the neck portion 5d interposed therebetween.

As described above, since the process valve 3 attached to the opening portion 5b can extend in the pipeline direction of the fluid pipe 1, a region beside the fluid pipe 1 can be used as a region for attachment of the process valve 3, and the region is easily secured.

Next, the accommodation member 32 and the attachment member 33 are fastened to each other. As shown in FIGS. 3A and 3B, base ends 37a of bolts 37 are connected to both end portions of the attachment member 33 in a hinge manner, and the bolts 37 are rotated toward the accommodation member 32 to be inserted into gap portions formed in outer peripheral portions of the engaging portions 32c of accommodation member 32, and nuts 38 are screwed with leading ends of the bolts 37, so that the accommodation member 32 and the attachment member 33 are fastened to each other.

In addition, a seal member 39 is disposed in the accommodation member 32 to surround a periphery of the open portion 32b, and the seal member 39 is brought into close contact with a peripheral edge of the opening portion 5b by the fastening of the fastening members, so that the opening portion 5b and the open portion 32b are sealed. As described above, since the process valve 3 is installed in the opening portion 5b provided in the neck portion 5d, the attachment position of the drilling machine 7 to be described later can be brought as close as possible to the fluid pipe 1. Therefore, the extension stroke by which the drilling machine 7 approaches the fluid pipe 1 can be shortened, and as a result, the drilling machine 7 can be downsized, reduced in weight, and reduced in cost (refer to FIG. 4).

Next, as shown in FIG. 4, the drilling machine 7 is connected to the open end portion 5c of the neck portion 5d in a sealed manner. The drilling machine 7 mainly includes an attachment flange cylinder 71 as an accommodation cylinder; a cutter 72 that drills the fluid pipe 1, a drive motor 74 that rotates the cutter 72 inside the attachment flange cylinder 71; and an advancing and retreating mechanism 73 that causes the cutter 72 to advance and retreat in the horizontal direction. The cutter 72 of the present embodiment includes a hole saw 72a that is formed in a bottomed cylindrical shape having a smaller diameter than that of the fluid pipe 1, and includes cutting edges at a leading end thereof along the circumferential direction, and a center drill 72b that is disposed coaxially with a rotation axis of the hole saw 72a to protrude ahead of the cutting edges. Incidentally, the cutter 72 is disposed concentrically with the open end portion 5c of the neck portion 5d of the casing 5, and can be inserted into the neck portion 5d of the casing 5 from an open end portion 5c side to advance to at least a position where the cutter 72 penetrates through a pipe wall of the fluid pipe 1.

Prior to the attachment of the drilling machine 7, as shown in FIGS. 4 and 6, first, as insertion means for inserting the drilling machine 7 into the casing 5, the pressing unit 80 is attached to the support portions 36 and 36 of the process valve 3. The pressing unit 80 mainly includes support plates 81 each being connected to the support portion 36 of the process valve 3; male screw parts 82 each being fixedly supported by the support plate 81; a pressing piece 83 through which the male screw parts 82 are inserted; and female screw parts 84 which are screwed with the male screw parts 82 to interpose the pressing piece 83 therebetween. The pressing unit 80 is configured such that the female screw parts 84 are screwed with the male screw parts 82 to cause the pressing piece 83 to move in an axial direction of the male screw parts 82, so that the attachment flange cylinder 71 of the drilling machine 7 fitted to the pressing piece 83 is attachable to or removable from the neck portion 5d of the casing 5. In addition, it is preferable that a cap 90 which restricts movement of the attachment flange cylinder 71 is attached to a leading end side of the male screw part 82 to position the attachment flange cylinder 71 when the attachment flange cylinder 71 moves to a pullout side. The cap 90 may have a U-shape in a sectional view, may include a female screw in an inner surface thereof, or may be a part forming the pressing unit 80.

A procedure of attaching the drilling machine 7 will be described. The attachment flange cylinder 71 of the drilling machine 7 is inserted into the neck portion 5d by the pressing unit 80 described above, and a recessed portion 75 formed at a leading end of the attachment flange cylinder 71 is fitted to the open end portion 5c of the neck portion 5d. More specifically, the recessed portion 75 of the attachment flange cylinder 71 includes an inner wall portion 75a internally fitted to a side wall of the open end portion 5c; an outer wall portion 75b externally fitted to the side wall of the open end portion 5c; and an inner bottom portion 75c forming a base end portion of the inner wall portion 75a and the outer wall portion 75b. When the side wall of the open end portion 5c is interposed between the inner wall portion 75a and the outer wall portion 75b, and the inner bottom portion 75c comes into contact with an end surface of the open end portion 5c, the attachment flange cylinder 71 of the drilling machine 7 is fitted in a state where the attachment flange cylinder 71 is positioned in the open end portion 5c of the neck portion 5d. In addition, the inner wall portion 75a forms a leading end portion of the attachment flange cylinder 71, is formed in a substantially cylindrical shape having an outer peripheral surface with a slightly smaller diameter than that of the inner peripheral surfaces 5h and 5j of the neck portion 5d, and is inserted into the neck portion 5d to a position where the inner wall portion 75a covers an opening of the recessed portion 5i. Namely, the inner wall portion 75a of the attachment flange cylinder 71 provided in the drilling machine 7 forms a cylindrical portion of the present invention.

Further, since the inner wall portion 75a is disposed to be slidable along the inner peripheral surfaces 5h and 5j of the neck portion 5d, the accuracy of movement of the inner wall portion 75a can be improved, and the recessed portion 5i can be reliably closed or opened.

In addition, seal members 76a and 76b which have an annular shape and are separated from each other in the horizontal direction are provided on the outer peripheral surface of the inner wall portion 75a. The seal members 76a and 76b come into close contact with the inner peripheral surfaces 5h and 5j of the neck portion 5d across the recessed portion 5i in the axial direction of the neck portion 5d, respectively, so that foreign matter is prevented from entering the recessed portion 5i in the fitted state, and the attachment flange cylinder 71 of the drilling machine 7 and the neck portion 5d of the casing 5 are sealed. Here, the seal member 76b provided on a side opposite to a fluid pipe 1 side with respect to the recessed portion 5i forms a seal component of the present invention.

Further, in the fitted state, an engaging member 77 having a divided structure and including an inner peripheral portion which has a substantially U shape in a sectional view and engages with the outer wall portion 75b is assembled along an outer periphery of the outer wall portion 75b. Incidentally, the engaging member 77 may not necessarily be used.

Incidentally, work of connecting the process valve 3 to the opening portion 5b of the neck portion 5d and work of connecting the drilling machine 7 to the open end portion 5c of the neck portion 5d are not necessarily limited to being performed in the above-described order, and after the work of connecting the drilling machine 7 is performed, the work of connecting the process valve 3 may be performed, or the connection works may be performed at the same time.

Figure 5:
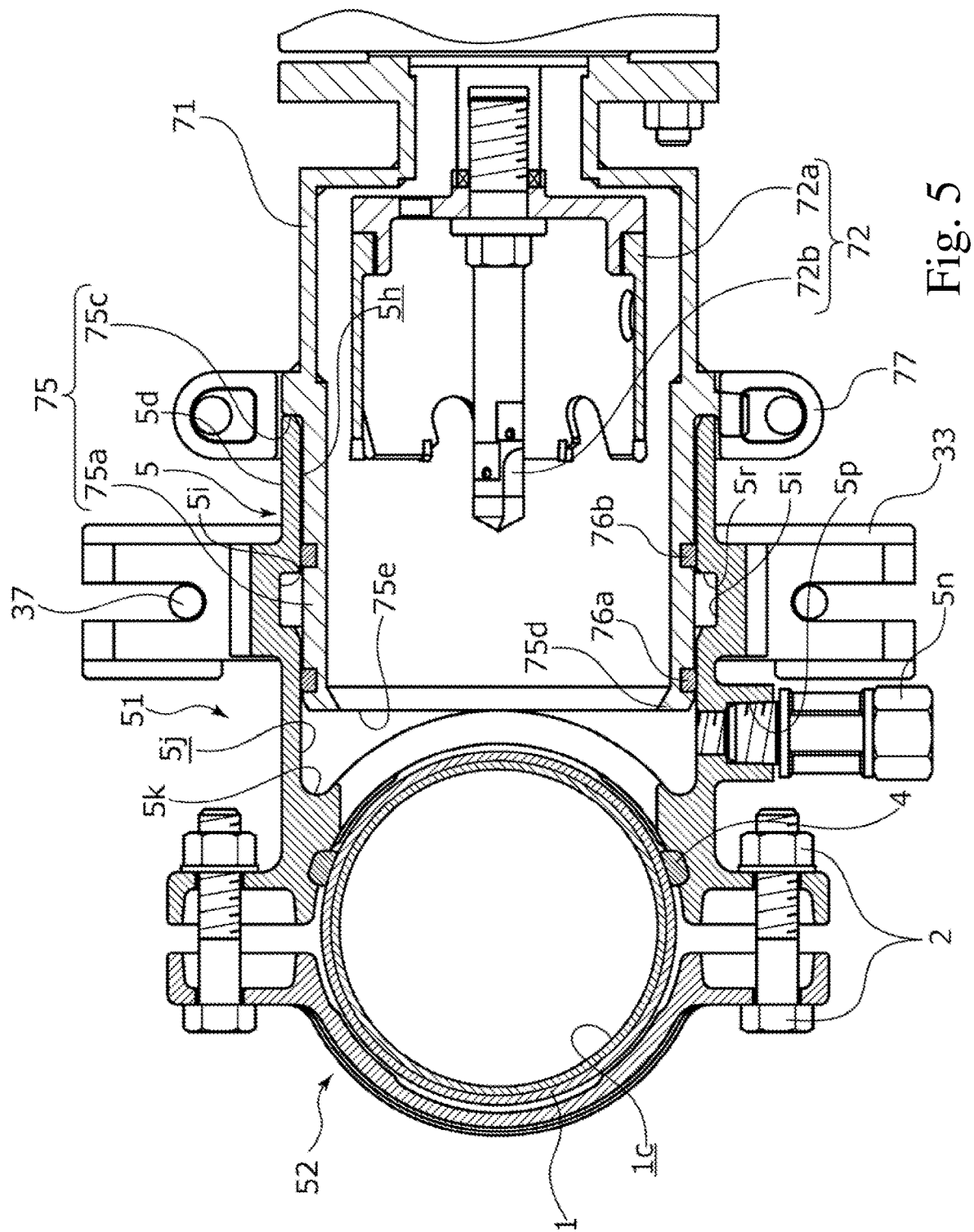
FIG. 5 is a partial sectional front view of the same as in FIG. 4.

Next, a step of drilling the fluid pipe 1 using the drilling machine 7 will be described. As shown in FIGS. 4 and 5, first, in a state where the process valve body 31 of the process valve 3 is disposed in the accommodation inner portion 32a of the accommodation member 32, and the inside of the casing 5 is opened, the drive motor 74 of the drilling machine 7 rotates the cutter 72, and a handle 73a forming the advancing and retreating mechanism 73 is operated to rotate to cause the cutter 72 to advance ahead, thus to drill the pipe wall of the fluid pipe 1 in an uninterrupted flow state.

At this time, particularly in a branch in the horizontal direction as in the present embodiment, a part of chips of the fluid pipe 1 generated during drilling enters the neck portion 5d; however, since an outer peripheral portion of the inner wall portion 75a, which is closer to the fluid pipe 1 side than the recessed portion 5i, is provided with the seal member 76a which seals a gap between the inner surface of the neck portion 5d and the outer peripheral portion in the circumferential direction, the chips can be blocked from entering the recessed portion 5i via the gap between the inner wall portion 75a and the neck portion 5d. The chips which have entered the neck portion 5d are deposited on or adhere to an inner surface of the inner wall portion 75a covering the recessed portion 5i. In addition, since an outer peripheral portion of the inner wall portion 75a, which is located on the side opposite to the fluid pipe 1 side with respect to the recessed portion 5i, is provided with the seal member 76b as a seal component, not only during drilling but also during operation of pulling the inner wall portion 75a after drilling, the seal member 76b can provide sealing, and drilling can be performed in an uninterrupted flow state.

In addition, since a protrusion portion 75d protruding radially inward is formed in a leading end portion of the inner wall portion 75a, not only during drilling but also when the attachment flange cylinder 71 is removed from the neck portion 5d after drilling, the chips deposited on or adhering to the inner surface of the inner wall portion 75a can stay on the inner surface of the inner wall portion 75a without falling to the inner peripheral surfaces 5h and 5j and the recessed portion 5i of the neck portion 5d.

Incidentally, a leading end surface 75e of the inner wall portion 75a of the present embodiment is formed in a flat shape, and a part of the leading end surface 75e comes into contact with the step portion 5k that is curvedly formed in the circumferential direction on the base end side inside the neck portion 5d of the casing 5, and the inner bottom portion 75c described above comes into contact with the open end portion 5c, so that the insertion of the inner wall portion 75a is completed.

Figure 10:
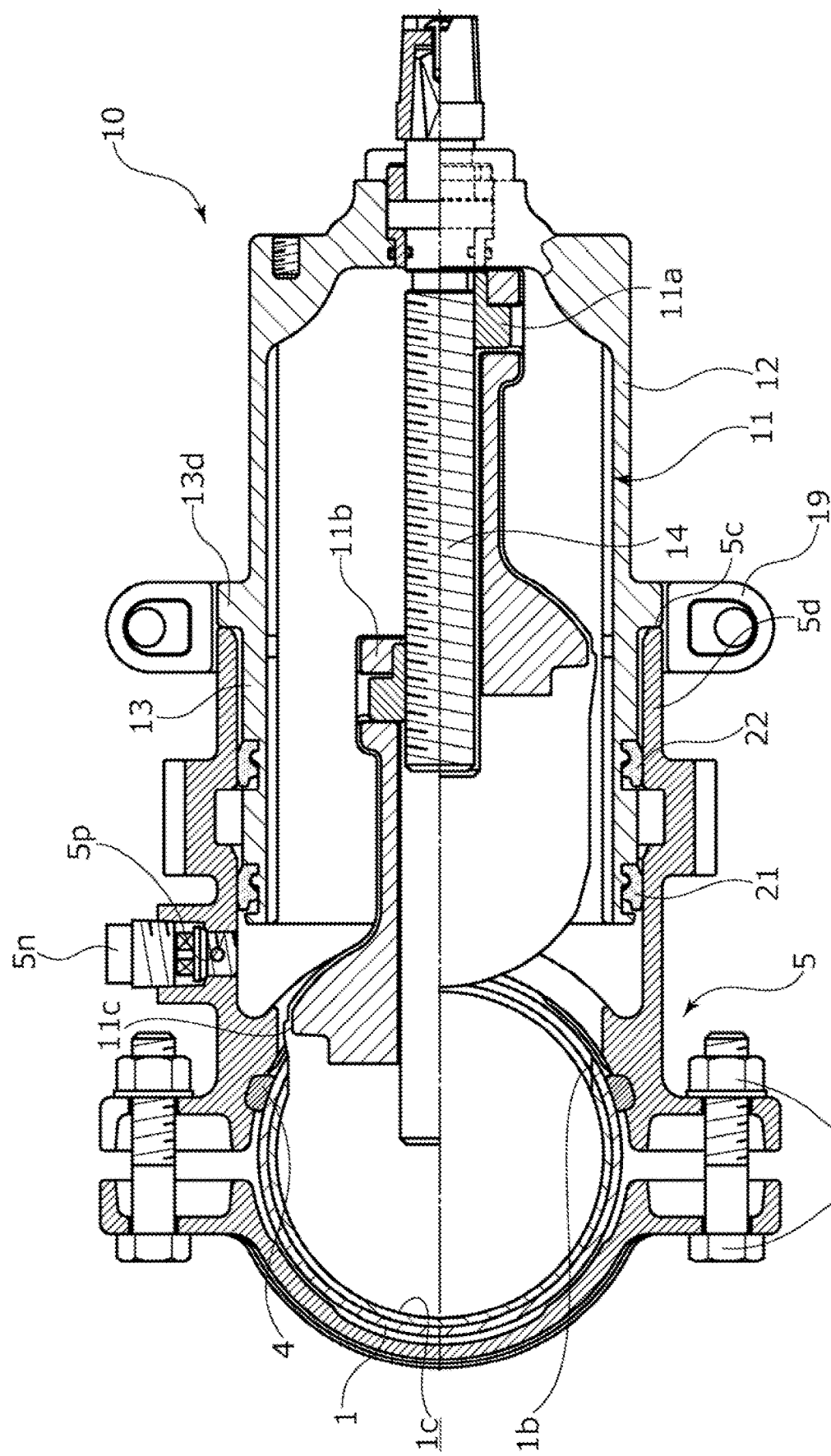
FIG. 10 is a partial sectional front view of the same as in FIG. 9.

In addition, in this case, for example, as a discharge port communicating with the inside and the outside of the casing 5, a female screw hole 5p is formed closer to the fluid pipe 1 side than the recessed portion 5i of the casing 5, namely, on the base end side of the neck portion 5d. A ball valve which is provided to be able to open and close the female screw hole 5p and is not shown is installed to discharge the chips generated during drilling to the outside, together with the fluid. In such a manner, the chips generated during drilling can be discharged to the outside via the female screw hole 5p formed on a base end portion side of the neck portion 5d, which is upstream of the recessed portion 5i, without the chips approaching a recessed portion 5i side. The ball valve described above is removed in an uninterrupted flow state after drilling, and the female screw hole 5p is sealed with an opening and closing bolt 5n as shown in FIG. 10 instead of the ball valve.

Figure 7:
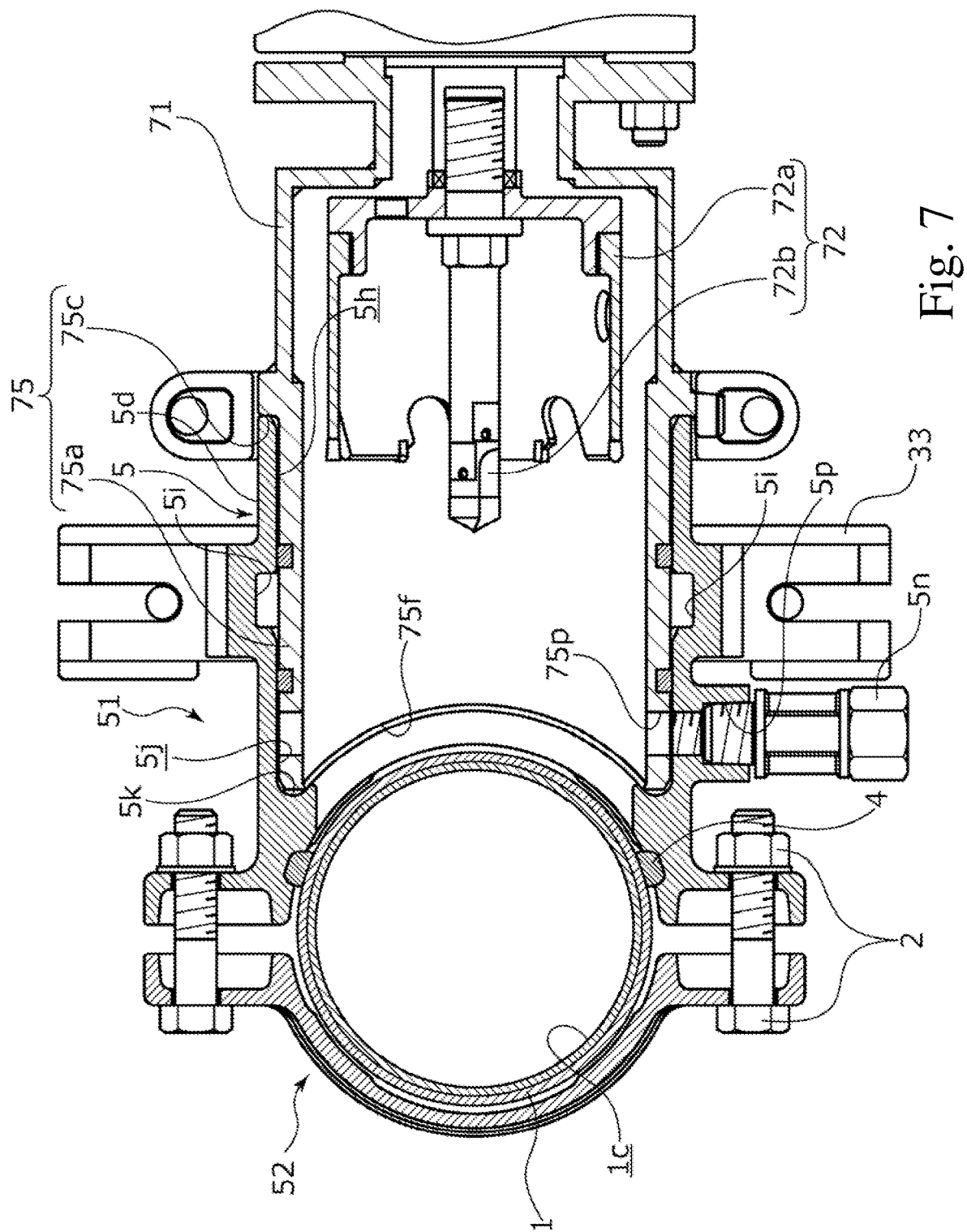
FIG. 7 is a front sectional view showing an attachment flange cylinder of a drilling machine in a modified example.

Incidentally, the discharge port for chips is not limited to the above configuration, and for example, as a modified example of the present embodiment, as shown in FIG. 7, a communication port 75p communicating with the female screw hole 5p may be formed in the inner wall portion 75a. In such a manner, the chips which have entered the neck portion 5d are discharged through the communication port 75p and the female screw hole 5p. In addition, a leading end surface 75f of the inner wall portion 75a of the present modified example is curvedly formed along the step portion 5k that is curvedly formed in the circumferential direction on the base end side inside the neck portion 5d, namely, the leading end surface 75f comes into contact with the entire periphery of the step portion 5k. In such a manner, the inner wall portion 75a is stably positioned at a location where the inner wall portion 75a closes the recessed portion 5i.

In addition, as shown in FIG. 6, when the fluid pipe 1 is cut by the cutter 72, a cut piece 1a separated from the fluid pipe 1 is held inside the hole saw 72a. Then, the cutter 72, together with the cut piece 1a, is pulled into the attachment flange cylinder 71, the inner wall portion 75a is pulled rearward from the recessed portion 5i, and the process valve body 31 of the process valve 3 closes the inside of the casing 5, so that work of drilling the fluid pipe 1 is completed. As described above, since the opening of the recessed portion 5i inside the neck portion 5d of the casing 5 is closed by the inner wall portion 75a, chips generated by the drilling of the fluid pipe 1 inside the casing 5 can be prevented from entering the recessed portion 5i. Therefore, the process valve body 31 can come into contact with the recessed portion 5i which is clean and in which the inner wall portion 75a is opened, and the casing 5 can be sealed. At this time, since the attachment position of the drilling machine 7 is close to the fluid pipe 1, and drilling work is performed in a state where the inner wall portion 75a of the attachment flange cylinder 71 and the inner peripheral surfaces 5h and 5j of the neck portion 5d are inserted into and fitted to each other, the drilling machine 7 is positioned as concentrically as possible with the casing 5, and even when there occurs deviation in parallelism of a connection surface between an attachment flange of a main body of the drilling machine 7 and the attachment flange cylinder 71, the influence on a drilled portion is minimized, and deviation in drilling is suppressed. Particularly, since the width of the process valve body 31 is made thin due to the fitting of the recessed portion 5i, the cost is suppressed, and the distance of the drilling machine 7 from the fluid pipe 1 is shortened, so that the misalignment of drilling is minimized, and disturbance in a flow passage can be suppressed. Due to the drilling, even when the plug 11 (valve body) of the fluid control valve 10 to be described later is inserted, drilling without misalignment can form a hole portion 1b that enables ideal fluid control.

Next, work of removing the drilling machine 7 is performed in a state where the process valve body 31 of the process valve 3 closes the inside of the casing 5 in a sealed manner. Incidentally, it is preferable that instead of the drilling machine 7, a discharger which discharges chips generated during drilling and is not shown is connected to the open end portion 5c of the neck portion 5d, and the chips remaining inside the casing 5 or the fluid pipe 1 are discharged to the outside by the discharger. Although not particularly shown, for example, a discharger can be applied which includes a cylindrical portion of which one end is open to be movable inside the casing 5 and of which the other end communicates with the outside of the casing 5, and an on-off valve portion which can open and close the inside of the cylindrical portion.

Next, work of removing the discharger is performed in a state where the process valve body 31 of the process valve 3 closes the inside of the casing 5, and instead of the discharger, the fluid control valve 10 which controls the fluid inside the pipe is connected to the open end portion 5c of the neck portion 5d.

Figure 8:
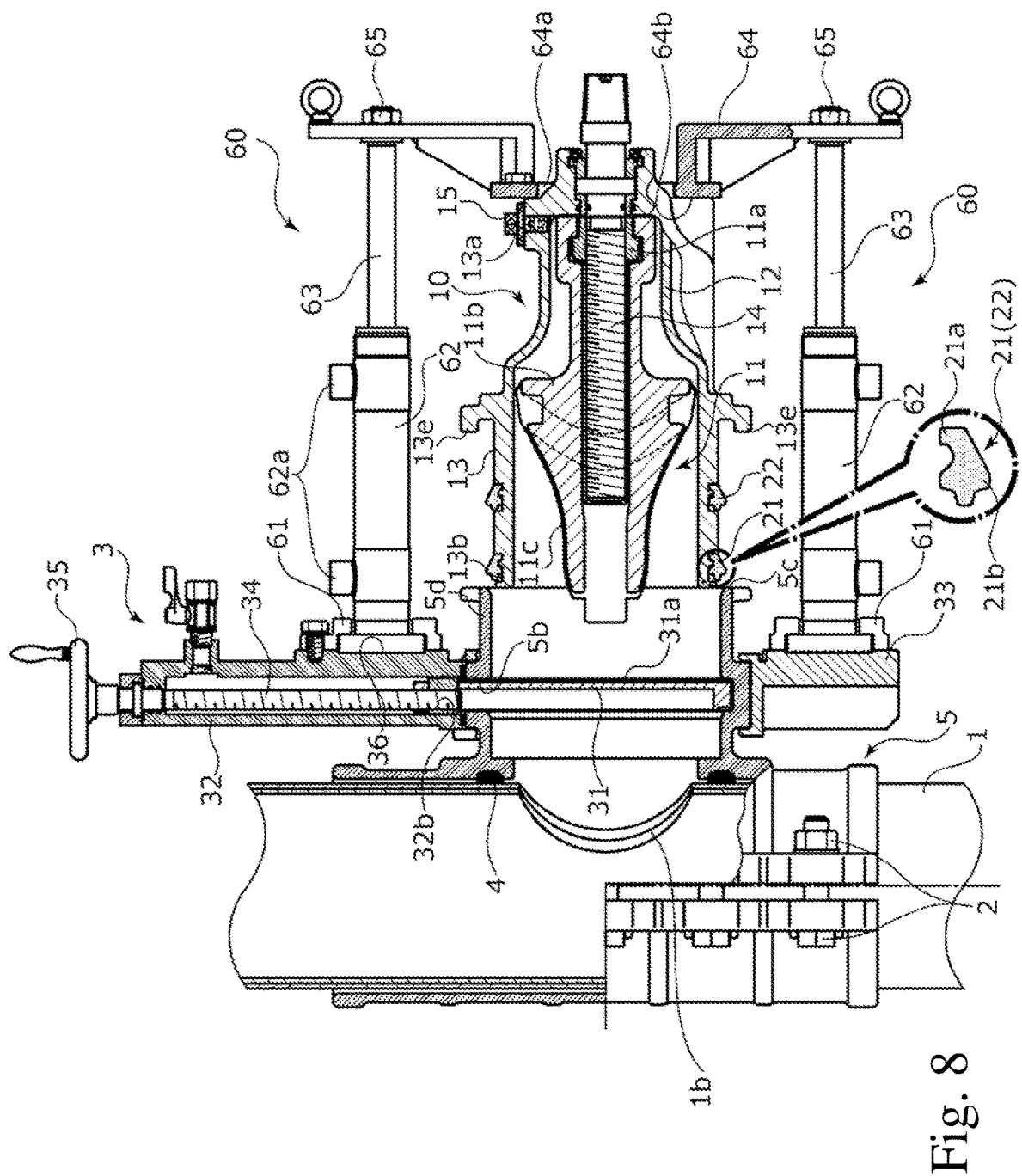
FIG. 8 is a partial sectional plan view showing a situation before installation of a fluid control valve.

As shown in FIG. 8, the fluid control valve 10 mainly includes the plug 11 (valve body) that passes through the hole portion 1b of the fluid pipe 1 which has been drilled, to be movable in the horizontal direction to open and close the inside of the pipe, and a valve casing 12 that accommodates the plug 11 so as to be movable in the horizontal direction, and includes a peripheral side portion 13 of which the leading end is open. The valve casing 12 includes a shaft member 14 that extends in the horizontal direction in a state where the shaft member 14 is pivotally supported so as to rotate and so as not to move back and forth. The plug 11 is screwed with the shaft member 14, and when an operation portion 14a of an end portion of the shaft member 14 is operated to rotate, the end portion protruding outward from the valve casing 12, the plug 11 is movable with respect to the valve casing 12 in an axial direction of the shaft member 14.

More specifically, the plug 11 mainly includes an internal thread piece 11a including a female screw which is screwed with the shaft member 14; a core portion 11b which is engaged with the internal thread piece 11a to operate in a follow-up manner; and a plug portion 11c which is made of an elastic material and has covered the entire outer surface of the core portion 11b. When the plug 11 moves into the pipe through the hole portion 1b of the fluid pipe 1 due to rotation of the shaft member 14 described above, and the plug portion 11c comes into close contact with the entire peripheries of the hole portion 1b and an inner peripheral surface 1c of the fluid pipe 1, the flow passage inside the pipe can be completely blocked, or the flow passage inside the pipe can be partially blocked according to the amount of movement of the plug portion 11c to control the flow rate.

In addition, an air vent hole 13a including a female screw part, which penetrates through the peripheral side portion 13 from above and with which an opening and closing plug 15 normally in a closed state is screwed, is formed on an end portion side of the valve casing 12 of the fluid control valve 10. Two recesses 13b and 13b are formed over the entire periphery of an outer peripheral surface on a leading end side of the peripheral side portion 13 to be separated from each other in the horizontal direction, and seal members 21 and 22 are provided in the recesses 13b, respectively. In the following description, a seal member on the leading end side of the valve casing 12 is referred to as a first seal member 21, and a seal member closer to the base end side than the first seal member 21 is referred to as a second seal member 22.

As shown in FIG. 8, the first seal member 21 and the second seal member 22 of the present embodiment each are made of an elastic material integrally formed in an annular shape, and have the same shape. The first seal member 21 includes a holding portion 21a on the base end side that is held in the recess 13b, and a deforming portion 21b that is continuous with the holding portion 21a to be elastically deformed. The seal members 21 and 22 each are formed such that the maximum outer diameter of the deforming portion 21b is a larger diameter than the inner diameter of the neck portion 5d in a natural state of each of the seal members 21 and 22 before being elastically deformed. Incidentally, since the second seal member 22 has the same shape as that of the first seal member 21 described above, descriptions will be omitted.

In addition, the separation distance between the first seal member 21 and the second seal member 22 in the horizontal direction is larger than the opening width in the horizontal direction of the opening portion 5b of the neck portion 5d.

Next, a step of installing the fluid control valve 10 will be described. First, instead of the pressing unit 80 described above, as insertion means for inserting the fluid control valve 10 into the casing 5, a pair of the hydraulic rods 60 are erected on the support portions 36 and 36 of the process valve 3. The hydraulic rod 60 mainly includes a support plate 61 connected to the support portion 36 of the process valve 3; a cylinder 62 which has a hollow structure and is fixedly supported by the support plate 61; and a piston 63 of which one end is fitted into the cylinder 62. A supply pump or the like supplies a hydraulic fluid such as oil into the cylinder 62 via hydraulic fluid hoses that are connected to supply ports 62a and 62a and are not shown, so that due to the hydraulic pressure of the hydraulic fluid, the hydraulic rod 60 can extend and contract while pressing the piston 63 in the horizontal direction. In addition, the pair of hydraulic rods 60 and 60 are configured such that the pistons 63 and 63 extend and contract synchronously, and upper ends thereof are always disposed at the same position.

As shown in FIG. 8, the pistons 63 and 63 of the hydraulic rods 60 are extended, and a pressing member 64 which presses the fluid control valve 10 is provided at leading ends thereof in a hanging manner, and is fastened with nuts 65. Further, in a state where a peripheral edge of an end portion of the valve casing 12 of the fluid control valve 10 is fitted to a fitting portion 64a formed to penetrate through substantially the center of the pressing member 64, the pistons 63 and 63 are operated to the fluid pipe 1 side by the hydraulic pressure, so that pressing force to the fluid pipe 1 side is applied to the fluid control valve 10 via a pressing surface 64b that is a bottom surface of the pressing member 64, and the fluid control valve 10 gradually moves to the fluid pipe 1 side inside the neck portion 5d.

At least the seal member 21 comes into close contact with the inner peripheral surface 5h located closer to an outer side than the opening portion 5b of the neck portion 5d, so that the fluid control valve 10 inserted into the neck portion 5d by the hydraulic rods 60 maintains a sealed state. In the sealed state, the process valve body 31 of the process valve 3 is opened.

During movement of the fluid control valve 10 to the fluid pipe 1 side, when the first seal member 21 which has sealed the inner peripheral surface 5h of the neck portion 5d passes across the opening portion 5b, the first seal member 21 is separated from the inner peripheral surface 5h of the neck portion 5d to not be able to temporarily maintain the sealed state; however, at this time, the second seal member 22 on the base end side seals the inner peripheral surface 5h of the neck portion 5d. Namely, due to the first seal member 21 and the second seal member 22 separated from each other in the horizontal direction, until the fluid control valve 10 is installed, the sealed state can be always maintained, and leakage of the fluid can be prevented.

Figure 9:
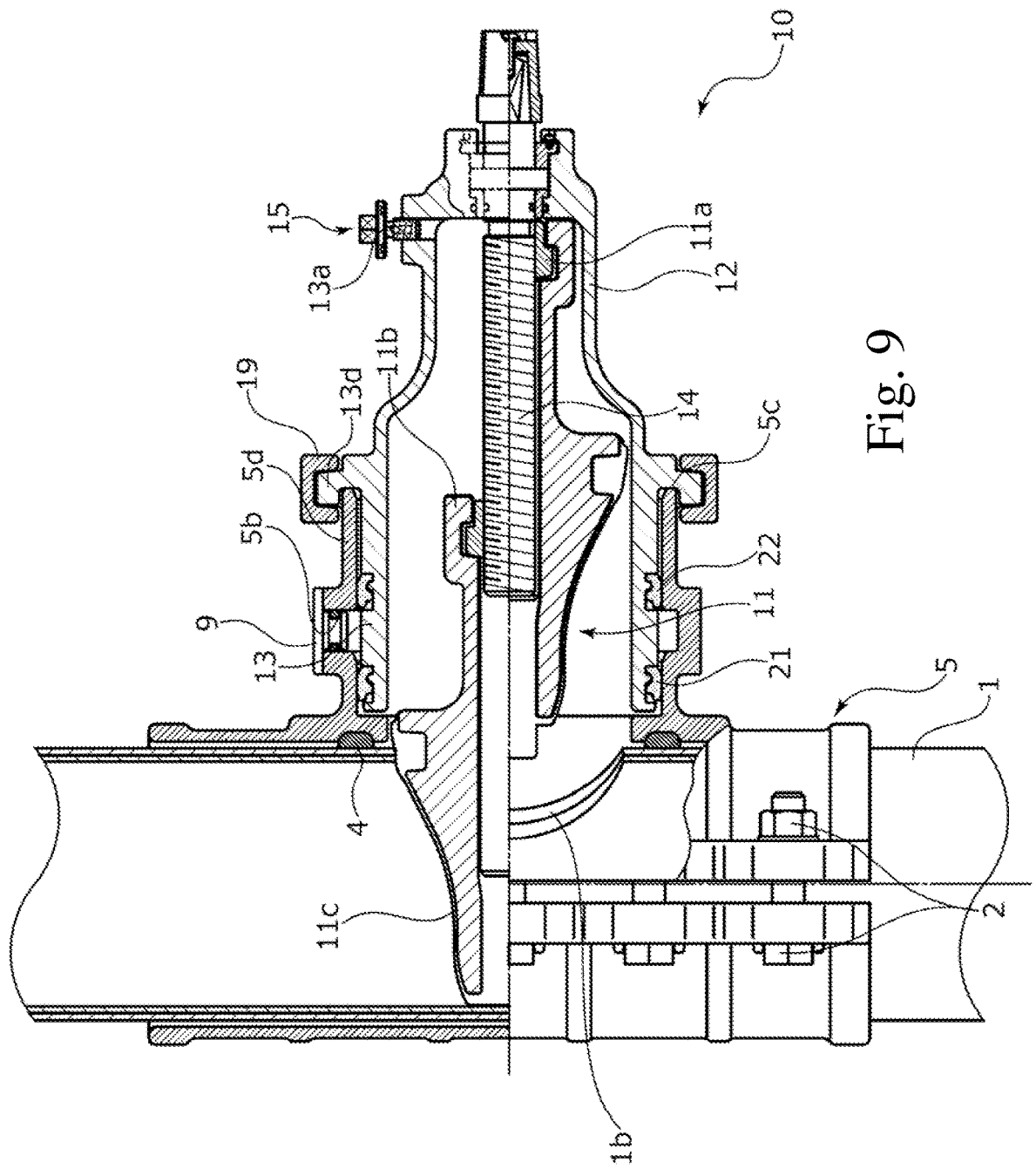
FIG. 9 is a partial sectional plan view showing a situation after installation of the fluid control valve.

The fluid control valve 10 is pressed to an installation position where the first seal member 21 comes into close contact with the inner peripheral surface 5j of the neck portion 5d on an inner side (fluid pipe 1 side) beyond the opening portion 5b, and the second seal member 22 comes into close contact with the inner peripheral surface 5h located closer to the outer side than the opening portion 5b (refer to FIGS. 9 and 10). At the installation position, hook portions 13e and 13e which extend radially outward from the peripheral side portion 13 of the valve casing 12 to further extend to the inner side are fitted to the cutout portions 5f as engaging portions formed in the open end portion 5c of the neck portion 5d of the casing 5, so that the fluid control valve 10 can be restricted from moving with respect to the casing 5 in the circumferential direction. Therefore, a concern such as the fluid control valve 10 moving due to the flow of the fluid inside the pipe can be avoided.

Next, as shown in FIGS. 9 and 10, the collar portions 5e of the open end portion 5c of the casing 5 and an extension portion 13d of the fluid control valve 10 overlapping the collar portions 5e are fitted to each other with a fitting member 19 which has a divided structure and is formed in a substantially U shape in a sectional view, so that the fluid control valve 10 is restricted from coming out from the casing 5 toward the outer side.

In addition, when the fluid control valve 10 is at the installation position, the opening and closing plug 15 is screwed out to open the air vent hole 13a, so that air remaining in the valve casing 12 of the fluid control valve 10 in a sealed state is released to the outside.

After the fluid control valve 10 is installed as described above, as shown in FIGS. 9 and 10, the pressing member 64 and the hydraulic rods 60 assembled to the fluid control valve 10 are removed, and the process valve 3 assembled to the opening portion 5b of the casing 5 is removed in sequence. At this time, since the first seal member 21 seals the inner peripheral surface 5j downstream of the opening portion 5b of the neck portion 5d, even when the opening portion 5b is opened, leakage of the fluid thereinside is prevented. For this reason, the process valve 3 can be removed without sealing by the plug 11, so that there is no concern such as the process valve 3 being aged. As shown in FIG. 9, a closing lid 9 is attached in a sealed manner to the opening portion 5b after the process valve 3 is removed.

Second Embodiment

Next, a pipe drilling device and an installation method thereof according to a second embodiment of the present invention will be described with reference to FIGS. 11 to 17. Incidentally, the same reference signs are assigned to the same configurations as those in the above-described embodiment, and duplicated descriptions will be omitted. In addition, an installation situation of a pipeline and the like are the same as those in the above-described embodiment. As shown in FIG. 12, the pipe drilling device according to the present invention mainly includes a casing 105 that is externally fitted to a fluid pipe 101 which has been already installed; a process valve 103 that opens and closes the inside of the casing 105; and a drilling machine 107 that drills the fluid pipe 101 inside the casing 105. In the present embodiment, as the pipe drilling device and the installation method thereof, a series of flows from when a predetermined location on the fluid pipe 101 which has been already installed as a pipeline forming member is drilled inside the casing 105 until a fluid control valve 110 is installed inside the casing 105 in an uninterrupted flow state will be described.

Figure 11A:
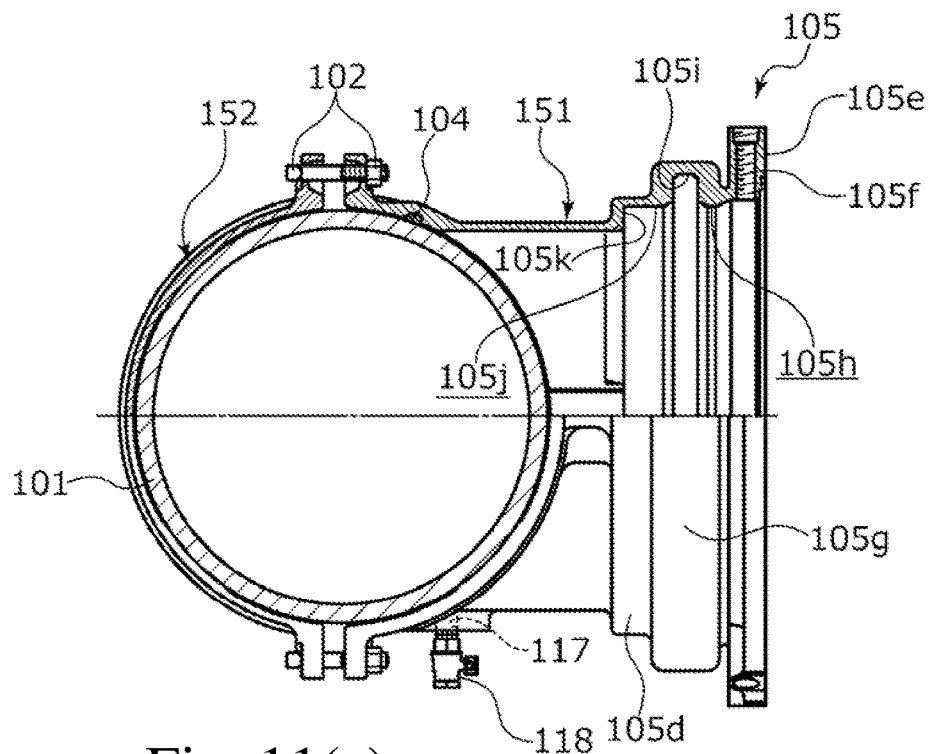
FIG. 11A is a partial sectional front view showing a casing forming a pipe drilling device according to a second embodiment of the present invention.
Figure 12:
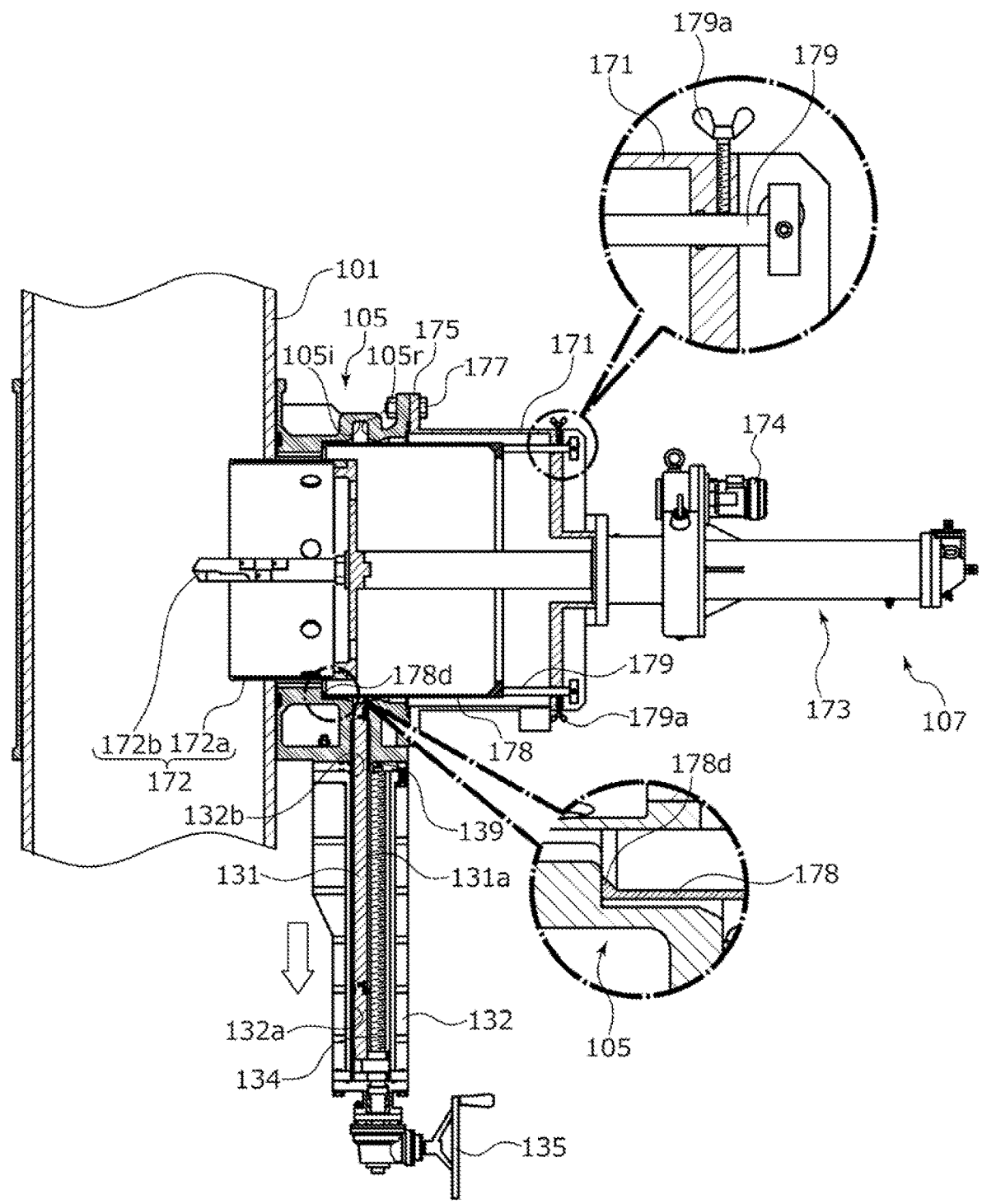
FIG. 12 is a partial sectional plan view showing a situation where drilling is performed by a drilling machine.

The fluid pipe 101 of the present embodiment is a ductile cast iron pipe, and as shown in FIG. 11A, is formed as a straight pipe having a substantially circular shape in a sectional view.

First, as shown in FIG. 11, after an outer surface of the fluid pipe 101 is cleaned, the outer surface being the location of attachment of a fluid control device according to the present invention, the casing 105 forming the pipe drilling device is externally fitted to the outer surface in a sealed manner via a seal member 104 that seals a drilled portion to be described later of the fluid pipe 101. The casing 105 has a divided structure including a plurality of divided bodies, and in the present embodiment, mainly includes a first divided body 151 forming one side portion and a second divided body 152 forming the other side portion. The first divided body 151 and the second divided body 152 are fastened to each other with fastening members 102.

The first divided body 151 of the casing 105 includes a pipeline casing portion 105a extending along the fluid pipe 101 in a pipeline direction, and a neck portion 105d having a cylindrical shape which branches at substantially the center of the pipeline casing portion 105a to extend in the horizontal direction, and which includes an open end portion 105c that is open in a branch direction and an opening portion 105b that is open laterally. The first divided body 151 is formed in a substantially T shape in a plan view.

Further, the open end portion 105c of the neck portion 105d includes a pair of flange portions 105e that protrude in a radially outward direction toward the pipeline direction of the fluid pipe 101, and a plurality of push bolts 105f that are formed to be insertable through a plurality of through-holes formed along a circumferential direction of the flange portions 105e.

A peripheral side portion having a cylindrical shape of the neck portion 105d is provided with a thick wall portion 105g of which the outer surface protrudes in a radial direction, and the thick wall portion 105g includes the opening portion 105b that is open toward one side in the pipeline direction of the fluid pipe 101. As shown in FIG. 11, the opening portion 105b is open in a substantially rectangular shape that is long longitudinally in a side view, and as will be described later, is formed such that a process valve body 131 of the process valve 103 can be inserted thereinto.

In addition, as shown in FIG. 11A, an inner peripheral portion of the neck portion 105d includes an inner peripheral surface 105h that is formed as a curved surface having a substantially circular shape in a side view; a recessed portion 105i as a recessed valve seat portion that is recessed in the radially outward direction along the circumferential direction at the same position as that of the opening portion 105b in an axial direction of the neck portion 105d; an inner peripheral surface 105j that is formed closer to a base end side of the neck portion 105d than the recessed portion 105i, and is formed with a slightly smaller diameter than that of the inner peripheral surface 105h on a leading end side of the neck portion 105d; and a step portion 105k that is continuous with the base end side of the inner peripheral surface 105j to protrude in a radially inward direction.

Figure 11B:
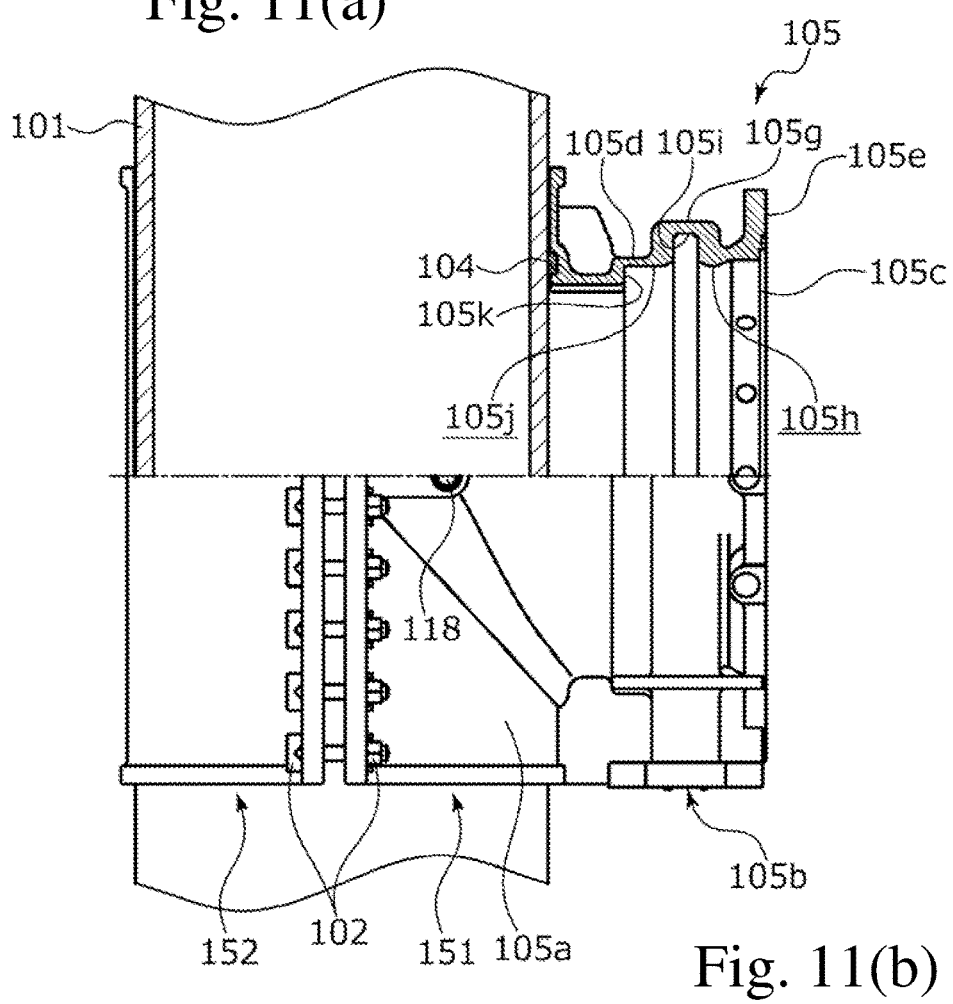
FIG. 11B is a partial sectional plan view of the same.

In addition, as shown in FIGS. 11A and 11B, as a discharge port penetrating through the neck portion 105d from inside to outside, a communication opening portion 117 is formed in a base end portion of the neck portion 105d.

Next, as shown in FIGS. 11 and 12, the process valve 103 forming the pipe drilling device according to the present invention is connected to the opening portion 105b of the neck portion 105d in a sealed manner. The process valve 103 mainly includes the process valve body 131 that is slidable to open and close the inside of the casing 105, and an accommodation member 132 as a process valve casing including an accommodation inner portion 132a that accommodates the process valve body 131 so as to be slidable in the horizontal direction, and an open portion 132b that is a one open end on a side of the accommodation member 132.

The accommodation member 132 includes a shaft member 134 that extends in the horizontal direction in a state where the shaft member 134 is pivotally supported so as to rotate and so as not to move back and forth. The process valve body 131 is screwed with the shaft member 134, and when an operation member 135 attached to a leading end portion of the shaft member 134 is operated to rotate, the leading end portion protruding outward from the accommodation member 132, the process valve body 131 is slidable with respect to the accommodation member 132.

In addition, a seal member 131a having an endless shape is installed along or covers side portions of both side surfaces of the process valve body 131, and a peripheral edge portion of the seal member 131a comes into surface contact with a side wall 105r of the recessed portion 105i, so that the inside of the casing 105 can be closed in a sealed manner. As described above, since an inner surface of the neck portion 105d is provided with the recessed portion 105i as a recessed valve seat portion, the pressure in the fluid pipe 101 can be used to cause a peripheral edge portion of the process valve body 131 to come into surface contact with the side wall 105r of the recessed portion 105i. Therefore, the sealing performance can be improved. Further, as described above, since the peripheral edge portion of the process valve body 131 comes into surface contact with the recessed portion 105i formed in the inner surface of the neck portion 105d, the process valve body 131 can be formed in a thin plate shape. Therefore, the extension of the casing 105 in the branch direction, namely, the stroke of the drilling machine 107 can be shortened, and the accuracy of drilling can be improved without the drilling machine 107 being eccentric. In addition, since the process valve body 131 is made in a thin plate shape, a reduction in cost can be achieved by the downsizing of the process valve body 131 and the casing 105, and since the accuracy of drilling is high, the insertion of a plug 111 of the fluid control valve 110 to be described later is properly performed, and water stoppage and controllability of the fluid can be improved.

For details of a procedure of attaching the process valve 103, first, the accommodation member 132 is disposed on an outer surface of the neck portion 105d at a position where the open portion 132b thereof communicates with the opening portion 105b of the neck portion 105d.

Next, the accommodation member 132 is fastened to the neck portion 105d. In the present embodiment, the accommodation member 132 and the neck portion 105d are fastened to each other by screwing fastening members across a plurality of through-holes formed to surround the open portion 132b of the accommodation member 132 and a plurality of female screw holes formed to surround the opening portion 105b of the neck portion 105d.

In addition, a seal member 139 is disposed in the accommodation member 132 to surround a periphery of the open portion 132b, and the seal member 139 is brought into close contact with a peripheral edge of the opening portion 105b by the fastening of the fastening members described above, so that the opening portion 105b and the open portion 132b are sealed. As described above, since the process valve 103 is installed in the opening portion 105b provided in the neck portion 105d, the attachment position of the drilling machine 107 to be described later can be brought as close as possible to the fluid pipe 101. Therefore, the extension stroke by which the drilling machine 107 approaches the fluid pipe 101 can be shortened, and as a result, the drilling machine 107 can be downsized, reduced in weight, and reduced in cost (refer to FIGS. 12 and 14).

Next, as shown in FIG. 12, the drilling machine 107 is connected to the open end portion 105c of the neck portion 105d in a sealed manner. The drilling machine 107 mainly includes an attachment flange cylinder 171; a cutter 172 that drills the fluid pipe 101, a drive motor 174 that rotates the cutter 172 inside the attachment flange cylinder 171; and an advancing and retreating mechanism 173 that causes the cutter 172 to advance and retreat in the horizontal direction. The cutter 172 includes a hole saw 172a that is formed in a bottomed cylindrical shape having a smaller diameter than that of the fluid pipe 101, and includes cutting edges at a leading end thereof along the circumferential direction, and a center drill 172b that is disposed coaxially with a rotation axis of the hole saw 172a to protrude ahead of the cutting edges.

In addition, inside the attachment flange cylinder 171, a cylindrical body 178 which is externally fitted to the cutter 172 so as to be movable is provided to be movable with respect to the attachment flange cylinder 171 in the horizontal direction. The cylindrical body 178 is formed in a substantially cylindrical shape having an outer peripheral surface with a slightly smaller diameter than those of the inner peripheral surfaces 105h and 105j of the neck portion 105d. When an operation portion 179 which is fixed to a base end side of the cylindrical body 178 and extends outward from the attachment flange cylinder 171 in a sealed state is operated to be pushed, the cylindrical body 178 is inserted into the neck portion 105d to a position where the cylindrical body 178 covers an opening of the recessed portion 105i. Namely, the cylindrical body 178 of the drilling machine 107 forms a cylindrical portion of the present invention. In addition, when the operation portion 179 is fixed with a fixing screw 179a screwed with the attachment flange cylinder 171, the cylindrical body 178 is positioned at a position where the cylindrical body 178 covers the opening of the recessed portion 105i. Incidentally, the positioning is not limited to being performed by the fixing screw 179a, and may be performed, for example, by a mechanism that presses a head of the operation portion 179.

Further, since the cylindrical body 178 is disposed to be slidable along the inner peripheral surfaces 105h and 105j of the neck portion 105d, the accuracy of movement of the cylindrical body 178 can be improved, and the recessed portion 105i can be reliably closed or opened.

In addition, an outer peripheral surface of the cylindrical body 178 is disposed close to the inner peripheral surfaces 105h and 105j of the neck portion 105d, and in such a manner, foreign matter is prevented from entering the recessed portion 105i.

A procedure of attaching the drilling machine 107 will be described. A flange portion 175 formed at a leading end of the attachment flange cylinder 171 is fastened to the flange portions 105e of the open end portion 105c of the neck portion 105d in a sealed manner with a plurality of fastening members 177 disposed in the circumferential direction.

Next, a step of drilling the fluid pipe 101 using the drilling machine 107 will be described. As shown in FIG. 12, first, in a state where the process valve body 131 of the process valve 103 is disposed in the accommodation inner portion 132a of the accommodation member 132, and the inside of the casing 105 is opened, the drive motor 174 of the drilling machine 107 rotates the cutter 172, and the advancing and retreating mechanism 173 causes the cutter 172 to advance ahead, thus to drill a pipe wall of the fluid pipe 101 in an uninterrupted flow state.

At this time, particularly in a branch in the horizontal direction as in the present embodiment, a part of chips of the fluid pipe 101 generated during drilling enters the neck portion 105d; however, since the opening of the recessed portion 105i is closed by the cylindrical body 178, the chips can be prevented from entering the recessed portion 105i. The chips which have entered the neck portion 105d are deposited on or adhere to an inner surface of the cylindrical body 178 covering the recessed portion 105i. In this case, for example, an elastic body may be bonded or vulcanized to an outer peripheral portion of the cylindrical body 178 to eliminate gaps between the outer peripheral portion and the inner peripheral surfaces 105h and 105j and the recessed portion 105i, or a gap between the outer peripheral portion and only an arbitrary location on each of the inner peripheral surfaces 105h and 105j and the recessed portion 105i.

In addition, since a protrusion portion 178d protruding radially inward is formed in a leading end portion of the cylindrical body 178, not only during drilling but also when the attachment flange cylinder 171 and the cylindrical body 178 are removed from the neck portion 105d after drilling, the chips deposited on or adhering to the inner surface of the cylindrical body 178 can stay on the inner surface of the cylindrical body 178 without falling to the inner peripheral surfaces 105h and 105j and the recessed portion 105i of the neck portion 105d.

Incidentally, a leading end surface 178e of the cylindrical body 178 of the present embodiment is formed in a flat shape, and the leading end surface 178e comes into contact with the step portion 105k formed inside the neck portion 105d of the casing 105, so that the insertion of the cylindrical body 178 is completed.

At this time, for example, a ball valve 118 attached to the communication opening portion 117 which is formed on the base end side of the neck portion 105d, as a discharge port communicating with the inside and the outside of the casing 105, is opened, so that the chips generated during drilling are discharged to the outside, together with the fluid. In such a manner, the chips generated during drilling can be discharged to the outside via the communication opening portion 117 formed on a base end portion side of the neck portion 105d, which is upstream of the recessed portion 105i, without the chips approaching a recessed portion 105i side. Incidentally, as will be described later, the communication opening portion 117 is used as a bypass for filling of water during operation of the fluid control valve 110. In addition, the ball valve described above is removed in an uninterrupted flow state after work, and the communication opening portion 117 is sealed with an opening and closing plug 119 shown in FIG. 17.

Figure 13:
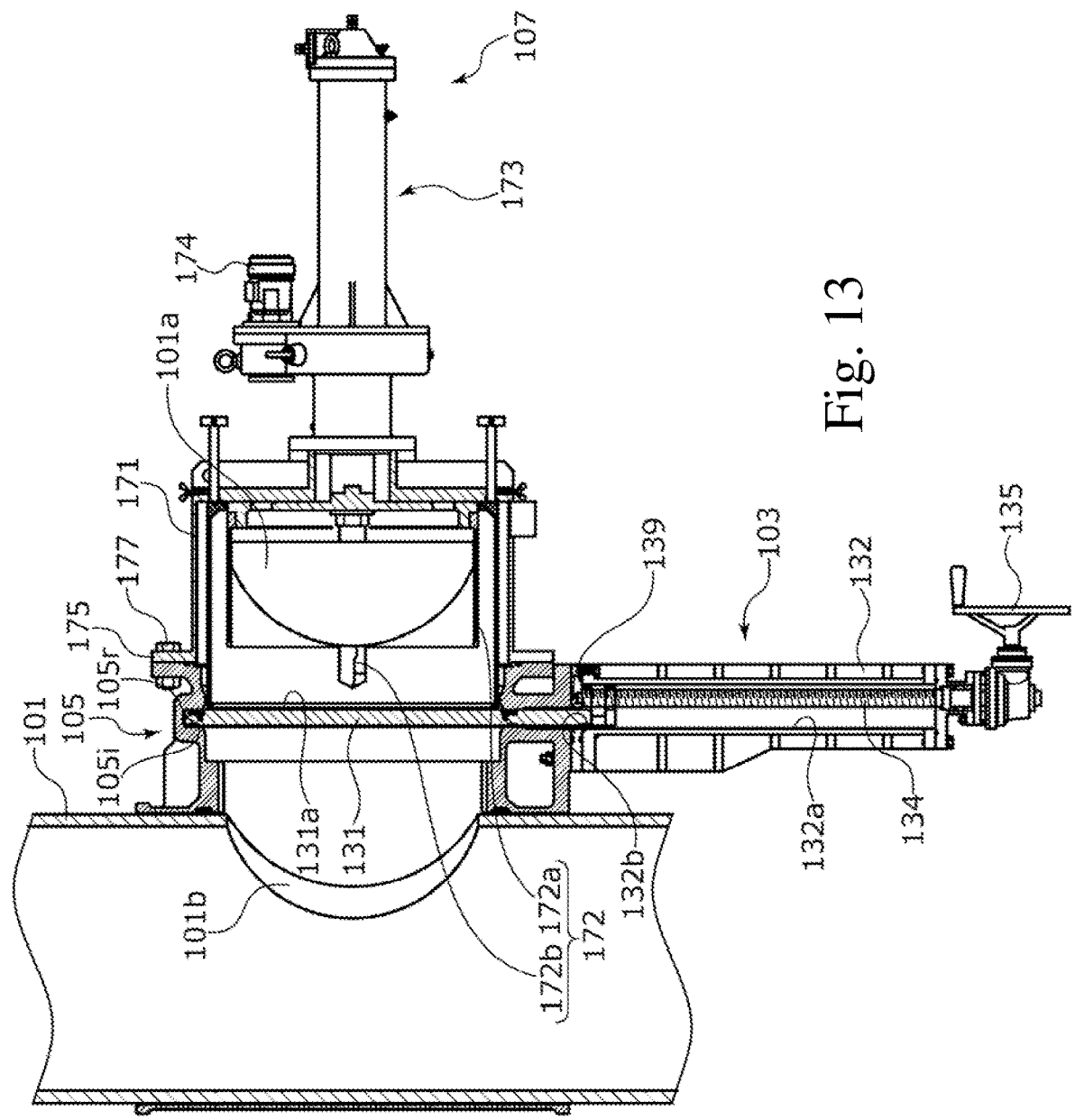
FIG. 13 is a partial sectional plan view showing a situation after drilling by the drilling machine.

In addition, when the fluid pipe 101 is cut by the cutter 172, a cut piece 101a separated from the fluid pipe 101 is held inside the hole saw 172a. Then, as shown in FIG. 13, the cutter 172, together with the cut piece 101a, is pulled into the attachment flange cylinder 171, the cylindrical body 178 is also pulled into the attachment flange cylinder 171, and the inside of the casing 105 is closed by the process valve body 131 of the process valve 103, so that work of drilling the fluid pipe 101 is completed. As described above, since the opening of the recessed portion 105i inside the neck portion 105d of the casing 105 is closed by the cylindrical body 178, chips generated by the drilling of the fluid pipe 101 inside the casing 105 can be prevented from entering the recessed portion 105i. Therefore, the process valve body 131 can come into contact with the recessed portion 105i which is clean and in which the cylindrical body 178 is opened, and the casing 105 can be sealed. At this time, since the attachment position of the drilling machine 107 is close to the fluid pipe 101, the drilling machine 107 is positioned as concentrically as possible with the casing 105, and even when there occurs deviation in parallelism of a connection surface between an attachment flange of a main body of the drilling machine 107 and the attachment flange cylinder 171, the influence on a drilled portion is minimized, and deviation in drilling is suppressed.

Next, work of removing the drilling machine 107 is performed in a state where the process valve body 131 of the process valve 103 closes the inside of the casing 105 in a sealed manner. It is preferable that instead of the drilling machine 107, a discharger which discharges chips generated during drilling and is not shown is connected to the open end portion 105c of the neck portion 105d, and the chips remaining inside the casing 105 or the fluid pipe 101 are discharged to the outside by the discharger.

Next, work of removing the discharger is performed in a state where the process valve body 131 of the process valve 103 closes the inside of the casing 105, and instead of the discharger, the fluid control valve 110 which controls the fluid inside the pipe is connected to the open end portion 105c of the neck portion 105d.

Figure 14:
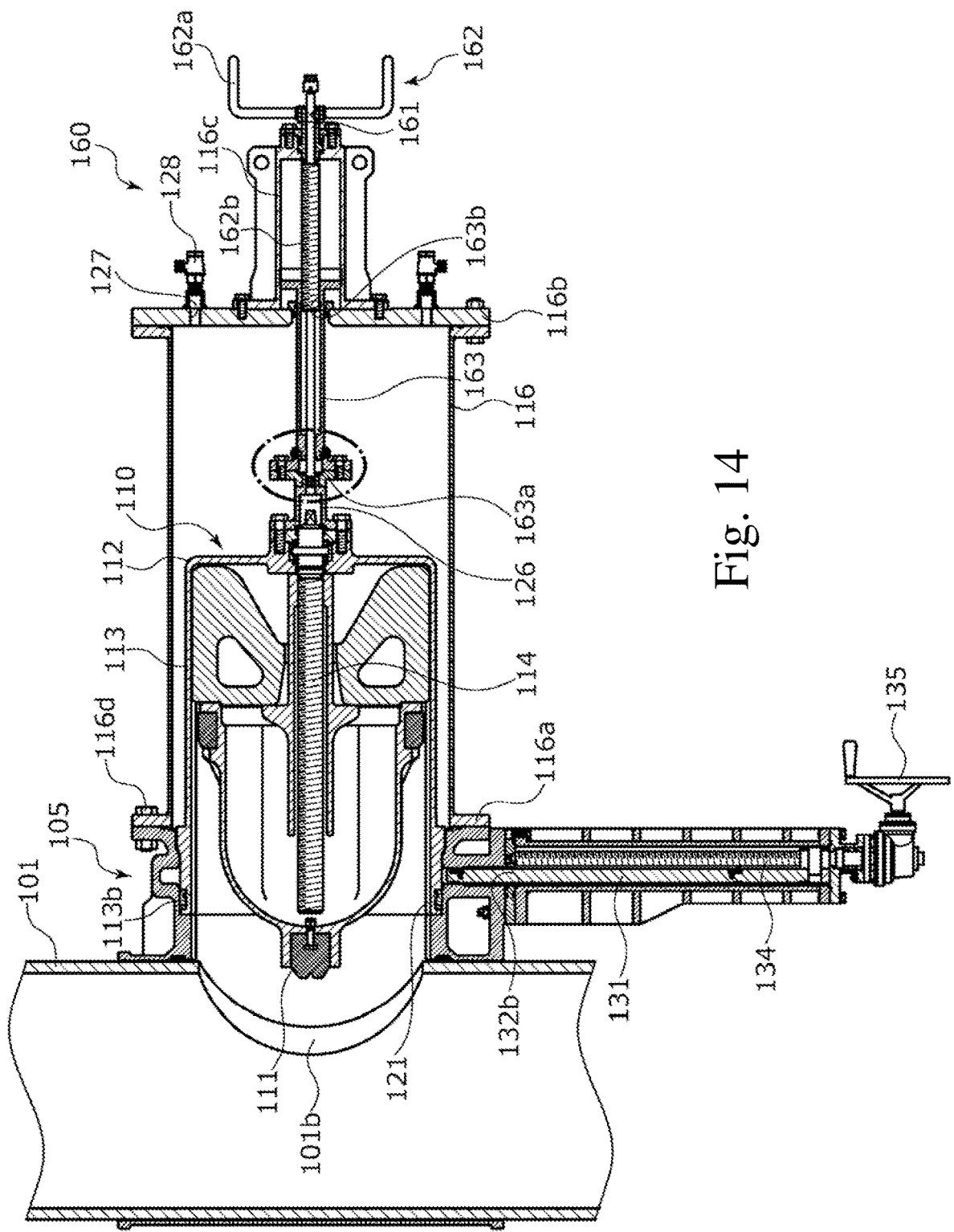
FIG. 14 is a plan sectional view showing a situation before installation of a fluid control valve.

Prior to the attachment of the fluid control valve 110, as shown in FIG. 14, a flange portion 116a formed at a leading end of an accommodation cylinder 116 which accommodates the fluid control valve 110 so as to be movable in the horizontal direction is connected to the open end portion 105c of the neck portion 105d in a sealed manner with a plurality of fastening members 116d disposed in the circumferential direction. The accommodation cylinder 116 is formed in a bottomed cylindrical shape of which the leading end is open and of which the base end is closed by a closing lid 116b having a through-hole at the center thereof. In addition, a communication opening portion 127 communicating with the inside and the outside of the accommodation cylinder 116 is formed in the closing lid 116b, and a ball valve 128 is normally screwed into the communication opening portion 127.

As insertion means for inserting the fluid control valve 110 into the casing 105, an inserting machine 160 which is detachably assembled to be able to operate the fluid control valve 110 to move from outside the accommodation cylinder 116 in the horizontal direction is provided inside the accommodation cylinder 116. The inserting machine 160 extends to penetrate through the center of a base end portion of the accommodation cylinder 116 in the horizontal direction, and mainly includes an extension rod 161, an operation stick 162, and an insertion cylinder 163 in order from a center side thereof.

Figure 15A:
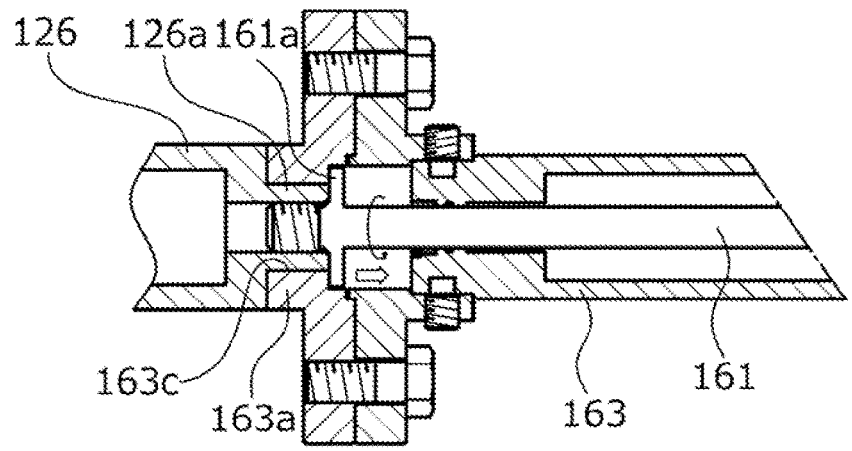
FIGS. 15A to 15C are enlarged sectional views of a chain line enclosed portion of FIG. 14, which show a procedure of removing an inserting machine from the fluid control valve.

More specifically, as shown in FIGS. 14 and 15A, a leading end of the extension rod 161 is screwed with an attachment jig 126 attached to a base end of a valve casing 112 of the fluid control valve 110, and a base end of the extension rod 161 extends outward from the accommodation cylinder 116. The operation stick 162 externally fitted to the extension rod 161 is pivotally supported so as to rotate and so as not to move in the axial direction with respect to a cylinder portion 116c that forms the accommodation cylinder 116 and covers the through-hole of the closing lid 116b, a grip portion 162a for rotational operation is provided at a base end of the operation stick 162. Further, the insertion cylinder 163 externally fitted to the operation stick 162 is pivotally supported so as not to rotate and so as to move in the axial direction with respect to the cylinder portion 116c, a leading end portion 163a thereof is interposed between the attachment jig 126 and a collar portion 161a of the extension rod 161, and the insertion cylinder 163 includes a female screw part 163b screwed with a male screw part 162b of the operation stick 162.

In addition, a through-hole 163c having a substantially square shape in a side sectional view is formed in the leading end portion 163a of the insertion cylinder 163, and a protruding end portion 126a of the attachment jig 126, which protrudes in a substantially square shape in a side view to complement the through-hole 163c, is internally fitted to the through-hole 163c. In such a manner, the fluid control valve 110 attached to the attachment jig 126 is restricted from moving with respect to the insertion cylinder 163 in the circumferential direction. Incidentally, the shape in a side view of the through-hole 163c of the insertion cylinder 163 and the protruding end portion 126a of the attachment jig 126, which complements the through-hole 163c, is not limited to a substantially square shape, and may be a non-circular shape such as a rectangular shape, an elliptical shape, or an oval shape.

As shown in FIG. 14, the fluid control valve 110 mainly includes the plug 111 (valve body) that passes through a hole portion 101b of the fluid pipe 101 which has been drilled, to be movable in the horizontal direction to open and close the inside of the pipe, and the valve casing 112 that accommodates the plug 111 so as to be movable in the horizontal direction, and includes a peripheral side portion 113 of which the leading end is open. The valve casing 112 includes a shaft member 114 that extends in the horizontal direction in a state where the shaft member 114 is pivotally supported so as to rotate and so as not to move back and forth. The plug 111 is screwed with the shaft member 114, and when an operation portion 114a of a base end of the shaft member 114 is operated to rotate, the base end protruding outward from the valve casing 112, the plug 111 is movable with respect to the valve casing 112 in the horizontal direction.

Figure 16:
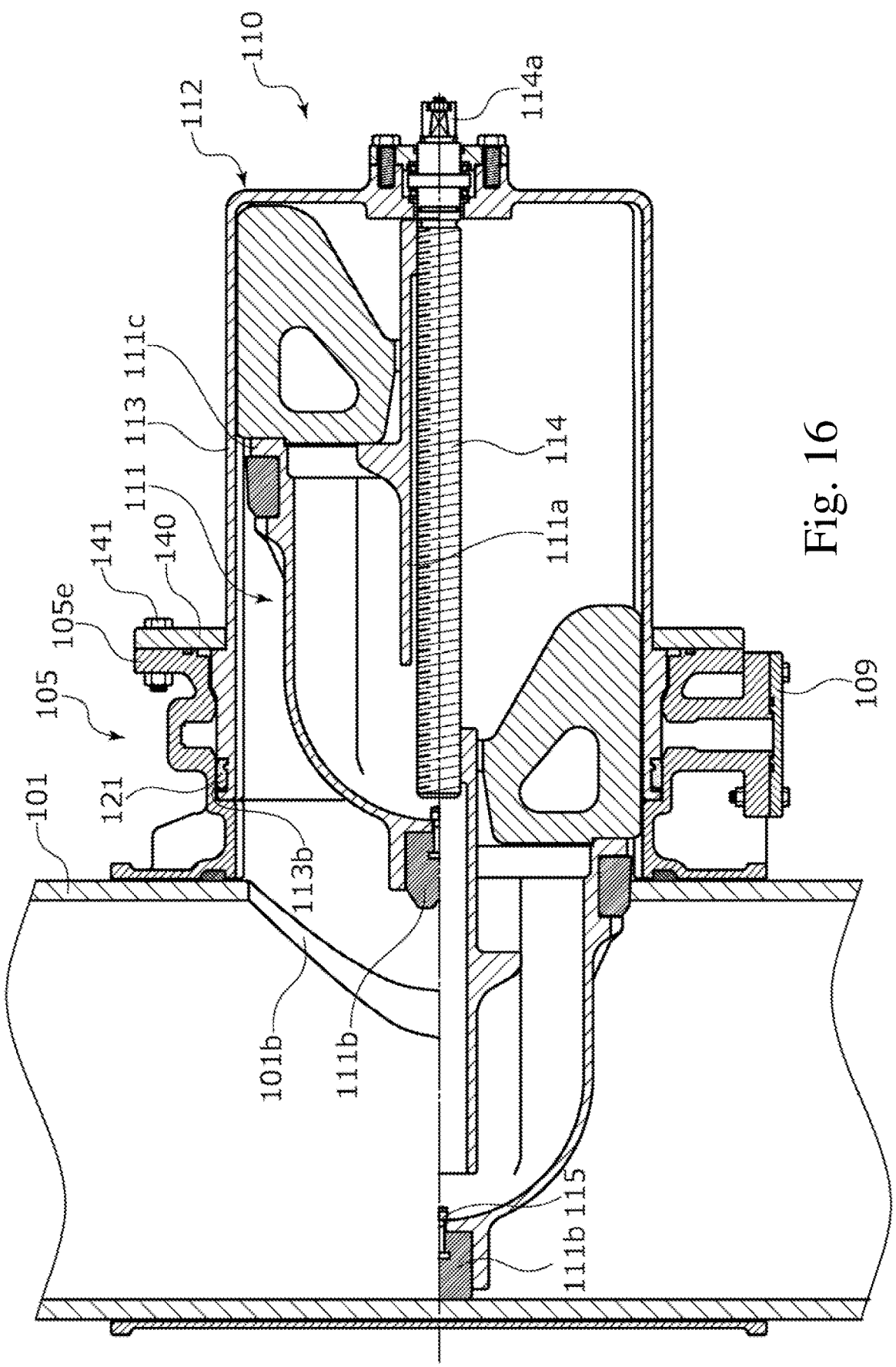
FIG. 16 is a plan sectional view showing a situation after installation of the fluid control valve.
Figure 17:
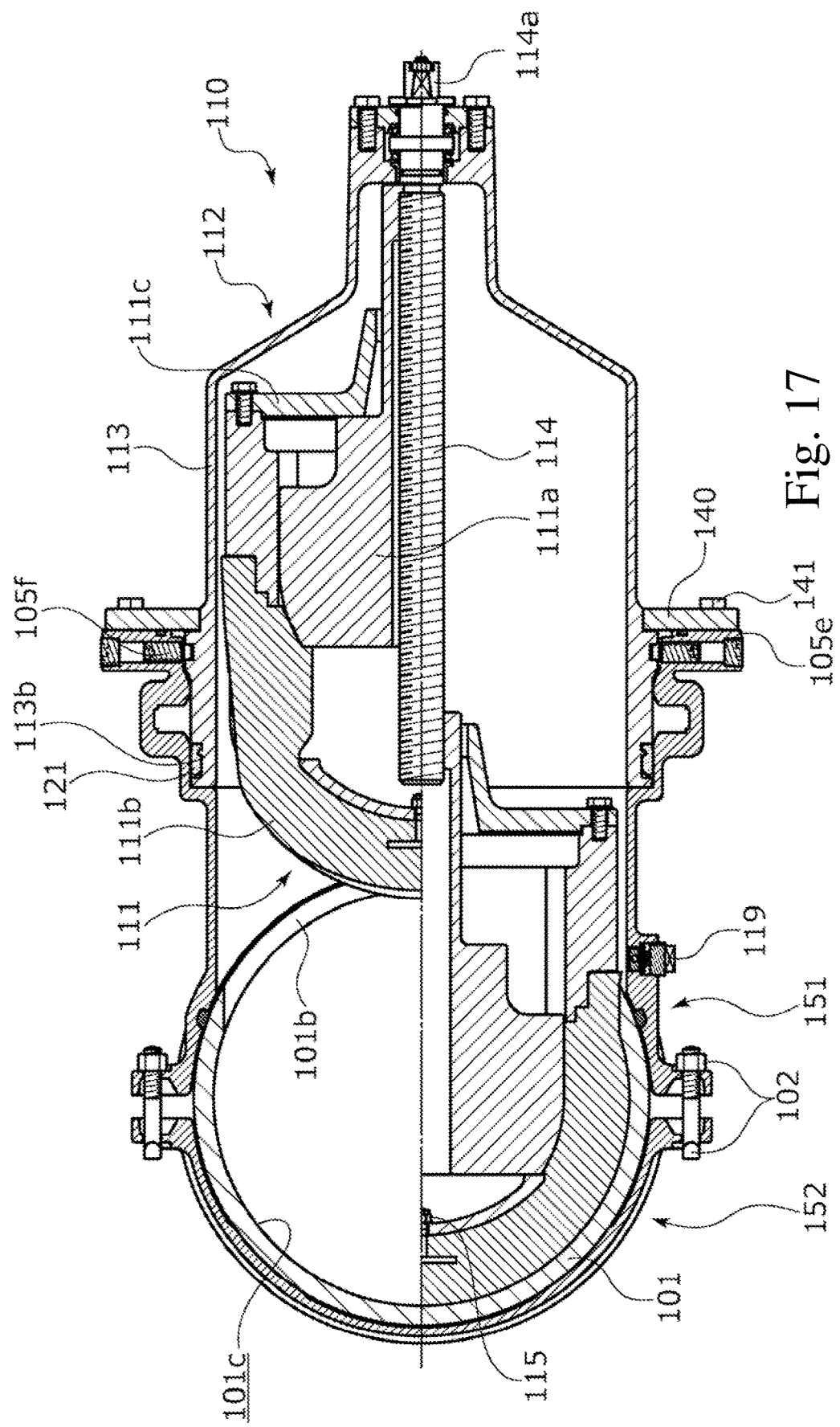
FIG. 17 is a front sectional view of the same as in FIG. 16.

More specifically, as shown in FIGS. 16 and 17, the plug 111 includes an internal thread piece 111a including a female screw that is screwed with the shaft member 114; a plug portion 111b made of an elastic material; a plug body 111c that is engaged with the internal thread piece 111a to operate in a follow-up manner; and a fixing member 115 that is formed of a bolt and a nut integrally molded with the plug portion 111b by vulcanization or the like, and connects the plug portion 111b to the plug body 111c. When the plug 111 moves into the pipe through the hole portion 101b of the fluid pipe 101 due to rotation of the shaft member 114 described above, and the plug portion 111b comes into close contact with the entire peripheries of the hole portion 101b and an inner peripheral surface 101c of the fluid pipe 101, the flow passage inside the pipe can be completely blocked, or the flow passage inside the pipe can be partially blocked according to the amount of movement of the plug body 111c to control the flow rate. In addition, initially, the internal thread piece 111a moves with the plug portion 111b and the plug body 111c at the same time, but when the plug portion 111b comes into contact with a peripheral bottom portion inside the pipe, the internal thread piece 111a moves greatly with respect to the plug portion 111b and the plug body 111c, and blade portions on both side portions of the internal thread piece 111a push and widen the plug portion 111b in the radially outward direction to assist in stopping water.

In addition, in the valve casing 112 of the fluid control valve 110, a recess 113b is formed over the entire periphery of an outer peripheral surface on the leading end side of the peripheral side portion 113, and a seal member 121 is provided in the recess 113b.

Next, a step of installing the fluid control valve 110 will be described. First, as shown in FIG. 14, in a state where the accommodation cylinder 116 which accommodates the fluid control valve 110 thereinside is connected to the open end portion 105c of the casing 105 in a sealed manner as described above, before the process valve body 131 is opened, the communication opening portion 117 provided in the neck portion 105d of the casing 105 to be ahead of the process valve body 131 and the communication opening portion 127 provided in the closing lid of the accommodation cylinder 116 to be closer to the base end side than the process valve body 131 communicate with each other via a connection hose which is not shown. In such a manner, the fluid inside the fluid pipe 101 is gradually introduced into the accommodation cylinder 116 via the communication opening portion (not shown), the connection hose, and then the communication opening portion 127 described above due to the fluid pressure.

As described above, since the fluid inside the fluid pipe 1 is introduced into the accommodation cylinder 116, before the process valve body 31 is opened, the pressure inside the accommodation cylinder 116 and the pressure inside the fluid pipe 1 can be adjusted to the same pressure.

Next, as shown in FIG. 14, the process valve body 131 is opened, and the fluid control valve 110 inside the accommodation cylinder 116 is installed toward the casing 105. More specifically, when the operation stick 162 of the inserting machine 160 described above is operated to rotate in a normal rotation direction, the insertion cylinder 163 screwed with the operation stick 162 moves toward the fluid pipe 101. As the insertion cylinder 163 moves, pressing force is applied to the fluid control valve 110 via the attachment jig 126 to cause the fluid control valve 110 to gradually move into the neck portion 105d. Incidentally, the extension rod 161 screwed with the attachment jig 126 also moves downward following the fluid control valve 110.

As shown in FIGS. 16 and 17, the fluid control valve 110 is pressed to an installation position where the seal member 121 comes into close contact with the inner peripheral surface 105j of the neck portion 105d beyond the opening portion 105b.

Figure 15B:
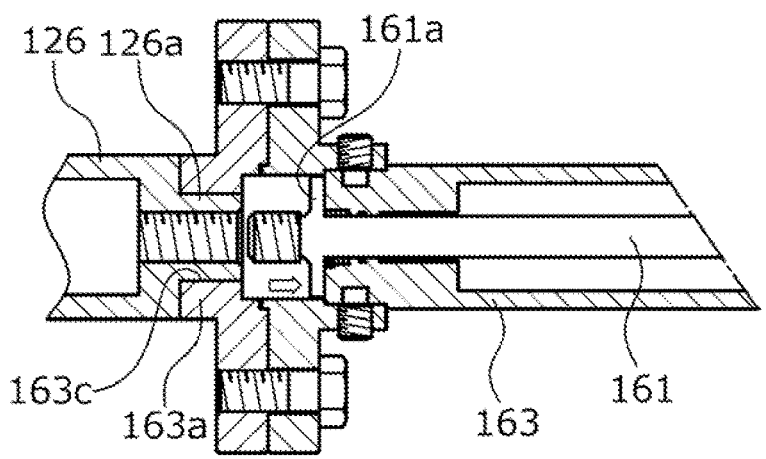
Figure 15C:
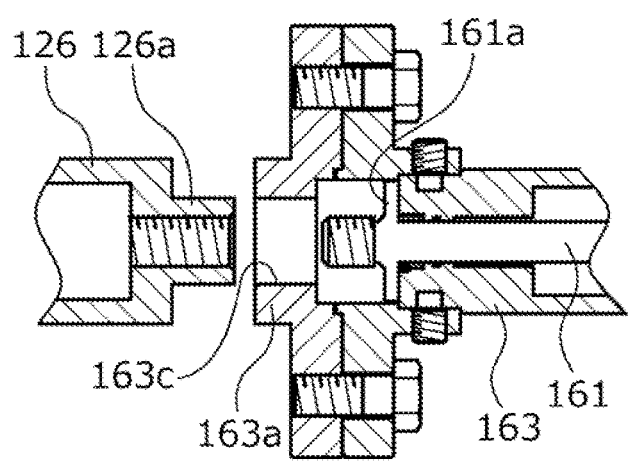

After the fluid control valve 110 is installed as described above, the inserting machine 160 described above is operated to remove the accommodation cylinder 116 assembled to the fluid control valve 110. More specifically, as shown in FIGS. 15A to 15C, first, the extension rod 161 screwed with the attachment jig 126 is rotated to be removed from the attachment jig 126. Next, the operation stick 162 is operated to rotate in a reverse rotation direction to cause the insertion cylinder 163, which is screwed with the operation stick 162, to move toward the base end side, so that the leading end portion 163a of the insertion cylinder 163 is removed from the protruding end portion 126a of the attachment jig 126, which is fitted in a substantially square shape.

After the inserting machine 160 is operated as described above to be separated from the fluid control valve 110, the fluid inside the pipe introduced into the accommodation cylinder 116 is discharged by a drain portion which is not shown, and the accommodation cylinder 116, together with the inserting machine 160, is removed from the casing 105.

Further, the process valve 103 attached to the opening portion 105b of the casing 105 is removed in sequence. At this time, since the seal member 121 seals the inner peripheral surface 105j ahead of the opening portion 105b of the neck portion 105d, even when the opening portion 105b is opened, leakage of the fluid thereinside is prevented. As shown in FIG. 16, a closing lid 109 which closes a periphery of the opening portion 105b in a sealed manner after the process valve 103 is removed is detachably attached, and a closing ring 140 formed in an annular shape is attached to the flange portions 105e of the neck portion 105d with a plurality of fastening members 141 disposed in the circumferential direction.

Third Embodiment

Next, a pipe drilling device and an installation method thereof according to a third embodiment of the present invention will be described with reference to FIGS. 18 to 23. Incidentally, the same reference signs are assigned to the same configurations as those in the above-described embodiments, and duplicated descriptions will be omitted. In addition, an installation situation of a pipeline and the like are the same as those in the above-described embodiment. As shown in FIG. 19, the pipe drilling device according to the present invention mainly includes a casing 205 that is externally fitted to a fluid pipe 201 which has been already installed; a process valve 203 that opens and closes the inside of the casing 205; and a drilling machine 207 that drills the fluid pipe 201 inside the casing 205. In the present embodiment, as the pipe drilling device and the installation method thereof, a series of flows from when a predetermined location on the fluid pipe 201 which has been already installed as a pipeline forming member is drilled inside the casing 205 until a fluid control valve 210 is installed inside the casing 205 in an uninterrupted flow state will be described.

Figure 18:
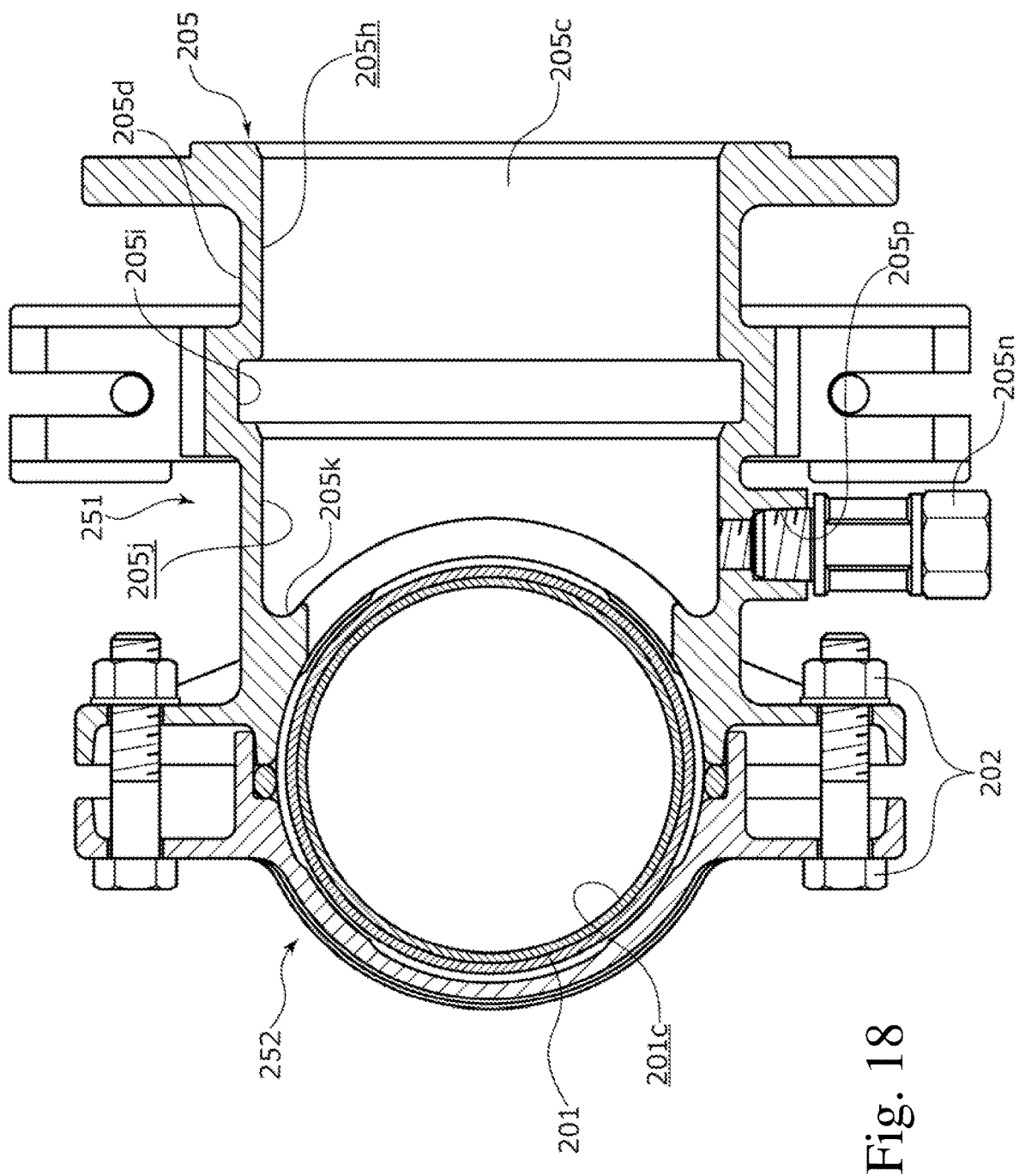
FIG. 18 is a front sectional view showing a casing forming a pipe drilling device according to a third embodiment of the present invention.
Figure 19:
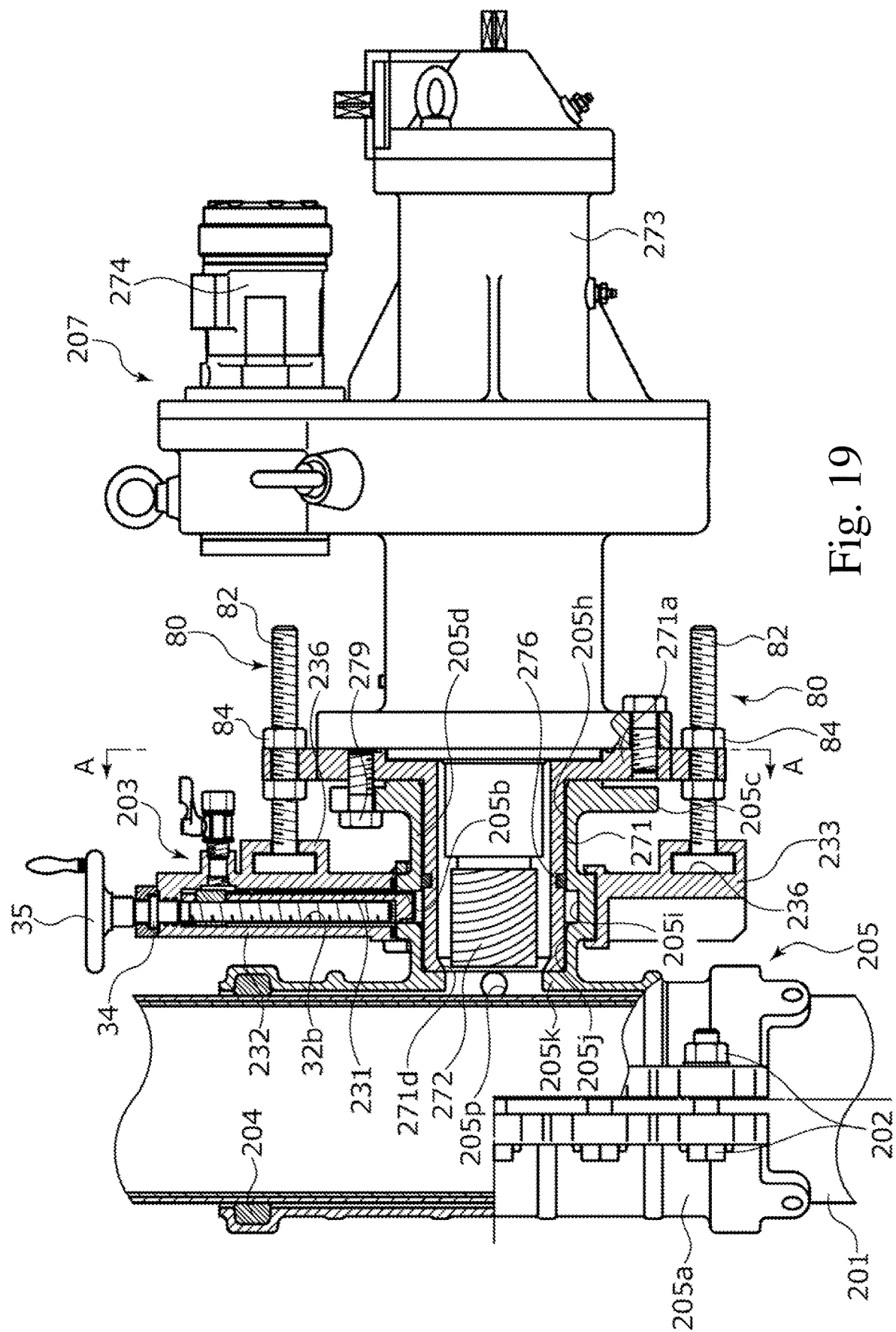
FIG. 19 is a partial sectional plan view showing a drilling machine assembled to the casing.

The fluid pipe 201 of the present embodiment is a ductile cast iron pipe, and as shown in FIG. 18, is formed as a straight pipe having a substantially circular shape in a sectional view.

First, as shown in FIG. 19, after an outer surface of the fluid pipe 201 is cleaned, the outer surface being the location of attachment of a fluid control device according to the present invention, the casing 205 forming the pipe drilling device is externally fitted to the outer surface in a sealed manner via a seal member 204 that seals a drilled portion to be described later of the fluid pipe 201. The casing 205 has a divided structure including a plurality of divided bodies, and in the present embodiment, mainly includes a first divided body 251 forming one side portion and a second divided body 252 forming the other side portion. The first divided body 251 and the second divided body 252 are fastened to each other with fastening members 202, and the casing 205 is externally fitted to the fluid pipe 201 to be rotatable in a circumferential direction in a sealed state. In addition, as shown in FIG. 18, a gap between the first divided body 251 and the second divided body 252 is also sealed with a seal member.

The first divided body 251 of the casing 205 includes a pipeline casing portion 205a extending along the fluid pipe 201 in a pipeline direction, and a neck portion 205d having a cylindrical shape which branches at substantially the center of the pipeline casing portion 205a to extend in the horizontal direction, and which includes an open end portion 205c that is open in a branch direction and an opening portion 205b that is open laterally. The first divided body 251 is formed in a substantially T shape in a plan view.

A peripheral side portion having a cylindrical shape of the neck portion 205d includes the opening portion 205b that is open toward one side in the pipeline direction of the fluid pipe 201. The opening portion 205b is open in a substantially rectangular shape that is long longitudinally in a side view, and as will be described later, is formed such that a process valve body 231 of the process valve 203 can be inserted thereinto.

Figure 20A:
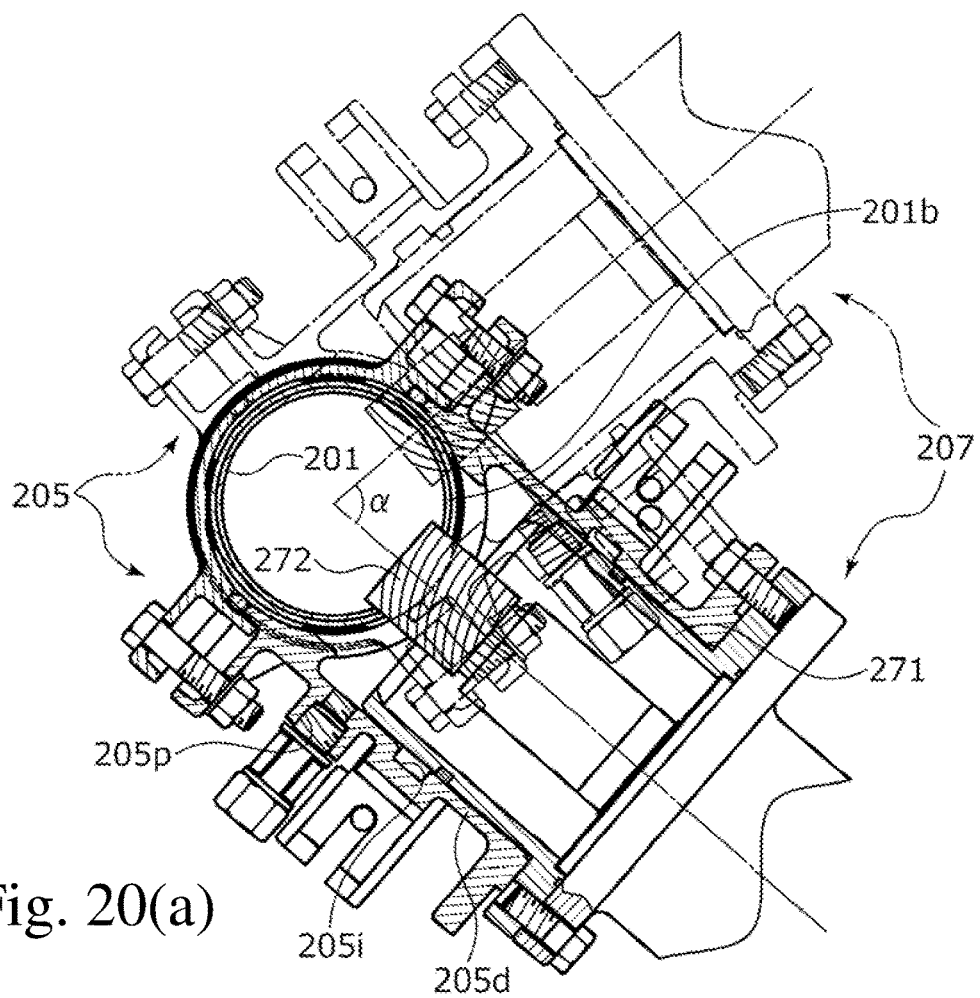
FIG. 20A is a partial sectional front view showing a situation where drilling is performed by the drilling machine.
Figure 20B:
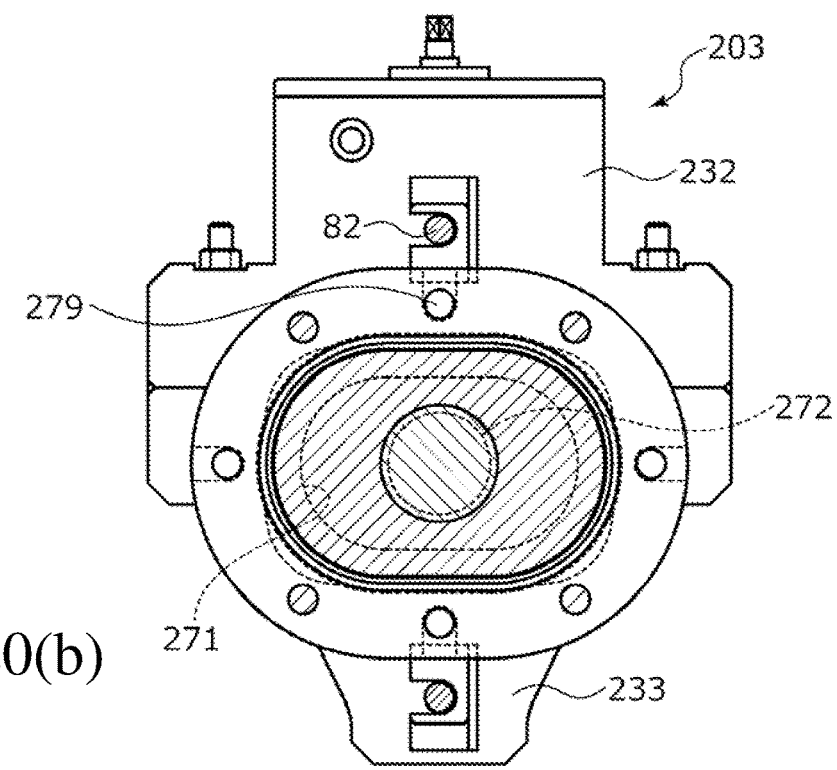
FIG. 20B is a sectional view by the line A-A in FIG. 19.

In addition, as shown in FIGS. 18 and 20B, an inner peripheral portion of the neck portion 205d includes an inner peripheral surface 205h that is formed as a curved surface having a substantially elliptical shape in a side view and is straight in the horizontal direction; a recessed portion 205i as a recessed valve seat portion that is recessed in a radially outward direction along the circumferential direction at the same position as that of the opening portion 205b in an axial direction of the neck portion 205d; an inner peripheral surface 205*j* that is formed closer to a base end side of the neck portion 205*d* than the recessed portion 205*i*, and is formed to be substantially flush with the inner peripheral surface 205*h* on a leading end side of the neck portion 205*d*; and a step portion 205*k* that is continuous with the base end side of the inner peripheral surface 205*j* to protrude in a radially inward direction.

Next, as shown in FIG. 19, the process valve 203 forming the pipe drilling device according to the present invention is connected to the opening portion 205*b* of the neck portion 205*d* in a sealed manner. The process valve 203 has the same configuration as that in the first embodiment described above, and mainly includes the process valve body 231 that is slidable to open and close the inside of the casing 205; an accommodation member 232 as a process valve casing that accommodates the process valve body 231 so as to be slidable in the horizontal direction; and an attachment member 233 that has an inner peripheral surface to be externally fittable to the neck portion 205*d*, together with the accommodation member 232.

Since a detailed configuration and a procedure of attachment of the process valve 203 and characteristics or effects thereof are the same as those of the process valve 3 in the first embodiment described above, descriptions will be omitted.

Next, the drilling machine 207 is connected to the open end portion of the neck portion 205*d* in a sealed manner. The drilling machine 207 mainly includes an attachment flange cylinder 271; an end mill 272 as a cutter that drills the fluid pipe 201; a drive motor 274 that rotates the end mill 272 inside the attachment flange cylinder 271; and an advancing and retreating mechanism 273 that causes the end mill 272 to advance and retreat in the horizontal direction inside the attachment flange cylinder 271. The end mill 272 of the present embodiment is formed as a shaft body having a smaller diameter than that of the fluid pipe 201, and includes cutting edges at a leading end and a peripheral surface thereof.

Prior to the attachment of the drilling machine 207, first, as insertion means for inserting the drilling machine 207 into the casing 205, the pressing unit 80 is attached to support portions 236 and 236 of the process valve 203. Since a detailed configuration and a procedure of attachment of the pressing unit 80 are the same as those in the first embodiment described above, descriptions will be omitted.

A procedure of attaching the drilling machine 207 will be described. The attachment flange cylinder 271 of the drilling machine 207 is inserted into the neck portion 205*d* by the pressing unit 80, and a flange portion 271*a* formed at a base end of the attachment flange cylinder 271 comes into contact with the open end portion 205*c* of the neck portion 205*d* to be fastened thereto with fastening members 279. In addition, the attachment flange cylinder 271 is formed in a substantially cylindrical shape having an outer peripheral surface with a slightly smaller diameter than that of the inner peripheral surfaces 205*h* and 205*j* of the neck portion 205*d*, and is inserted into the neck portion 205*d* to a position where the attachment flange cylinder 271 covers an opening of the recessed portion 205*i*. Namely, the attachment flange cylinder 271 provided in the drilling machine 207 forms a cylindrical portion of the present invention.

Further, since the attachment flange cylinder 271 is disposed to be slidable along the inner peripheral surfaces 205*h* and 205*j* of the neck portion 205*d*, the accuracy of movement of the attachment flange cylinder 271 can be improved, and the recessed portion 205*i* can be reliably closed or opened.

In addition, a seal member 276 which is a seal component of the present invention is provided on an outer peripheral surface of the attachment flange cylinder 271, and the seal member 276 comes into close contact with the inner peripheral surface 205*h* of the neck portion 205*d*, so that the attachment flange cylinder 271 of the drilling machine 207 and the neck portion 205*d* of the casing 205, which are in a connection state, are sealed. Incidentally, as in the first embodiment described above, a seal member which seals the inner peripheral surface 205*j* of the neck portion 205*d* may be provided.

Next, a step of drilling the fluid pipe 201 using the drilling machine 207 will be described. As shown in FIG. 20, first, in a state where the process valve body 231 of the process valve 203 is disposed in an accommodation inner portion of the accommodation member 232, and the inside of the casing 205 is opened, the drive motor 274 of the drilling machine 207 rotates the end mill 272, and the advancing and retreating mechanism 273 causes the end mill 272 to advance ahead, thus to drill and penetrate through a pipe wall of the fluid pipe 201 in an uninterrupted flow state.

In addition, after the above-described penetration, the casing 205 to which the drilling machine 207 is attached and which is externally fitted to the fluid pipe 201 in a sealed manner is oscillated at a predetermined angle α in the circumferential direction of the fluid pipe 201 while a sealed state is maintained. In such a manner, the end mill 272 oscillates in the circumferential direction following the oscillation of the casing 205, to drill the fluid pipe 201, and as a result, a hole portion 201*b* which extends longer in the pipe circumferential direction than in the pipe axis direction of the fluid pipe 201 is drilled.

At this time, particularly in a branch in the horizontal direction as in the present embodiment, a part of chips of the fluid pipe 201 generated during drilling enters the neck portion 205*d*; however, since the opening of the recessed portion 205*i* is closed by the attachment flange cylinder 271, the chips can be prevented from entering the recessed portion 205*i*. The chips which have entered the neck portion 205*d* are deposited on or adhere to an inner surface of the attachment flange cylinder 271 covering the recessed portion 205*i*.

In addition, since a protrusion portion 271*d* protruding radially inward is formed in a leading end portion of the attachment flange cylinder 271, not only during drilling but also when the attachment flange cylinder 271 is removed from the neck portion 205*d* after drilling, the chips deposited on or adhering to the inner surface of the attachment flange cylinder 271 can be suppressed from falling to the inner peripheral surfaces 205*h* and 205*j* and the recessed portion 205*i* of the neck portion 205*d*.

In addition, in this case, for example, as a discharge port communicating with the inside and the outside of the casing 205, a female screw hole 205*p* is formed closer to a fluid pipe 201 side than the recessed portion 205*i* of the casing 205, namely, on the base end side of the neck portion 205*d*. A ball valve which is provided to be able to open and close the female screw hole 205*p* and is not shown is installed to discharge the chips generated during drilling to the outside, together with the fluid. In such a manner, the chips generated during drilling can be discharged to the outside via the female screw hole 205*p* formed on a base end portion side of the neck portion 205*d*, which is upstream of the recessed portion 205*i*, without the chips approaching a recessed portion 205*i* side. The ball valve described above is removed in an uninterrupted flow state after the drilling, and the female screw hole 205*p* is sealed with a plug which is not shown. Incidentally, as shown in FIG. 7, a leading end surface of the attachment flange cylinder 271 may be curvedly formed, or may include a communication port communicating with the discharge port for chips.

Figure 21:
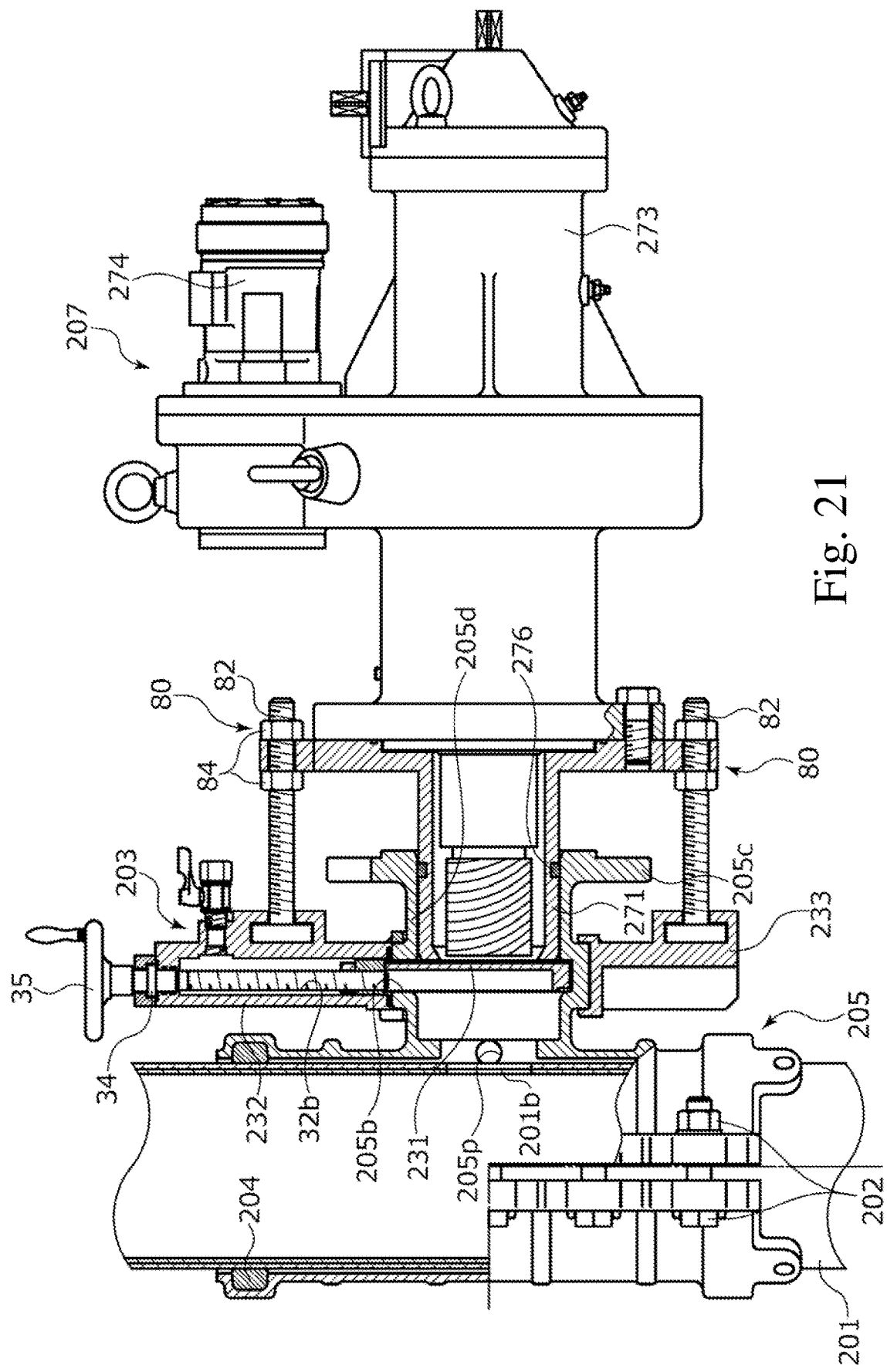
FIG. 21 is a partial sectional plan view showing a situation after drilling by the drilling machine.

In addition, as shown in FIG. 21, after the end mill 272 has drilled the fluid pipe 201, the end mill 272 is pulled into the attachment flange cylinder 271, the attachment flange cylinder 271 is pulled rearward from the recessed portion 205*i*, and the process valve body 231 of the process valve 203 closes the inside of the casing 205, so that work of drilling the fluid pipe 201 is completed. As described above, since the opening of the recessed portion 205*i* inside the neck portion 205*d* of the casing 205 is closed by the attachment flange cylinder 271, chips generated by the drilling of the fluid pipe 201 inside the casing 205 can be prevented from entering the recessed portion 205*i*. Therefore, the process valve body 231 can come into contact with the recessed portion 205*i* which is clean and in which the attachment flange cylinder 271 is opened, and the casing 205 can be sealed.

Next, work of removing the drilling machine 207 is performed in a state where the process valve body 231 of the process valve 203 closes the inside of the casing 205 in a sealed manner. Incidentally, it is preferable that instead of the drilling machine 207, a discharger which discharges chips generated during drilling and is not shown is connected to the open end portion 205*c* of the neck portion 205*d*, and the chips remaining inside the casing 205 or the fluid pipe 201 are discharged to the outside by the discharger.

Next, work of removing the discharger is performed in a state where the process valve body 231 of the process valve 203 closes the inside of the casing 205, and instead of the discharger, the fluid control valve 210 which controls the fluid inside the pipe is connected to the open end portion 205*c* of the neck portion 205*d*.

Figure 22:
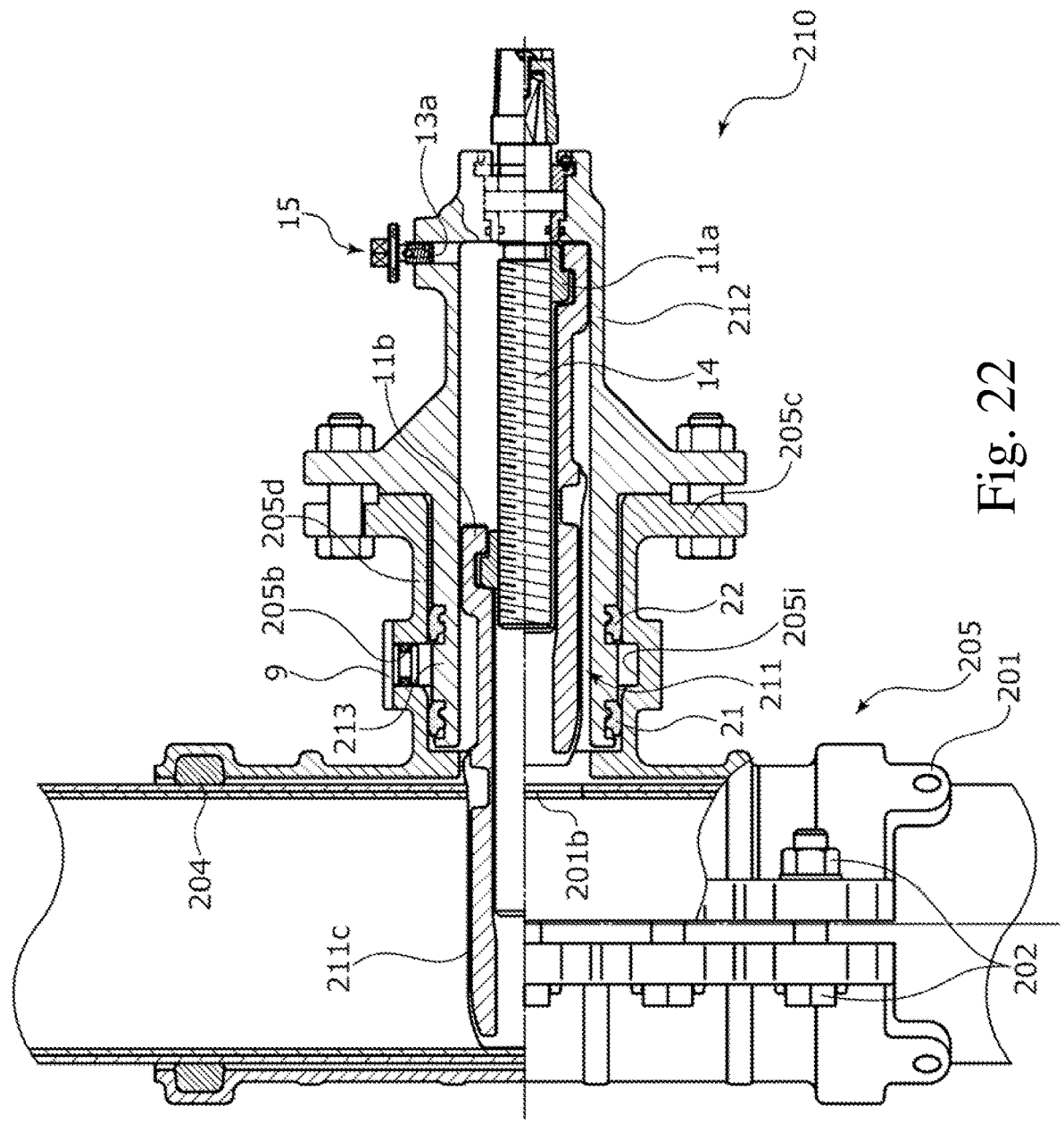
FIG. 22 is a partial sectional plan view showing a situation after installation of a fluid control valve.
Figure 23:
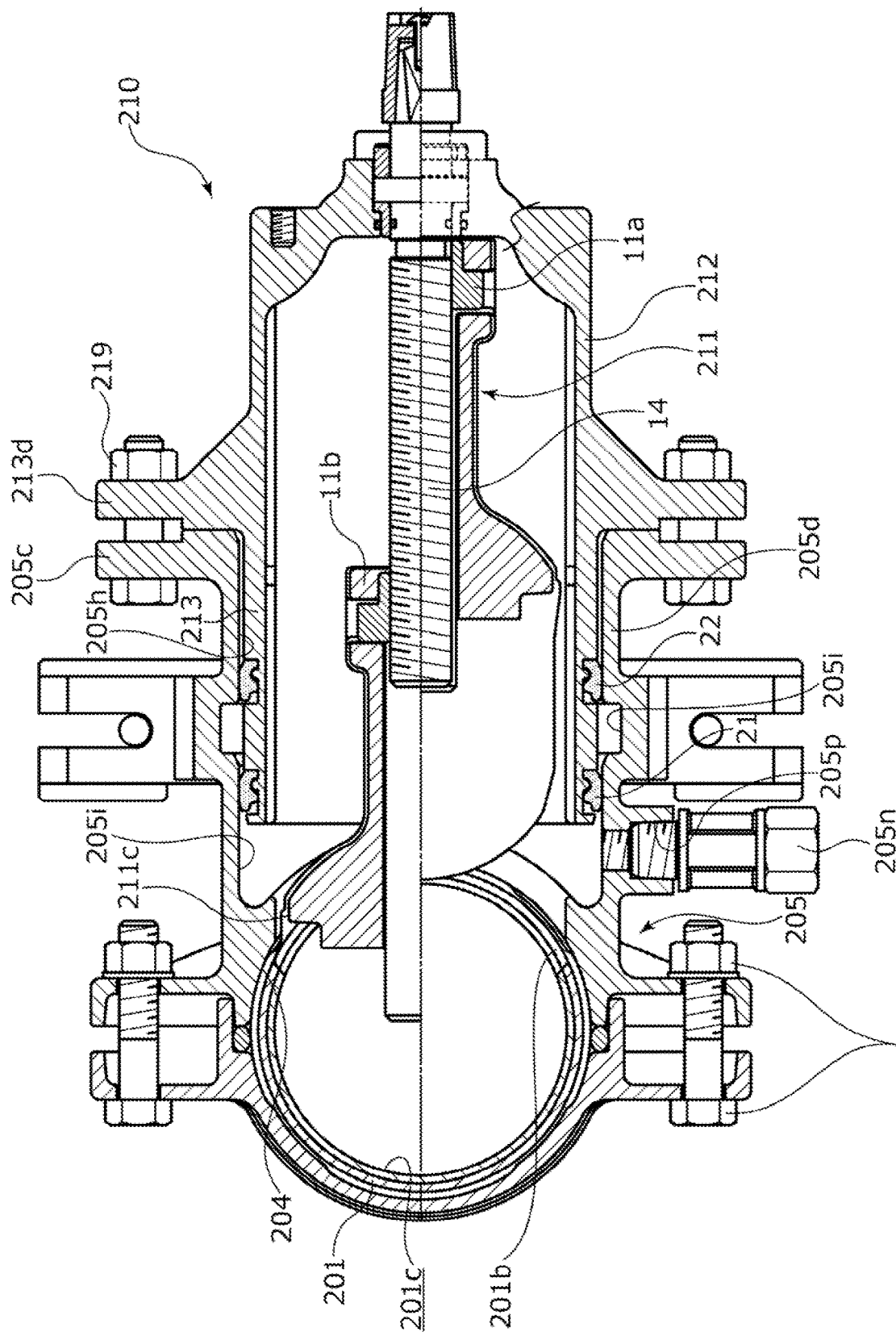
FIG. 23 is a front sectional view of the same as in FIG. 22.

As shown in FIGS. 22 and 23, the fluid control valve 210 mainly includes a plug 211 (valve body) that passes through the hole portion 201*b* of the fluid pipe 201 which has been drilled, to be movable in the horizontal direction to open and close the inside of the pipe, and a valve casing 212 that accommodates the plug 211 so as to be movable in the horizontal direction, and includes a peripheral side portion 213 of which the leading end is open. The valve casing 212 includes the shaft member 14 that extends in the horizontal direction in a state where the shaft member 14 is pivotally supported so as to rotate and so as not to move back and forth. The plug 211 is screwed with the shaft member 14, and when an operation portion of an end portion of the shaft member 14 is operated to rotate, the end portion protruding outward from the valve casing 212, the plug 211 is movable with respect to the valve casing 212 in an axial direction of the shaft member 14.

Since a detailed configuration and a step of installation of the fluid control valve 210 are the same as those of the fluid control valve 10 in the first embodiment described above, descriptions will be omitted.

As shown in FIGS. 22 and 23, the fluid control valve 210 is pressed to an installation position where the first seal member 21 comes into close contact with the inner peripheral surface 205*j* of the neck portion 205*d* on an inner side (fluid pipe 201 side) beyond the opening portion 205*b*, and the second seal member 22 comes into close contact with the inner peripheral surface 205*h* located closer to an outer side than the opening portion 205*b*.

The open end portion 205*c* of the casing 205 and an extension portion 213*d* of the fluid control valve 210 overlapping the open end portion 205*c* are fitted to each other with a fitting member 219, so that the fluid control valve 210 is restricted from coming out from the casing 205 toward the outer side.

Next, pipe drilling devices and installation methods thereof according to first to seventh modified examples in the aforesaid embodiments will be described with reference to FIGS. 24 to 32. Incidentally, the same reference signs are assigned to the same configurations as those in the above-described embodiments, and duplicated descriptions will be omitted. In addition, an installation situation of a pipeline and the like are the same as those in the above-described embodiment. In addition, the modified examples will be described as modified examples of the mode of the second embodiment, but are not limited thereto. The modified examples may be applied to the first or third embodiment, and for example, a plurality of modified examples such as including the mechanisms of both the first and second modified examples may be applied.

Figure 24:
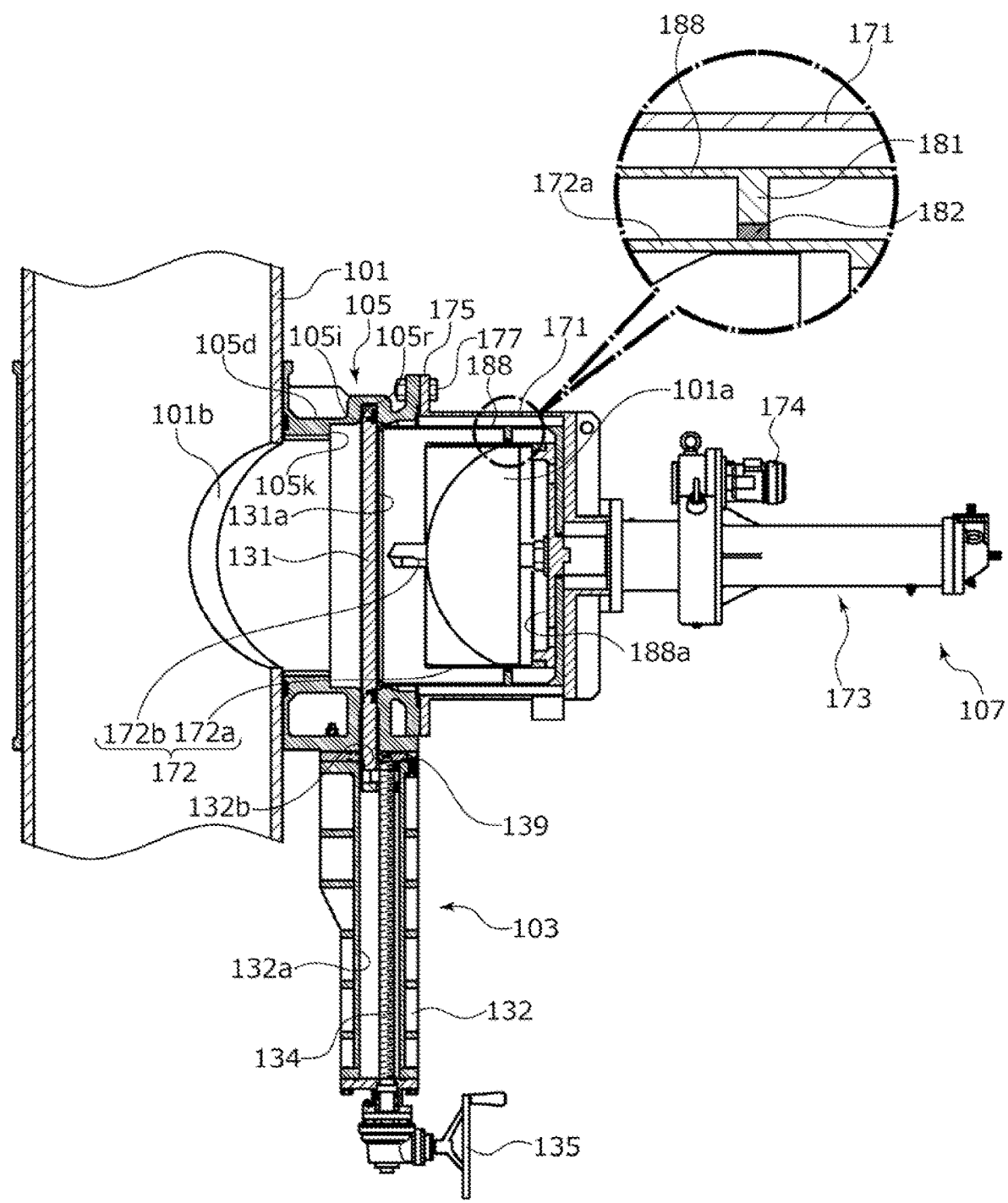
FIG. 24 is a partial sectional plan view showing a situation where drilling is performed by a pipe drilling device in a first modified example.

First, the pipe drilling device and the installation method thereof according to the first modified example will be described with reference to FIGS. 24 and 25. As shown in FIG. 24, inside the attachment flange cylinder 171, a cylindrical body 188 which is externally fitted to the cutter 172 so as to be movable is provided to be movable with respect to the attachment flange cylinder 171 in the horizontal direction, and is inserted into the neck portion 105*d* to a position where the cylindrical body 188 covers the opening of the recessed portion 105*i*. Namely, the cylindrical body 188 forms a cylindrical portion of the present invention.

The cylindrical body 188 is formed in a bottomed cylindrical shape having an outer peripheral surface with a slightly smaller diameter than those of the inner peripheral surfaces 105*h* and 105*j* of the neck portion 105*d*. A protrusion portion 181 as an engaging portion, which protrudes radially inward from an inner peripheral surface on a base end side of the cylindrical body 188, and a rubber member 182 are connected to or releasably engaged with an outer peripheral surface of the cutter 172.

More specifically, the rubber member 182 which is elastically deformable is provided at a leading end on a radially inward side of the protrusion portion 181, and the rubber member 182 is interposed between the protrusion portion 181 and the outer peripheral surface of the cutter 172, so that the cylindrical body 188 is connected to the cutter 172. Therefore, when the advancing and retreating mechanism 173 causes the cutter 172 to advance in the horizontal direction, the cylindrical body 188 advances toward the fluid pipe 101 following the cutter 172.

Figure 25:
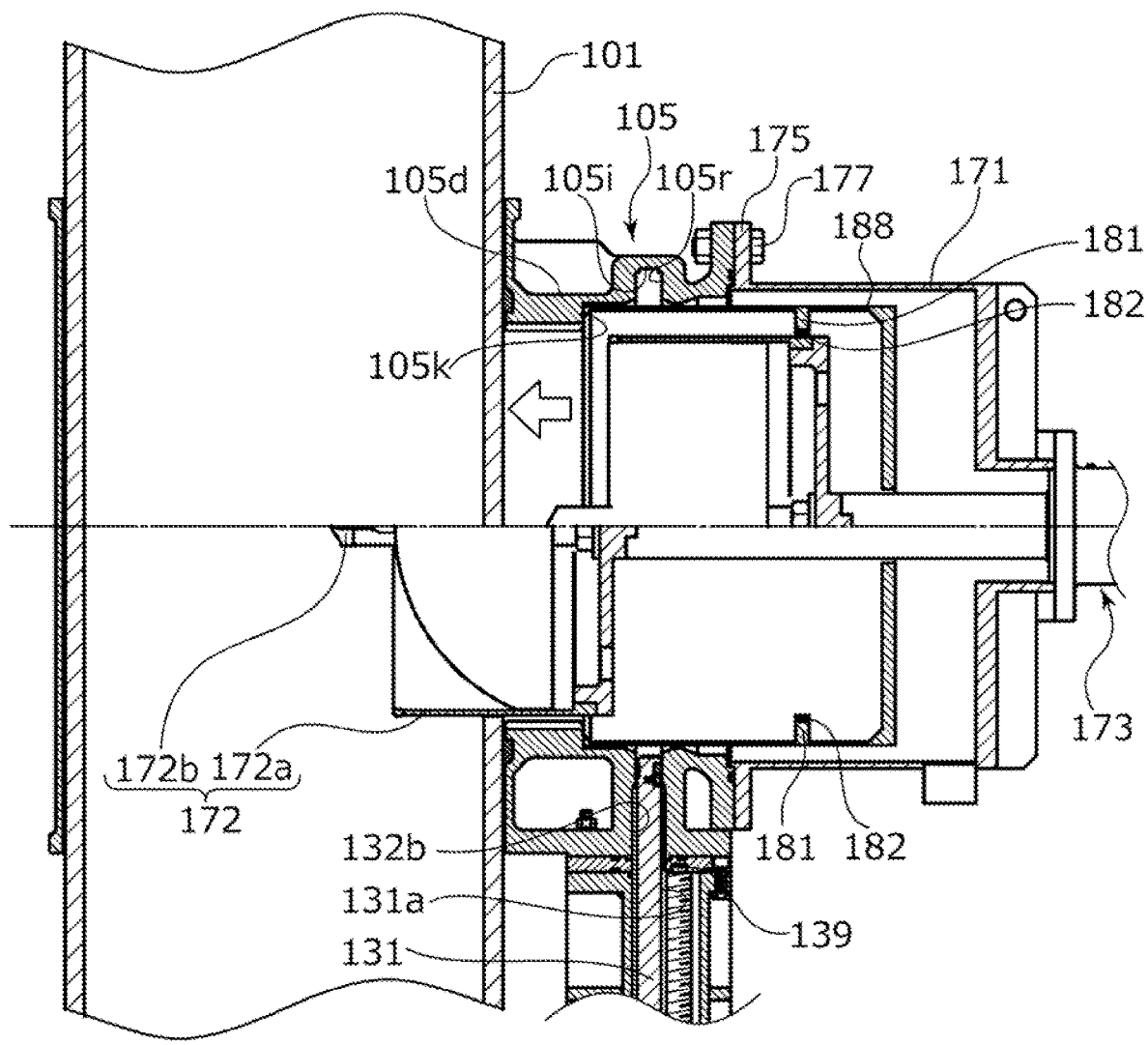
FIG. 25 is an enlarged view of the same as in FIG. 24.

In addition, as shown on an upper side of FIG. 25, a leading end surface in an axial direction of the cylindrical body 188 which advances following the cutter 172 comes into contact with the step portion 105*k* formed inside the neck portion 105*d* of the casing 105, so that the insertion of the cylindrical body 188 is completed.

Further, as shown on the upper side and a lower side of FIG. 25, when the cutter 172 is pressed in the horizontal direction by the advancing and retreating mechanism 173, a connection state between the cutter 172 and the cylindrical body 188 is released, and the cutter 172 advances alone in the horizontal direction to drill and cut the fluid pipe 101. Chips generated during drilling are prevented from entering the recessed portion 105*i* by the cylindrical body 188.

Incidentally, instead of the rubber member 182 provided at the leading end of the protrusion portion 181, although not particularly shown, a recess may be formed in the outer peripheral surface of the cutter 172, and a protrusion at the leading end on the radially inward side of the protrusion portion 181 may protrusion-recess fitted to the recess, or a ball plunger may be provided at the leading end on the radially inward side of the protrusion portion 181 to be engaged with the outer peripheral surface of the cutter 172 in a pressing manner.

In addition, as shown in FIG. 24, when the fluid pipe 101 is cut by the cutter 172, the cutter 172, together with the cut piece 101a, is pulled into the attachment flange cylinder 171, the cutter 172 and the cylindrical body 188 are connected to each other again, and a base end surface of the cutter 172 comes into contact with an inner bottom surface 188a of the cylindrical body 188, so that the cylindrical body 188 retreats into the attachment flange cylinder 171 following the cutter 172.

In such a manner, the cutter 172 and the cylindrical body 188 can be easily connected to or released from each other only by moving the cutter 172.

Figure 26:
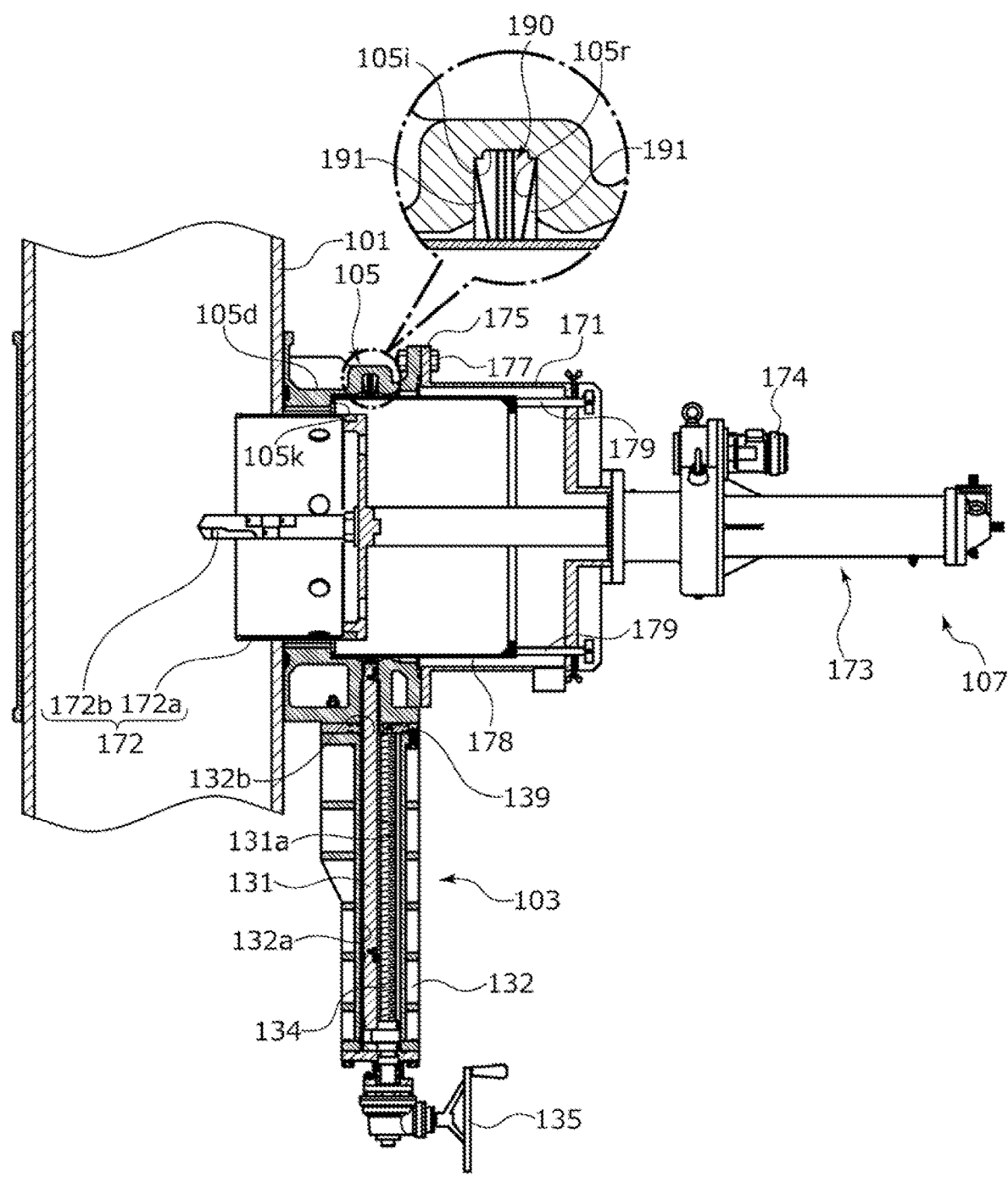
FIG. 26 is a partial sectional plan view showing a situation where drilling is performed by a pipe drilling device in a second modified example.

Next, the pipe drilling device and the installation method thereof according to the second modified example will be described with reference to FIGS. 26 and 27. As shown in FIG. 26, inside the attachment flange cylinder 171, the cylindrical body 178 which is externally fitted to the cutter 172 so as to be movable is provided to be movable with respect to the attachment flange cylinder 171 in the horizontal direction, and when the operation portion 179 which is fixed to the base end side of the cylindrical body 178 and extends outward from the attachment flange cylinder 171 in a sealed state is operated to be pushed, the cylindrical body 178 is inserted into the neck portion 105d to the position where the cylindrical body 178 covers the opening of the recessed portion 105i. Namely, the cylindrical body 178 forms a cylindrical portion of the present invention.

A sweeping portion 190 including a large number of hair-like members 191, 191, . . . which are raised radially outward from the outer peripheral surface on a leading end side of the cylindrical body 178 is provided over the entire periphery of the cylindrical body 178. The sweeping portion 190 is configured to enter the recessed portion 105i, or to come out from the inside of the recessed portion 105i as the cylindrical body 178 moves to advance or retreat. In addition, the sweeping portion 190 may be provided on the entirety of the outer peripheral surface of the cylindrical body 178, or may be partially provided thereon.

In addition, the hair-like members 191 forming the sweeping portion 190 is made of a material such as metal, resin, or fiber, and has a function of sweeping contaminants such as chips in the recessed portion 105i to the outside like a broom or a brush.

Figure 27:
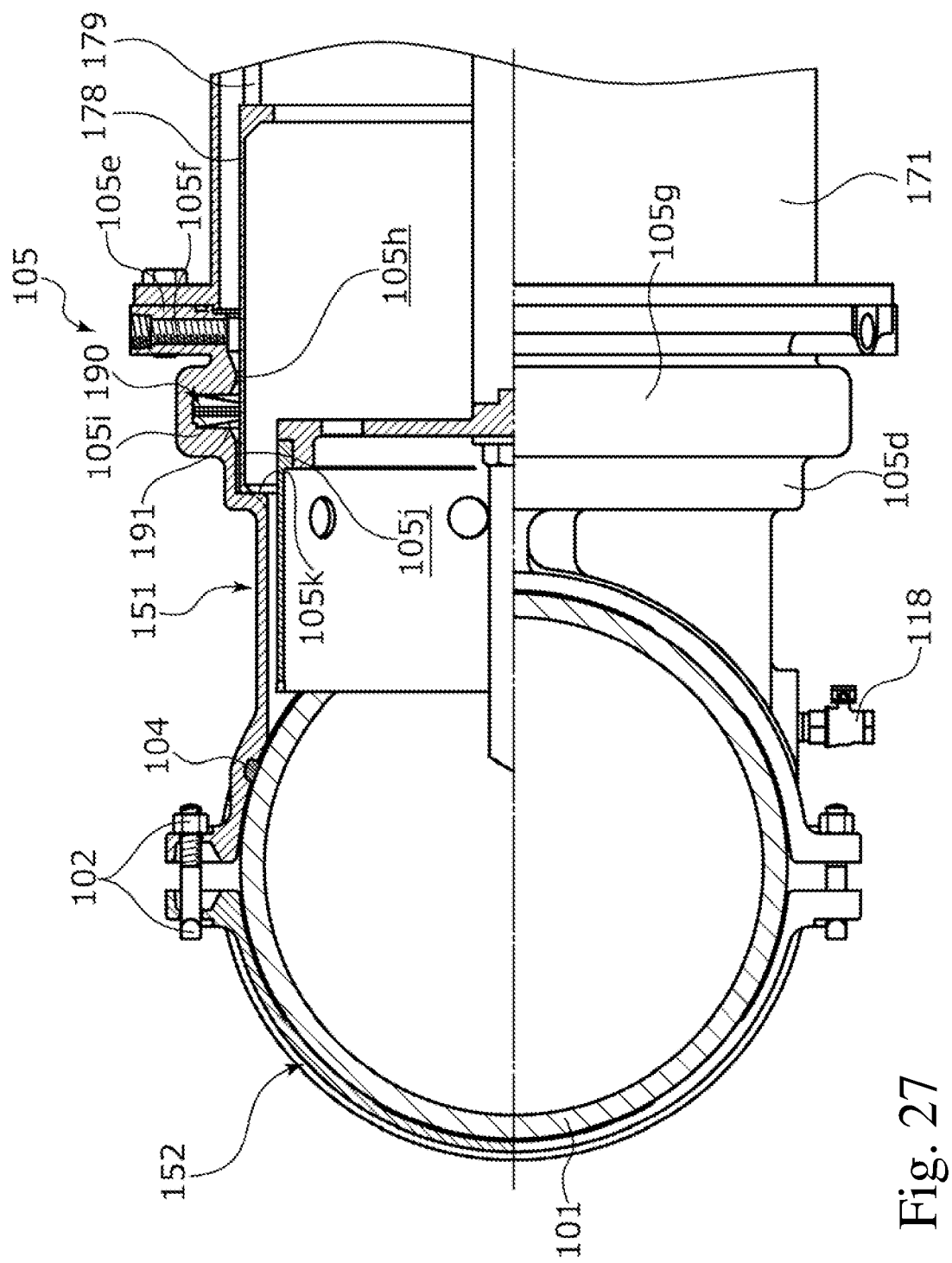
FIG. 27 is a partial sectional front view of the same as in FIG. 26.

As shown in FIGS. 26 and 27, the leading end surface in the axial direction of the cylindrical body 178 inserted into the neck portion 105d by the operation portion 179 comes into contact with the step portion 105k formed inside the neck portion 105d of the casing 105, so that the insertion of the cylindrical body 178 is completed. At the insertion completion position, the sweeping portion 190 is inserted into the recessed portion 105i. In such a manner, foreign matter such as chips can be suppressed from entering the recessed portion 105i.

In addition, when the fluid pipe 101 is cut by the cutter 172, the cutter 172, together with the cut piece, is pulled into the attachment flange cylinder 171, and the cylindrical body 178 is also pulled into the attachment flange cylinder 171, the sweeping portion 190 operates to sweep outward from the inside of the recessed portion 105i. In such a manner, even when foreign matter such as chips enters the recessed portion 105i, the foreign matter can be discharged to outside of the recessed portion 105i.

Figure 28:
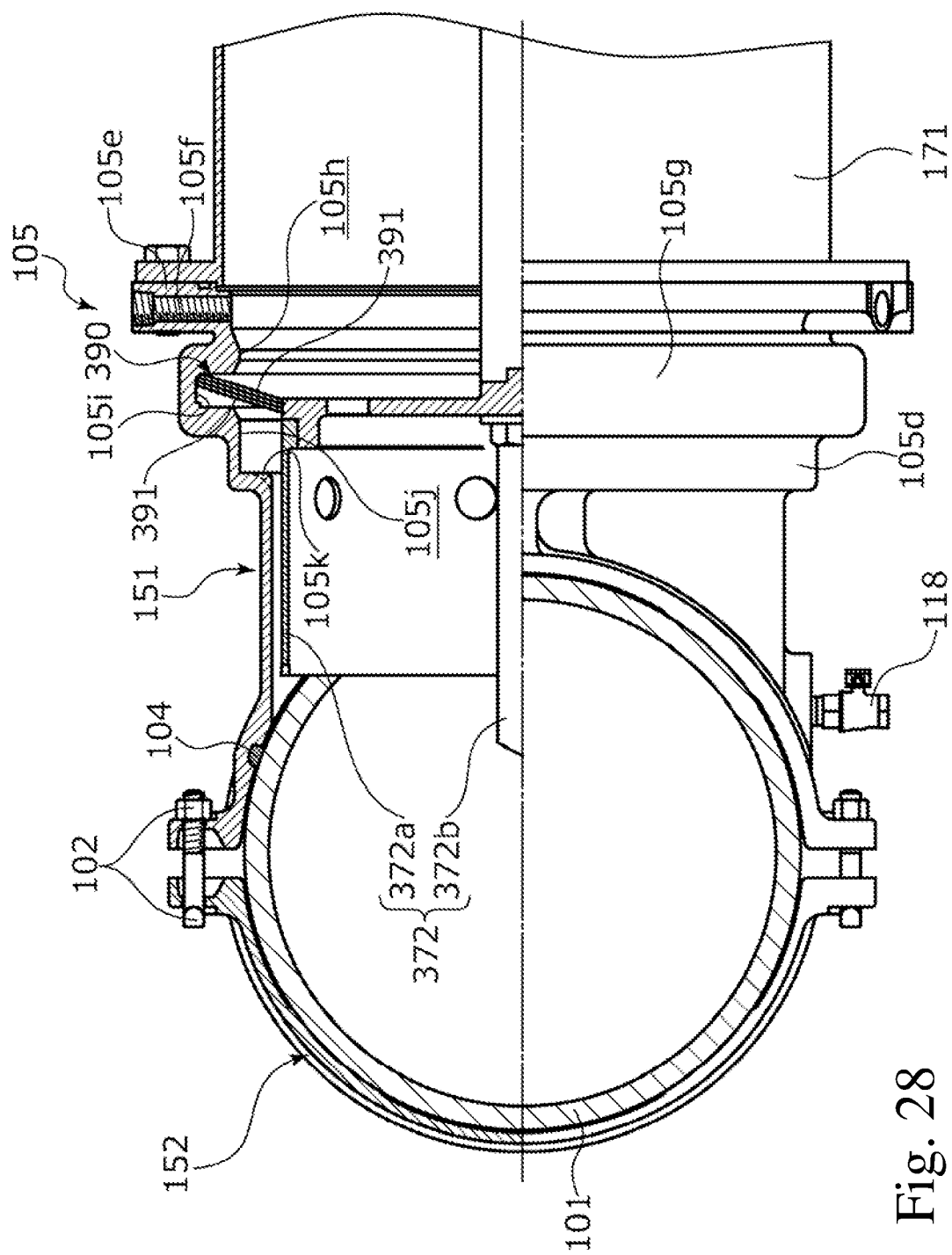
FIG. 28 is a partial sectional front view showing a situation where drilling is performed by a pipe drilling device in a third modified example.

Next, the pipe drilling device and the installation method thereof according to the third modified example will be described with reference to FIG. 28. As shown in FIG. 28, inside the attachment flange cylinder 171, a cutter 372 is provided to be movable with respect to the attachment flange cylinder 171 in the horizontal direction. The cutter 372 includes a hole saw 372a that is formed in a bottomed cylindrical shape having a smaller diameter than that of the fluid pipe 101, and includes cutting edges at a leading end thereof along the circumferential direction, and a center drill 372b that is disposed coaxially with a rotation axis of the hole saw 372a to protrude ahead of the cutting edges.

When the advancing and retreating mechanism 173 connected to a base end side of the hole saw 372a is operated, the hole saw 372a is inserted into the neck portion 105d to a position where the hole saw 372a covers the opening of the recessed portion 105i. Namely, the hole saw 372a forms a part of the cutter 372 of the present invention, and forms a cylindrical portion of the present invention. In such a manner, the hole saw 372a which is a part of the cutter 372 can be used to simplify the configuration of the cylindrical portion.

A sweeping portion 390 including a large number of hair-like members 391, 391, . . . which are raised radially outward from an outer peripheral surface of a base end portion of the hole saw 372a is provided over the entire periphery of the hole saw 372a. The sweeping portion 390 is configured to enter the recessed portion 105i, or to come out from the inside of the recessed portion 105i as the hole saw 372a moves to advance or retreat. In addition, the sweeping portion 390 may be provided on the entirety of the outer peripheral surface of the hole saw 372a, or may be partially provided thereon.

In addition, the hair-like members 391 forming the sweeping portion 390 is made of a material such as metal, resin, or fiber, and has a function of sweeping contaminants such as chips in the recessed portion 105i to the outside like a broom or a brush.

As shown in FIG. 28, at a position where the cutting edges at the leading end in the axial direction of the hole saw 372a inserted into the neck portion 105d by the advancing and retreating mechanism 173 come into contact with and drill the outer surface of the fluid pipe 101, the sweeping portion 390 is inserted into the recessed portion 105i. In such a manner, foreign matter such as chips can be suppressed from entering the recessed portion 105i.

Further, since the hole saw 372a rotates when the cutter 372 performs drilling, the sweeping portion 390 inserted into the recessed portion 105i rotates in the circumferential direction to increase fluidity in the recessed portion 105i, so that foreign matter such as chips can be restrained from entering the recessed portion 105i.

In addition, when the fluid pipe 101 is cut by the cutter 372, and the cutter 372, together with the cut piece 101a, is pulled into the attachment flange cylinder 171, the sweeping portion 390 operates to sweep outward from the inside of the recessed portion 105i. In such a manner, even when foreign matter such as chips enters the recessed portion 105i, the foreign matter can be discharged to outside of the recessed portion 105i.

Figure 29:
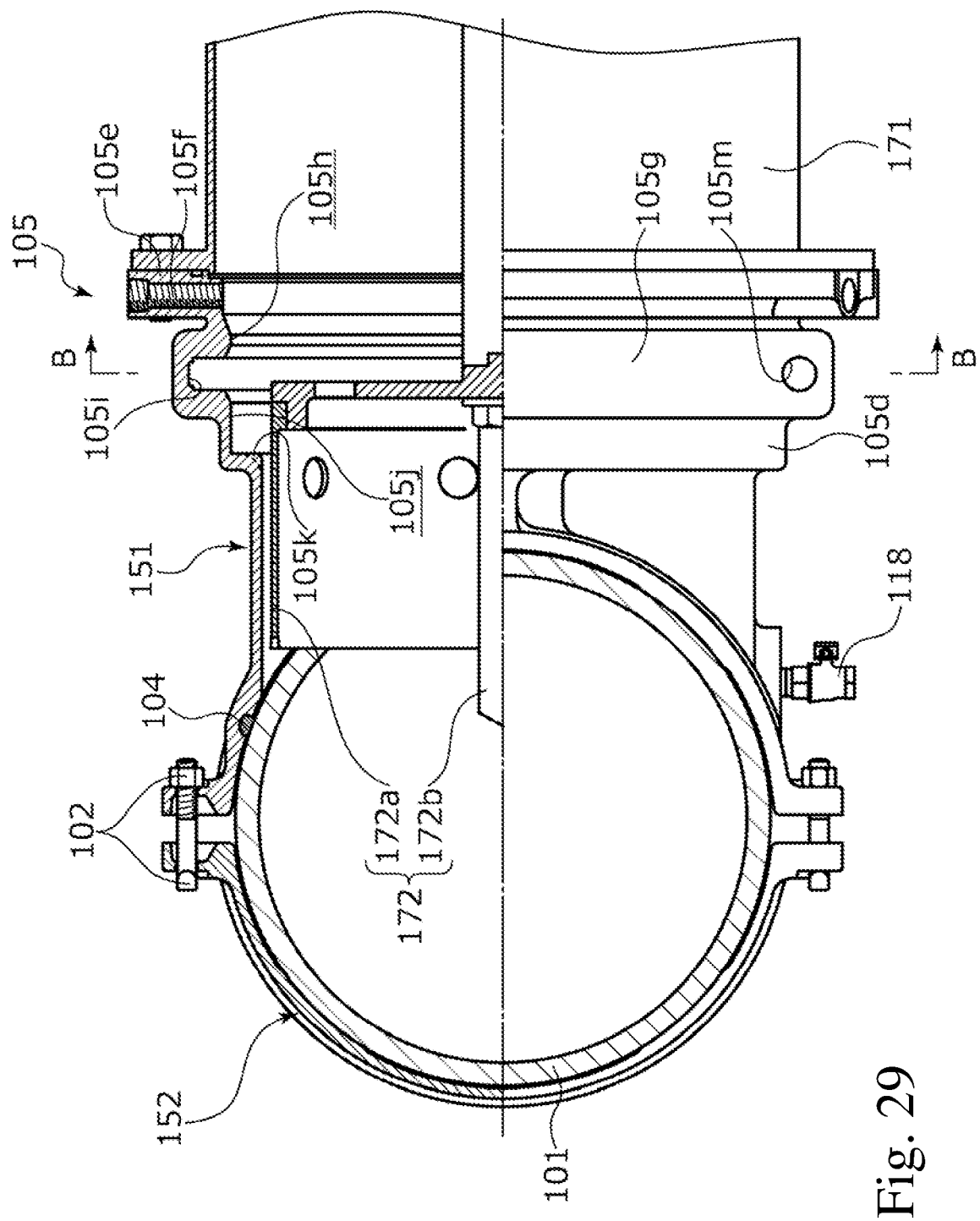
FIG. 29 is a partial sectional front view showing a situation where drilling is performed by a pipe drilling device in a fourth modified example.
Figure 30:
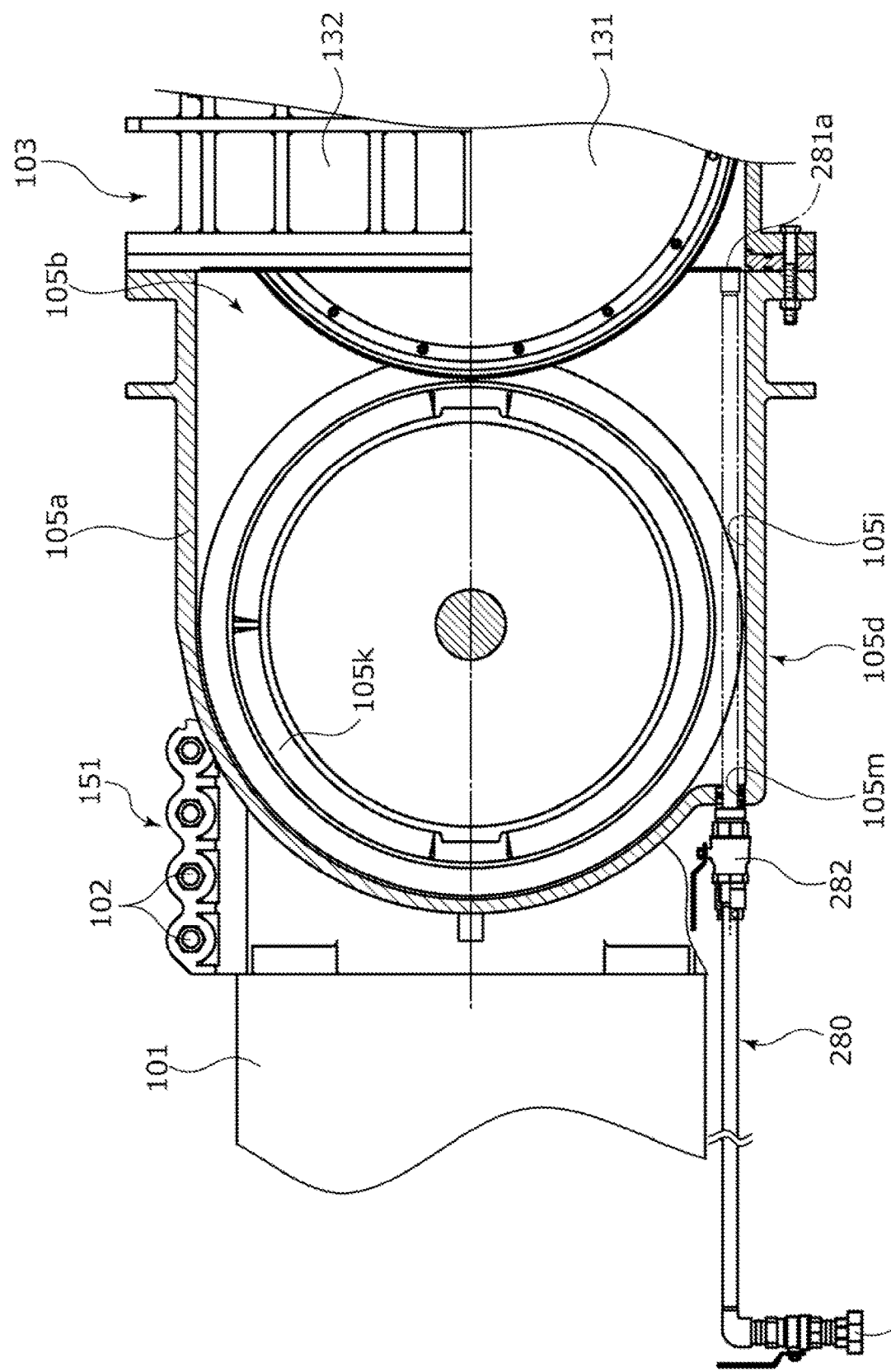
FIG. 30 is a sectional view by the line B-B in FIG. 29.

Next, the pipe drilling device and the installation method thereof according to the fourth modified example will be described with reference to FIGS. 29 and 30. As shown in FIGS. 29 and 30, a suction pipe 280 formed of a rod-shaped body for discharging chips which has a small hole diameter is inserted into the neck portion 105d of the casing 105 in a substantially horizontal direction in a sealed state via a through-hole 105m formed in the casing 105, and is disposed at a position where the suction pipe 280 covers the opening of the recessed portion 105i from above, the opening being located therebelow in a vertical direction. Namely, the suction pipe 280 forms a cylindrical portion of the present invention.

The suction pipe 280 has a hollow structure in which a leading end opening 281a disposed inside the neck portion 105d and a rear end opening 281b disposed outside communicate with each other. A valve 282 disposed outside the casing 105 can open and close a communication passage communicating with both the openings 281a and 281b of the suction pipe 280, namely, the inside and the outside of the neck portion 105d.

As shown in FIG. 30, the suction pipe 280 inserted into the neck portion 105d covers the opening of the recessed portion 105i from above. In such a manner, foreign matter such as chips can be suppressed from entering the recessed portion 105i.

In addition, during cutting of the fluid pipe 101 by the cutter 172, or after the fluid pipe 101 is cut and the cutter 172, together with the cut piece 101a, is pulled into the attachment flange cylinder 171, the valve 282 of the suction pipe 280 is opened, so that the chips, together with the fluid inside the neck portion 105d, are suctioned from the leading end opening 281a of the suction pipe 280 to be discharged from the rear end opening 281b to the outside of the casing 105.

In such a manner, foreign matter such as chips inside the casing 105 can be discharged to the outside through the suction pipe 280 leading to the inside and the outside of the casing 105. In addition, in a state where the valve 282 is opened, the suction pipe 280 inside the neck portion 105d appropriately moves to advance and retreat along the recessed portion 105i, so that the efficiency of suctioning the chips can be increased. Incidentally, the number of the suction pipes 280 is not limited to 1, and a predetermined number of the suction pipes 280 may be provided. In addition, the suction pipe 280 may be removed, for example, during cutting of the fluid pipe 101, and after the cutting is completed, the valve 282 may be attached to discharge foreign matter such as chips to the outside. Incidentally, it is preferable that subsequently thereafter, the suction pipe 280 is removed; however, the present invention is not limited thereto, and during work of removing the drilling machine 107, when closing is performed in a sealed manner by the process valve body 131, the valve 282 or a valve at the rear end opening 281b is opened, and foreign matter such as chips may be pushed out and discharged by the process valve body 131. The valve 282 can be removed after the fluid control valve 110 is attached.

Figure 31:
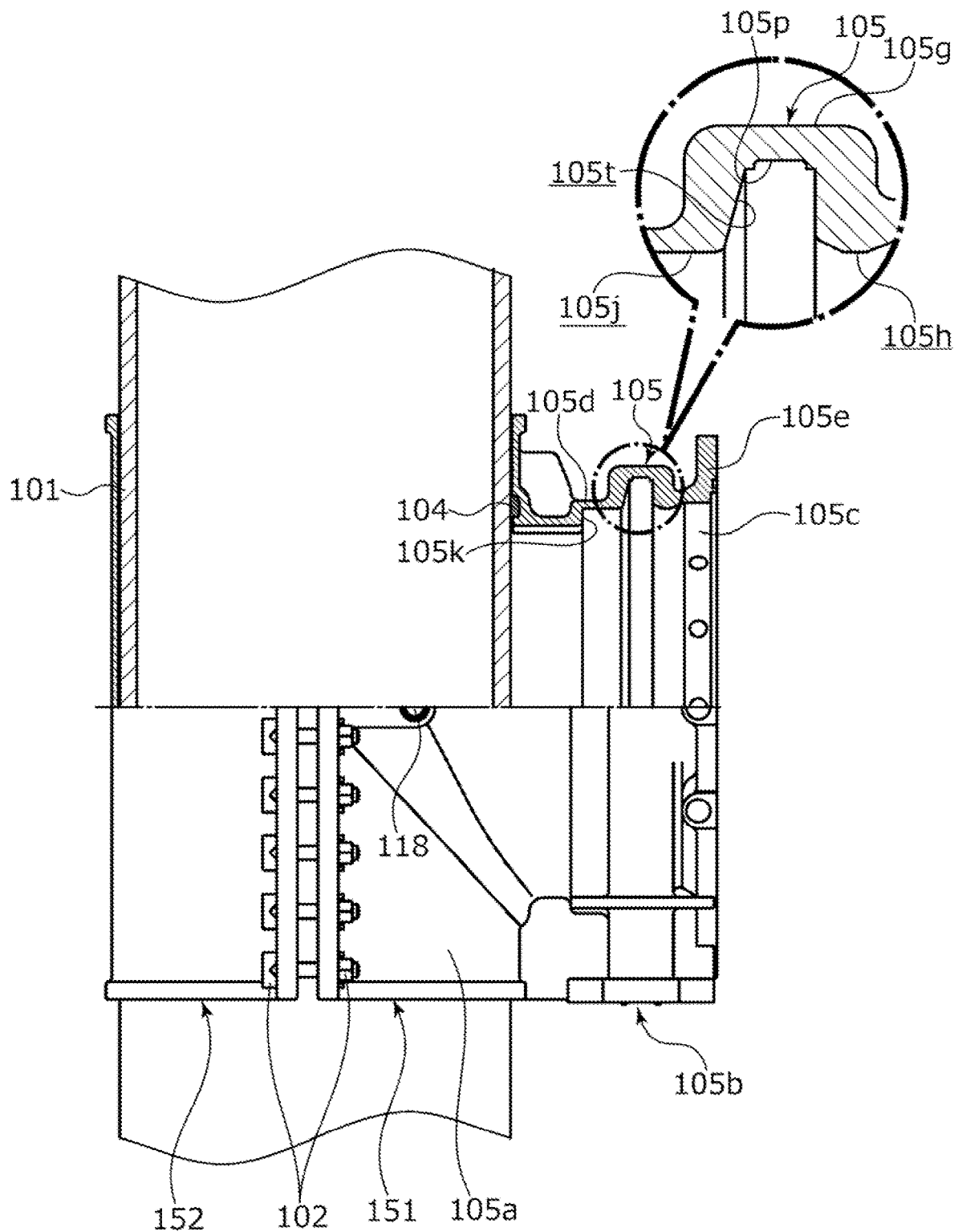
FIG. 31 is a partial sectional plan view showing a casing of a pipe drilling device in a fifth modified example.

Next, the pipe drilling device and the installation method thereof according to the fifth modified example will be described with reference to FIG. 31. As shown in FIG. 31, an inside surface on the fluid pipe 101 side of a recessed portion 105p formed in an inner portion of the neck portion 105d of the casing 105 is formed as a tapered surface 105t that is gradually opened as the inner surface extends from an inner bottom surface toward an opening.

In such a manner, since the fluidity of the fluid in the recessed portion 105p can be increased, chips which have entered the recessed portion 105p or chips which are about to enter the recessed portion 105p, together with the fluid when the fluid pipe 101 is cut, can flow out to the outside of the recessed portion 105p along the tapered surface 105t without staying therein. In addition, the direction of the taper may be gradually opened as extending from the opening toward the inner bottom surface, so that the entering of chips is prevented.

Figure 32:
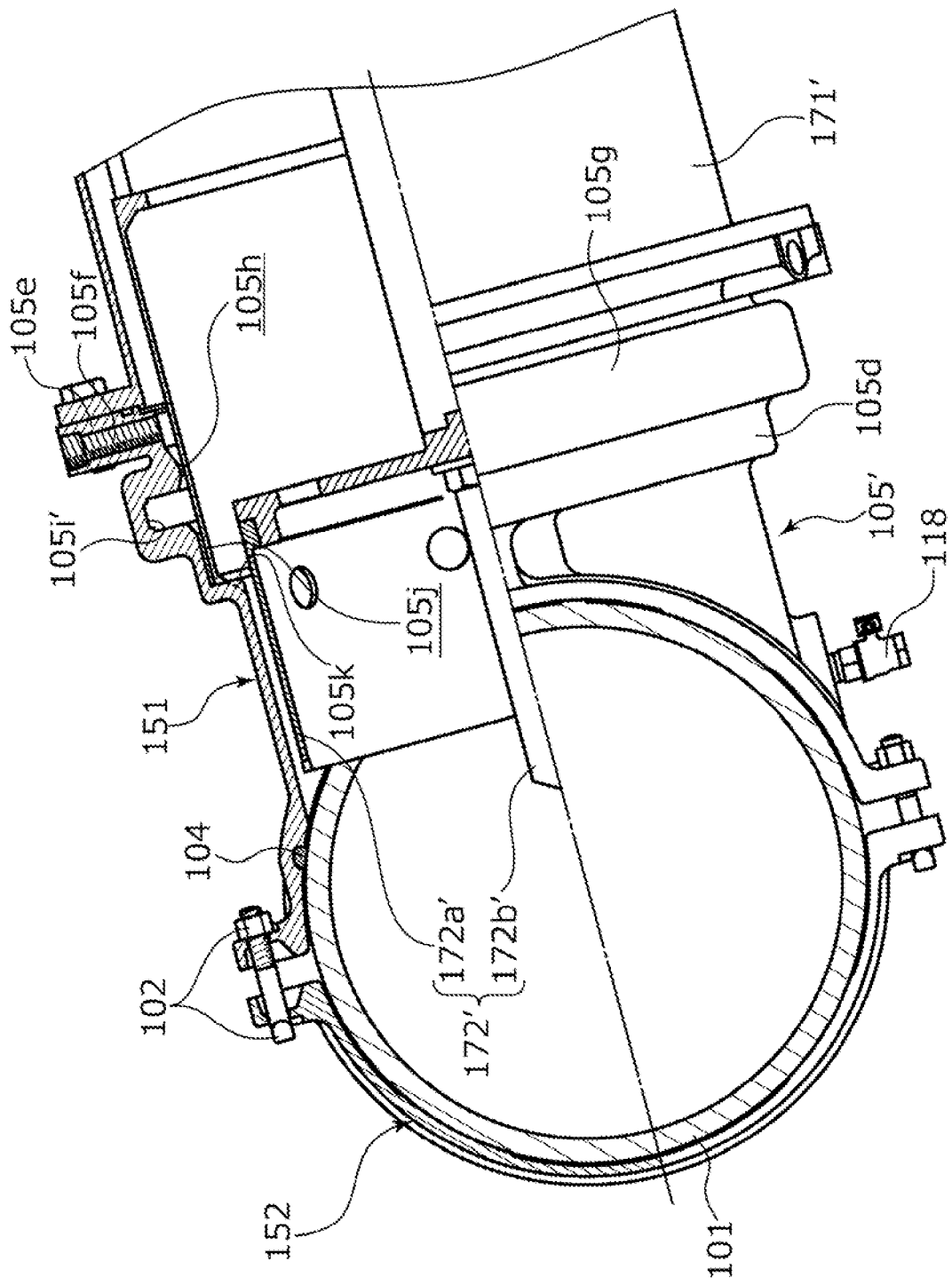
FIG. 32 is a partial sectional front view showing a situation where drilling is performed by a pipe drilling device in a sixth modified example.

Next, the pipe drilling device and the installation method thereof according to the sixth modified example will be described with reference to FIG. 32. As shown in FIG. 32, a casing 105', an attachment flange cylinder 171' connected to the casing 105', and an advancing and retreating mechanism which is not shown are attached to the fluid pipe 101 such that an outer end side thereof is inclined obliquely upward with respect to the horizontal direction. Namely, an inside surface of a recessed portion 105i' formed in an inner portion of the casing 105' is formed to be inclined with respect to the vertical direction.

In such a manner, since the fluidity of the fluid in the recessed portion 105i' can be increased, chips which have entered the recessed portion 105i' or chips which are about to enter the recessed portion 105i', together with the fluid when the fluid pipe 101 is cut, can flow out to the outside of the recessed portion 105i' along the inside surface of the recessed portion 105i' which is inclined, without staying therein.

In addition, although not particularly shown, it is preferable that the casing 105 including the recessed portion 105p according to the fifth modified example described above is attached to the fluid pipe 101 to be inclined obliquely upward as in the sixth modified example. In such a manner, since the tapered surface 105t forming the recessed portion 105p is further inclined with respect to the vertical direction, namely, is inclined to approach the horizontal direction, the fluidity of the fluid in the recessed portion 105p can be further increased, and chips which are about to enter the recessed portion 105p can be completely discharged.

Figure 33:
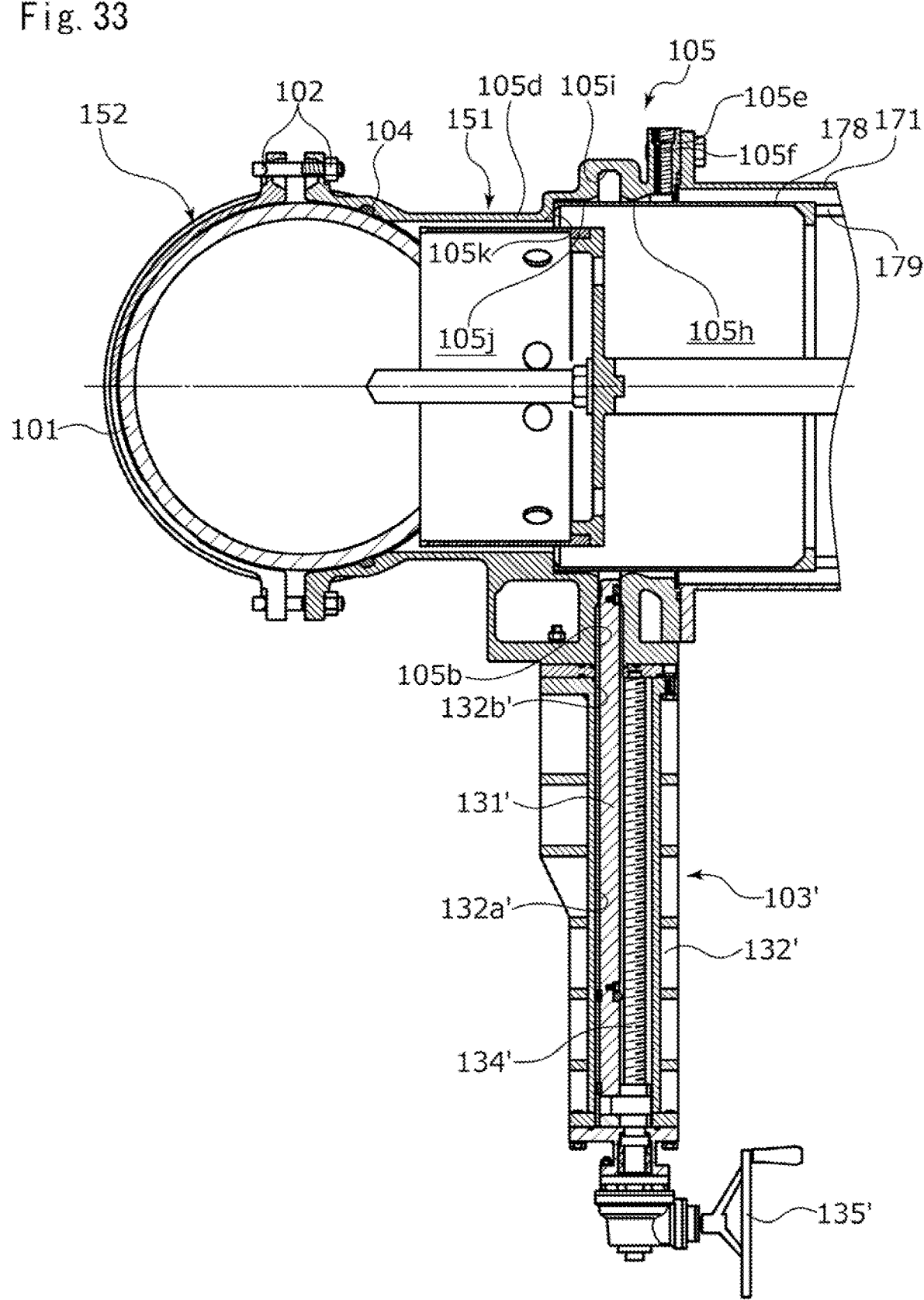
FIG. 33 is a partial sectional front view showing a situation where drilling is performed by a pipe drilling device in a seventh modified example.

Next, the pipe drilling device and the installation method thereof according to the seventh modified example will be described with reference to FIG. 33. As shown in FIG. 33, a process valve 103' forming the pipe drilling device according to the present invention is connected to the opening portion 105b of the neck portion 105d of the casing 105 in a sealed manner. The process valve 103' mainly includes a process valve body 131' that is slidable to open and close the inside of the casing 105, and an accommodation member 132' as a process valve casing extending substantially vertically downward, and including an accommodation inner portion 132a' that slidably accommodates the process valve body 131', and an open portion 132b' that is an open upper end of the accommodation member 132'.

The accommodation member 132' includes a shaft member 134' that extends vertically downward in a state where the shaft member 134' is pivotally supported so as to rotate and so as not to move back and forth. The process valve body 131' is screwed with the shaft member 134', and when an operation member 135' attached to a leading end portion of the shaft member 134', which protrudes downward from the accommodation member 132', is operated to rotate, the process valve body 131' is slidable with respect to the accommodation member 132'.

According to the process valve 103' including the accommodation member 132' as a process valve casing described above, chips entering the recessed portion 105i can be lowered and introduced into the accommodation inner portion 132a' of the accommodation member 132' without staying in the recessed portion 105i. Incidentally, it is preferable that a discharge port which is not shown is provided in a lower end portion of the accommodation member 132' to be openable and closable, and in such a manner, the chips introduced into the accommodation member 132' can be appropriately discharged to the outside.

The embodiments of the present invention have been described above with reference to the drawings; however, the specific configuration is not limited to the embodiments, and the present invention also includes changes or additions that are made without departing from the concept of the present invention.

For example, in the first embodiment, the fluid control valve 10 includes, as a valve body thereof, the plug 11 that passes through the hole portion 1b of the fluid pipe 1 to come into close contact with the inner peripheral surface 1c; however, the valve body is not limited thereto, and a valve body of any form can be also applied as long as the valve body can control the fluid inside the pipe.

In addition, for example, in the first and second embodiments, drilling is performed by the hole saw 72a having a smaller diameter than that of the fluid pipe 1, and in the third embodiment, drilling is performed by the end mill 272 having a smaller diameter than that of the fluid pipe 1; however, the present invention is not limited thereto, and a part of the fluid pipe inside the casing 5 may be machined or a part of the pipeline of the fluid pipe may be cut by a hole saw having a larger diameter than that of the fluid pipe 1, a cutting tool device, a wire saw device, or the like, a cut piece thereof may be removed, and a plug that seals the inner peripheral surface of the casing as a valve seat, or a fluid control valve including an inner valve box with a built-in a valve body may be installed in an uninterrupted flow state. Namely, in the pipe drilling device according to the present invention, chips may be generated from the pipe wall of the fluid pipe by the drilling machine thereof, and drilling of the present invention is not limited to simply forming a hole portion in the fluid pipe, and includes a mode such as machining or cutting.

In addition, in the first to third embodiments, the open end portions 5c, 105c, and 205c of the casings branch in the horizontal direction to be open; however, the present invention can be applied to a case where a branch is formed in a perpendicular direction and drilling is performed in the upward and downward direction, or a case where drilling is performed in the direction of inclination at an angle.

In addition, in the first to third embodiments, in order to recover chips, the leading end portions of the inner wall portion 75a, the cylindrical body 178, and the attachment flange cylinder 271 are provided with the protrusion portions 75d, 178d, and 271d, respectively; however, a plurality of the protrusion portions may be provided, and the shapes also are not limited to the above shapes, for example, the protrusion portion may have an inner peripheral surface having a grid pattern, may include a plurality of protrusions, or may be coated with a viscous material.

In addition, the cylindrical bodies 178 and 188 are not necessarily limited to being formed in a cylindrical shape, and may be formed in a semi-cylindrical shape or a substantially C shape.

In addition, in the first to third embodiments, the process valves 3, 103, and 203 are attached to extend in the pipeline direction of the fluid pipes 1, 101, and 201, but may be attached in a perpendicular direction with respect to the pipeline direction or in the direction of an appropriate angle in the circumferential direction, and are not limited to being parallel to the pipeline, and may be attached at an angle where an operation portion side at an outer end of the process valve gradually approaches or is away from the pipeline. In this case, needless to say, the opening portions 5b, 105b, and 205b or the recessed portions 5i, 105i, and 205i are also appropriately designed in the above directions.

In addition, during drilling, chips stay in the plurality of through-holes into which the plurality of push bolts 105f can be inserted, particularly, on a lower side, which is a concern, and an elastic material such as rubber or sponge or a material such as tape, plastic, or metal may close the through-holes from an inner peripheral side of the neck portion before drilling, or the through-holes may be washed after drilling.

REFERENCE SIGNS LIST

1 Fluid pipe
3 Process valve
5 Casing
5d Neck portion
5i Recessed portion (recessed valve seat portion)
5p Female screw hole (discharge port)
7 Drilling machine
10 Fluid control valve
31 Process valve body
71 Attachment flange cylinder (accommodation cylinder)
72 Cutter
75a Inner wall portion (cylindrical portion)
75d Protrusion portion
75p Communication port
76b Seal member (seal component)
101 Fluid pipe
103 Process valve
105, 105' Casing
105d Neck portion
105i, 105i' Recessed portion (recessed valve seat portion)
105p Recessed portion (recessed valve seat portion)
105t Tapered surface
107 Drilling machine
110 Fluid control valve
117 Communication opening portion (discharge port)
131, 131' Process valve body
132, 132' Accommodation member
172 Cutter
178 Cylindrical body (cylindrical portion)
178d Protrusion portion
181 Protrusion portion (engaging portion)
182 Rubber member (engaging portion)
188 Cylindrical body (cylindrical portion)
190 Sweeping portion
201 Fluid pipe
203 Process valve
205 Casing
205d Neck portion
205i Recessed portion (recessed valve seat portion)
205p Female screw hole (discharge port)
207 Drilling machine
210 Fluid control valve
231 Process valve body
271 Attachment flange cylinder (cylindrical portion)
271d Protrusion portion
272 End mill (cutter)
276 Seal member (seal component)
280 Suction pipe (cylindrical portion)
372 Cutter
372a Hole saw (cylindrical portion)
390 Sweeping portion

The invention claimed is:

1. A pipe drilling device comprising:
a casing having a divided structure and externally fitted to a fluid pipe in a sealed manner;

a process valve including a process valve body that comes into contact with and separates from a recessed valve seat portion provided inside a neck portion of the casing;
a drilling machine including a cutter that is inserted into the casing and configured for drilling the fluid pipe in an uninterrupted flow state; and
a cylindrical portion that is movable to open and close an opening of the recessed valve seat portion inside the neck portion, wherein
a discharge port which discharges chips together with a fluid inside the casing is formed in the neck portion on a side of the fluid pipe with respect to the cylindrical portion.

2. The pipe drilling device according to claim 1, wherein the cylindrical portion is disposed to be slidable along an inner surface of the neck portion.

3. The pipe drilling device according to claim 2, further comprising
a seal component provided in an outer peripheral portion of the cylindrical portion on a side opposite to a fluid pipe side with respect to the recessed valve seat portion and configured to seal a gap between the outer peripheral portion of the cylindrical portion and an inner surface of the neck portion.

4. The pipe drilling device according to claim 2, wherein a protrusion portion protruding in a radially inward direction is formed in an inner peripheral portion in the vicinity of an opening end of the cylindrical portion.

5. The pipe drilling device according to claim 2, wherein the drilling machine includes an accommodation cylinder that accommodates the cutter and that is attached to and detached from the neck portion of the casing, and
the cylindrical portion is formed by a leading end portion of the accommodation cylinder.

6. The pipe drilling device according to claim 2, wherein the cylindrical portion is provided with an engaging portion that enables the cylindrical portion to be connected to and released from the cutter.

7. The pipe drilling device according to claim 1, further comprising
a seal component provided in an outer peripheral portion of the cylindrical portion on a side opposite to a fluid pipe side with respect to the recessed valve seat portion and configured to seal a gap between the outer peripheral portion of the cylindrical portion and an inner surface of the neck portion.

8. The pipe drilling device according to claim 1, wherein a protrusion portion protruding in a radially inward direction is formed in an inner peripheral portion in the vicinity of an opening end of the cylindrical portion.

9. The pipe drilling device according to claim 1, wherein the drilling machine includes an accommodation cylinder that accommodates the cutter and that is attached to and detached from the neck portion of the casing, and
the cylindrical portion is formed by a leading end portion of the accommodation cylinder.

10. The pipe drilling device according to claim 1, wherein a communication port communicating with a discharge port which discharges chips together with a fluid inside the casing is formed in the cylindrical portion.

11. The pipe drilling device according to claim 1, wherein the cylindrical portion is provided with an engaging portion that enables the cylindrical portion to be connected to and released from the cutter.

12. The pipe drilling device according to claim 1, wherein the cylindrical portion is provided with a sweeping portion that enters and comes out from the recessed valve seat portion as the cylindrical portion moves.

13. The pipe drilling device according to claim 12, wherein
the cylindrical portion is a hole saw forming the cutter.

14. The pipe drilling device according to claim 1, wherein the cylindrical portion is a suction pipe that communicates with an inside and an outside of the neck portion of the casing so as to be openable and closable.

15. The pipe drilling device according to claim 1, wherein an inside surface forming the recessed valve seat portion is formed as a tapered surface that is open toward the opening of the recessed valve seat portion.

16. The pipe drilling device according to claim 1, wherein an inside surface forming the recessed valve seat portion is formed to be inclined with respect to a vertical direction.

17. The pipe drilling device according to claim 1, wherein the process valve includes a process valve casing that extends substantially vertically downward to be able to accommodate the process valve body.

18. The pipe drilling device according to claim 2, wherein a communication port communicating with a discharge port which discharges chips together with a fluid inside the casing is formed in the cylindrical portion.

* * * * *